US007937390B2

(12) United States Patent
Moestl

(10) Patent No.: US 7,937,390 B2
(45) Date of Patent: May 3, 2011

(54) METHOD FOR CONTROLLING A RELATIONAL DATABASE SYSTEM

(75) Inventor: Matthias Moestl, Vienna (AT)

(73) Assignee: mediareif Moestl & Reif Kommunikations-und Informationstechnologien OEG, Vienna (AT)

( * ) Notice: Subject to any disclaimer, the term of this patent is extended or adjusted under 35 U.S.C. 154(b) by 273 days.

(21) Appl. No.: 12/302,799

(22) PCT Filed: Feb. 6, 2007

(86) PCT No.: PCT/AT2007/000060
§ 371 (c)(1),
(2), (4) Date: Jan. 30, 2009

(87) PCT Pub. No.: WO2007/137309
PCT Pub. Date: Dec. 6, 2007

(65) Prior Publication Data
US 2009/0271362 A1 Oct. 29, 2009

Related U.S. Application Data

(63) Continuation-in-part of application No. 11/775,317, filed on Jul. 10, 2007.

(60) Provisional application No. 60/819,991, filed on Jul. 11, 2006.

(30) Foreign Application Priority Data

Jun. 1, 2006 (WO) ............... PCT/AT2006/000228

(51) Int. Cl.
G06F 17/30 (2006.01)

(52) U.S. Cl. ........ 707/736; 707/706; 707/713; 707/722; 707/758; 707/781

(58) Field of Classification Search ........... 707/600–831
See application file for complete search history.

(56) References Cited

U.S. PATENT DOCUMENTS

| 5,519,859 | A | 5/1996 | Grace |
| 5,600,829 | A | 2/1997 | Tsatalos et al. |
| 5,930,785 | A | 7/1999 | Lohman et al. |
| 6,732,091 | B1 | 5/2004 | Middelfart |
| 6,834,287 | B1 | 12/2004 | Folk-Williams et al. |
| 7,774,337 | B2 * | 8/2010 | Moestl ......................... 707/721 |
| 2004/0220923 | A1 | 11/2004 | Nica |
| 2004/0220928 | A1 | 11/2004 | Evans |
| 2005/0076045 | A1 | 4/2005 | Stenslet et al. |
| 2007/0106637 | A1 | 5/2007 | Mostl |

FOREIGN PATENT DOCUMENTS

| WO | WO0231625 A2 | 4/2002 |
| WO | WO02091271 A1 | 11/2002 |
| WO | WO02103573 A1 | 12/2002 |

* cited by examiner

Primary Examiner — Isaac M Woo
(74) Attorney, Agent, or Firm — Paul & Paul

(57) ABSTRACT

A method for controlling a relational database system, wherein a query statement to be processed, which consists of keywords, is first analyzed by applying a recursive transition network (RTN) and then converted into control commands by the following steps: defining the RTN in a presetting step by forming independent RTN building blocks each having an inner, directed decision graph and optionally at least one recursive call function; forming an RTN building block-independent reference group, the elements of which refer to a residual decision graph with the first decision position removed; carrying out a reference processing step and running the residual decision graphs, which may prescribe the recursive call function; and generating an optimized access plan for the relational database system.

1 Claim, 33 Drawing Sheets

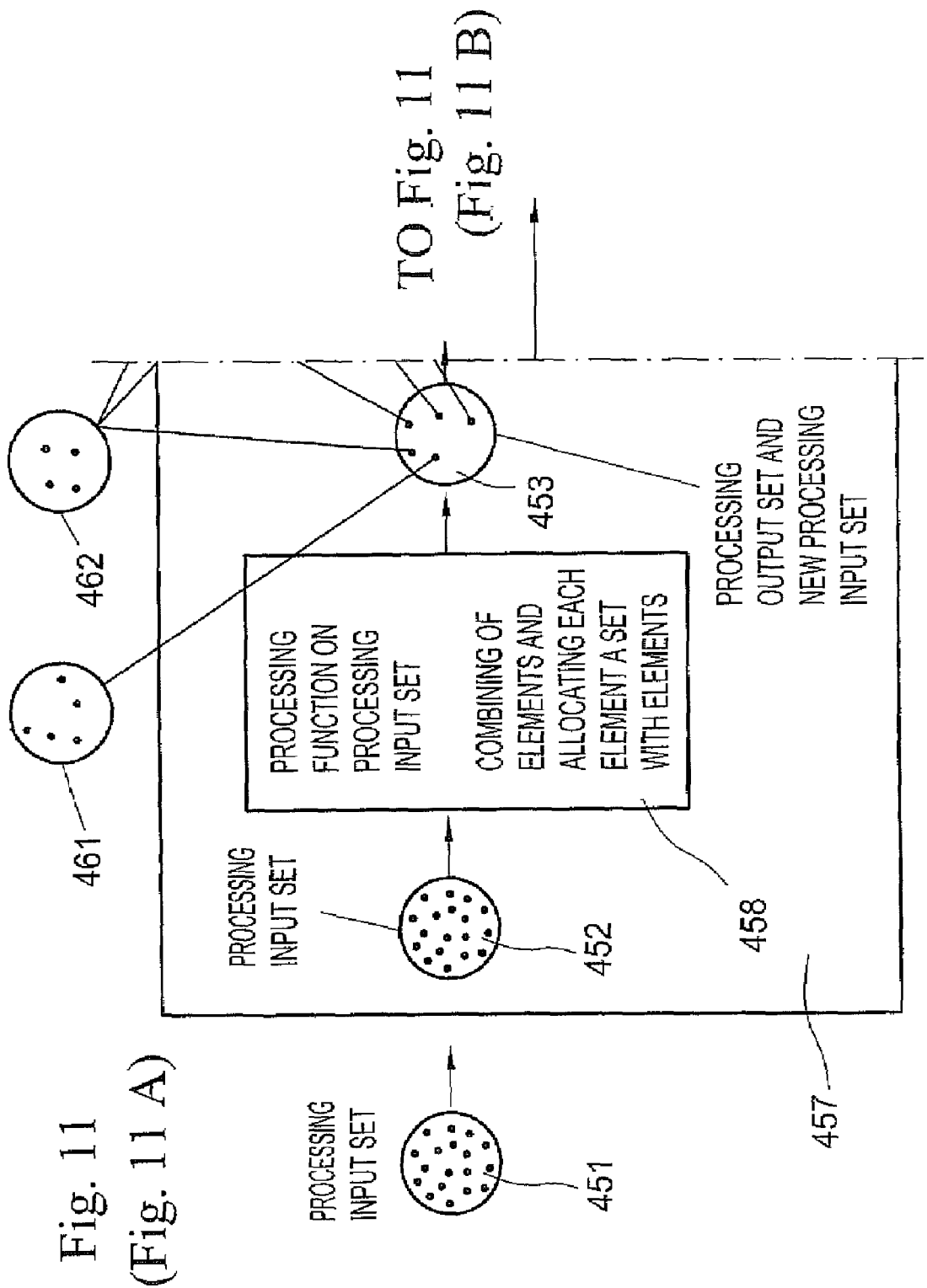
Fig. 11 (Fig. 11A)

Variant 1

Variant 2

Variant 3

Variant 4

METHOD FOR CONTROLLING A RELATIONAL DATABASE SYSTEM

The invention concerns a method for controlling a relational database system, with a query statement consisting of keywords first being analyzed by applying a recursive transition network (RTN) wherein the keywords or group of keywords are allocated processing-relevant properties in the order given by the statement after which follows a conversion into control commands and optionally an optimization.

The invention further concerns an associated relational database system, associated data carriers or carrier signals including control information for the relational database system, and associated computer programs and computer program products to carry out the aforementioned method.

Relational database systems are based mostly on SQL, which has difficulties in formulating a query statement despite its high propagation level and continuous development when dealing with more complex queries, and the grammatically constrained degree of freedom leads to an unnecessarily complicated problem description and a resulting non-optimal access code, which involves storage-intensive, hard disk access-intensive and processor-intensive processing.

SQL is a set-processing query language which applies predetermined set-processing functions in a certain, fixed order to each statement and substatement, respectively, on freely definable input quantities for each statement and substatement, respectively.

This relative constraint in the application of SQL arises from the underlying RTN (recursive transient network) logic the processing of which takes place along a given decision graph which provides for a fixed or largely fixed order of keywords and the recursive usability of the entire decision graph at predetermined decision positions while allowing a limited selection of keywords after each keyword. Due to this given order the processing of the statement may be described only by self-nested and/or self-concatenated total runs of the entire decision graph whereby especially with SQL, OQL or the like a processing of predefined processing blocks is possible owing to the order determined by the decision graph, whereas it is not possible to introduce new processing blocks the orders of which are freely selectable and repeatable.

Although SQL with the above described naturally available RTN constraints has been designed as Turing complete, in practice quite a few queries are difficult to carry out even for experts and therefore often cause long processing times compared to the theoretically possible processing time, which cannot be attained because the RTN of SQL does not allow for the degrees of freedom in the formulation and use of query statements.

Therefore, it is an object of the invention to state a method of the kind as mentioned above which makes possible a simple and concise description of facts in various levels of difficulty in a query language and the establishment of an improved access plan, and as a result the query result may be calculated and carried out much faster, respectively.

It is a further object of the invention to state a method which increases the understanding and clarity for the user and third parties and allows for an easy accomplishment of modifications or adjustments of existing statements when, for example, starting from a problem further similar problems are to be provided.

To ensure easy applicability the method according to the invention should also be optimally illustratable in graphical interfaces.

Defining and upgrading, respectively, new processing functions for the application of the query language which is the basis for the method, should be easy to carry out.

In addition, it is an object of the invention to perform an analysis of a statement, which meets the above requirements in a simple way, as fast as possible and to create and process an optimal access plan, corresponding to the respective statement, to a given data structure of a relational database system.

According to the invention this is achieved by using a method comprising the following steps:

defining the RTN in a presetting step by forming independent RTN building blocks, wherein each RTN building block includes associated processing-relevant building block information and has an inner, directed decision graph which is defined independently from the inner, directed decision graphs of the other RTN building blocks and has at least one decision path, which includes at least one decision position, with at least one part of the RTN building blocks having a recursive call function at least one of the decision positions of their decision paths, which carries out the introduction and running of one of the RTN building blocks from the total of RTN building blocks, wherein the introduced RTN building block again optionally includes the recursive call function in its decision graph at least once so that any frequently recursively nested execution of the call function is made possible, forming an RTN building block-independent reference group, the elements of which refer to a residual decision graph with the first decision position removed, wherein for each RTN building block the following substeps are carried out independently from the other RTN building blocks:

determining all decision positions that may be reached as the first decision position in the decision graph of the respective RTN building block and adding the same to the RTN building block-independent reference group as its elements forming the residual decision graphs for all first decision positions reachable by combining the decision paths that may be followed starting from the respective first decision position with the omission of these first decision positions, and adding the respective processing-relevant RTN building block information thereto, so that after carrying out all substeps for all RTN building blocks, the reference group contains the first decision positions of all RTN building blocks, and these first decision positions refer to their associated residual decision graphs, running all keywords of the statement to be processed by carrying out a reference processing step for the keyword at the first position of the statement to be processed, wherein the matching keyword is searched in the reference group and, when the same is found, the residual decision graph allocated thereto by reference is followed in a way that the respective subsequent keywords of the statement to be processed are run and all possible decision paths of the allocated residual decision graph are followed until either no matches with the respectively chosen decision path are detected and the reference processing step in question is aborted or the respectively chosen decision path is run to the end, wherein at those decision positions of the allocated residual decision graph reached that cause the execution of a recursive call function, the reference processing step is effected recursively, and that an access plan for the relational database system is generated from the order of the processing-relevant building block information and its nesting as resulting after running all keywords of the query statement, and by a relational database system comprising at least a relational database, at least a data processing unit and at least a memory which is programmatically set up in such a way that it works according to the aforementioned method according to the invention.

In this way, one can do without the application of the up to now high structural degree in query languages such as SQL, OQL and the like with predetermined processing areas and processing orders such as SELECT, FROM, WHERE, GROUP BY, HAVING, ORDER BY, LIMIT, UNION and thus reach higher flexibility in formulating a query.

While with SQL it is mandatory to form Cartesian products in the FROM part of the query, to eliminate certain rows of the Cartesian products in the WHERE part, to combine certain data fields in the GROUP BY part, to eliminate certain rows in the HAVING part by means of group calculation results, to sort by ORDER BY and to combine sets according to certain criteria with UNION or other set-uniting operations, use of the inventive method does not show any such limitations.

With prior art SQL, the necessary Turing completeness may be achieved so that all data-related solvable problems may be formulated theoretically, but nevertheless due to the high complexity it fails in practice, depending on user competence starting from medium difficult to difficult tasks. Additionally, a great part of all possible queries may be formulated by an expert, but these, depending on the respective problem, may be incorporated into the given processing areas only in a complicated manner because due to the predetermined structuring and order, for example in SQL, this cannot be done in any other way. As it is not possible in many cases to predetermine a direct way of set processing due to the small set of processing areas, it is up to the optimizer intended for this purpose to avoid many of the worst ways, and the individually applied description is to determine the best way. As compared with the theoretically best possible way this may vary strongly therefrom.

Caused by the independence of the RTN building blocks from each other and by the permitted recursive call function in decision graphs, calculations based on RTN building blocks, especially when there is a high number of those, lead to, particularly at these recursive call function decision positions, a disadvantage in speed as compared to calculations based on a prior art RTN, which only allows a limited number of possibilities at each decision position. This loss of speed can, however, be compensated by using the inventive method where, by means of a reference group and residual decision graphs each allocated to one element, fixed allocations to certain keywords are made so that, in the worst case, not all possible decision paths of all RTN building blocks have to be checked but the required RTN building stone can be identified directly.

Further embodiments of the invention are given in the accompanying claims. In the following the invention is explained in detail by the embodiments shown in the figures.

The starting point for the application of the invention is a query statement for a relational database system, which is supposed to be analyzed, to establish an access plan to an existing data structure according to the analysis, and to give the queried results after execution.

Such a statement initially consists of a string of tokens, i.e. of visible symbols—letters, numbers, punctuation, blanks, etc. The expressiveness of such a statement can, on the one hand, be shown by the flexibility of an RTN acting as a basis, and on the other hand by the processing logic used after analysis of the RTNs, which may be described by means of a statement.

Figure 1:
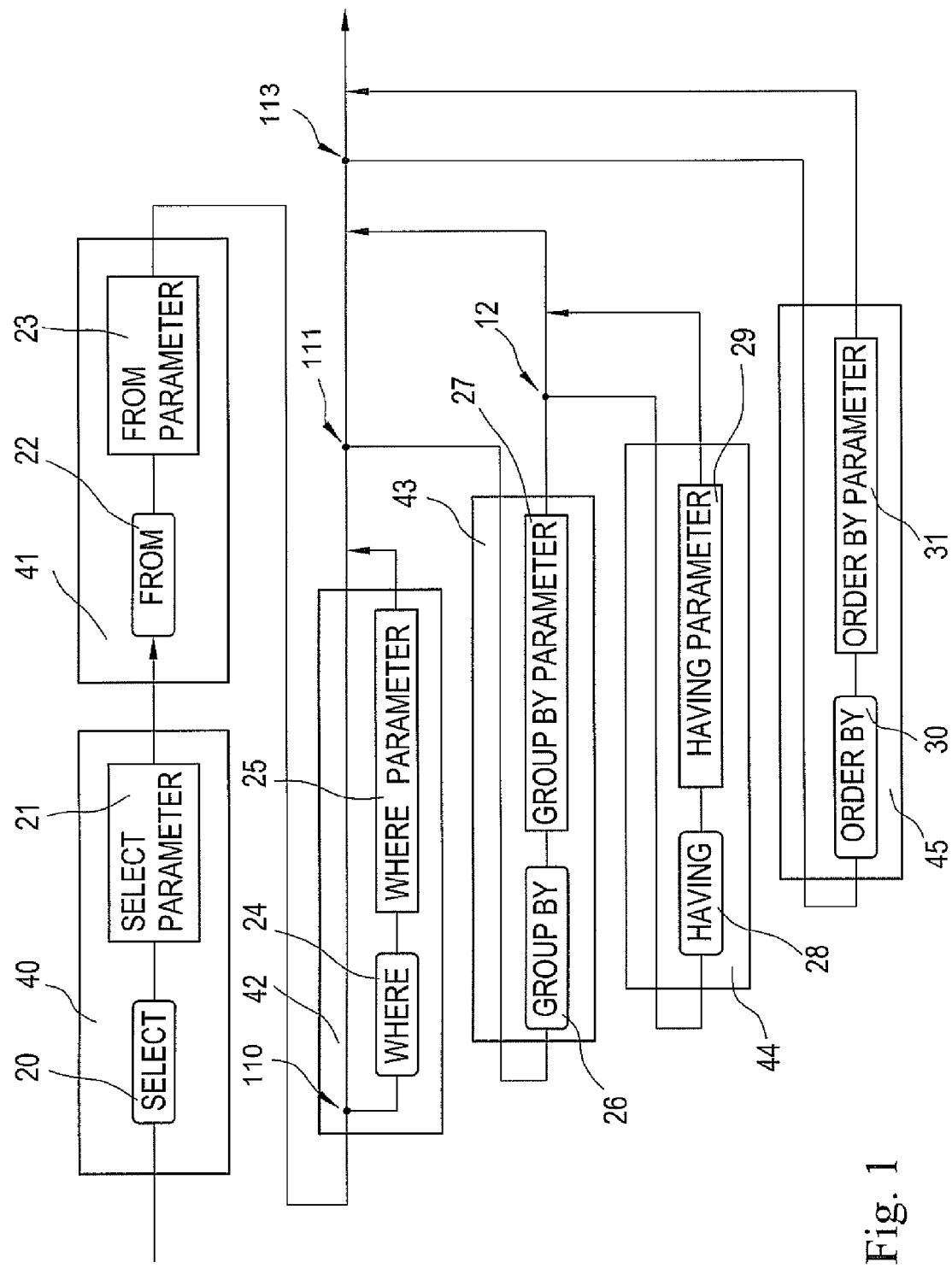
FIG. 1 is a schematic representation of a prior art SQL-RTN.

FIG. 1 shows a simplified prior art decision graph for the SELECT command of the query language SQL from which the schematic structure of the RTN for SQL becomes clear.

Each query statement is formed from a fixedly predetermined order of necessarily successively arranged processing areas 40, 41, 42, 43, 44, 45, with keywords 20, 21, 23, 24, 25, 26, 27, 28, 29, 30, 31 with only a certain selection of keywords being chosen at the decision positions 110, 111, 112, 113, for the sake of simplicity only for the introductory keywords 24, 26, 28, 30 of the processing areas 42, 43, 44 and 45 to reach the desired query result. A certain group of keywords forms each processing area, e.g. FROM (keywords 22, 23), WHERE (keywords 24, 25), GROUP BY (keywords 26, 27) etc., with each processing area carrying out an allocated set processing function, e.g. FROM forms Cartesian products, which enables special JOINs.

After each introductory keyword 20, 22, 24, 26, 28, 30 further keywords may follow which are not shown in FIG. 1 for the sake of clarity. Thus, after the keyword 24 "WHERE" the keywords "(", "NOT", a table name, a table field name, defined functions, etc. may follow directly, for example. A SUBSELECT, i.e. the recursive application of the RTN which always starts at SELECT (keyword 20), for example by "(", may always appear at a predetermined decision position. Therefore, at such positions only the entire RTN may always be recursively used as a unit.

Despite the plurality of potentially selectable keywords, SQL and related query languages are rather constrained and there is a variety of queries the transcription of which by the given processing areas in the predetermined processing order is quite complicated and tedious, which is why a more complex and slower access plan is generated from this description than actually needed.

An RTN contains the highest flexibility, when the RTN is not viewed as one unit, which has one overall directed decision graph that is run hierarchically as a whole and may then as one unit be introduced at certain definable decision position of all RTNs, but by use of the RTN building blocks described according to the invention. RTN building blocks allow higher flexibility because in each RTN building block, if desired by means of corresponding decision positions, an RTN building block from the total of RTN building blocks can be introduced and run.

The starting points for the following considerations are always a statement formulated by a user or generated via a graphic interface, to be analyzed and thus to be processed. A statement receives its processable formal shape exactly at the moment when the user expresses his problem, i.e. query to be formulated for the relational database system, by means of the keyword combinations creatable via the RTN building blocks.

The expressiveness of the formulatable statements is particularly increased and reformed by the fact that processing-relevant RTN building block information may be allocated to each RTN building block, wherein these processing-relevant RTN building block information may refer to the RTN building block as a whole or to the individual decision positions. Furthermore, if two or more RTN building blocks are nested, a required processing-relevant RTN building block information may be the communication, irrespective of their nesting depth and the hierarchical order of the nestings.

Before an informal problem may be given as a syntactically correct statement, it must be verified, with the provision that a total of defined RTN building blocks does already exist with their RTN building block information allocated to them, whether this suffices to syntactically express the given informal problem.

If, as is to be expected during the first use of a system based on RTN building blocks, there are no RTN buildings blocks defined yet, these are established completely anew and pre-determined as the total of RTN building blocks.

As soon as elemental RTN building blocks with their processing-relevant RTN building block information allocated to them are lacking for a desired problem, the given total of RTN building blocks may be supplemented by these required RTN building blocks.

Thus a set of RTN building blocks is either stated afresh or an existing set of the same, if it is regarded as not sufficient, is supplemented or extended before the formal formulation of a problem. According to the invention, this happens during the following process step:

Defining the RTN in a presetting step by forming independent RTN building blocks, wherein each RTN building block includes associated processing-relevant building block information and has an inner, directed decision graph which is defined independently from the inner, directed decision graphs of the other RTN building blocks and has at least one decision path, which includes at least one decision position, with at least one part of the RTN building blocks having a recursive call function at least one of the decision positions of their decision paths, which carries out introduction and running of one of the RTN building blocks from the total of RTN building blocks, wherein the introduced RTN building block again optionally includes the recursive call function in its decision graph at least once so that any frequently recursively nested execution of the call function is made possible.

To illustrate this process-like presetting step in a state, in which no RTN building blocks have been defined yet, a simple abstract RTN is stated in example 1, which consists of RTN building blocks, wherein the inner directed decision graph and processing-relevant RTN building block information, which is not defined in detail at the moment for sake of clarity but explained further below, are stated for each RTN building block.

EXAMPLE 1

RTN Building Block B1_1:
  Processing-relevant RTN building block information $V1\_1, V1\_2, V1\_3, \ldots V1\_x$
  RTN syntax: ("A" | "V" "W") * "B" * "A"
RTN Building Block B1_2:
  Processing-relevant RTN building block information $V2\_1$ to $V2\_x$
  RTN syntax: "A" * "C" * "B"
RTN Building Block B1_3:
  Processing-relevant RTN building block information $V3\_1$ to $V3\_x$
  RTN syntax: "X" ["Y"]
RTN Building Block B1_4:
  Processing-relevant RTN building block information $V4\_1$ to $V4\_x$
  RTN syntax: "A" * (1) "D" [(*1)] *
RTN Building Block B1_5:
  Processing-relevant RTN building block information $V5\_1$ to $V5\_x$
  RTN syntax: "A" "D" [* "E"]
RTN Building Block B1_6:
  Processing-relevant RTN building block information $V6\_1$ to $V6\_x$
  RTN syntax: "X" * "B"
RTN Building Block B1_7:
  Processing-relevant RTN building block information $V7\_1$ to $V7\_x$
  RTN syntax: * "K" *
RTN Building Block B1_8:
  Processing-relevant information $V8\_1$ to $V8\_x$
  RTN syntax: * "L" * "M"

By means of the RTN building blocks RTN building block B1_1 to RTN building block B1_8 shown in example 1, the recursive call function used according to the invention, which is marked with * in the respective RTN syntax and carries through the introduction and running of one of the RTN building blocks from the total of RTN building blocks.

The figures FIG. 21, FIG. 22, FIG. 23 to FIG. 28 are graphic representations of the RTN building blocks of example 1, B1_1 B1_2, B1_3 to B1_8, each with an inner, directed decision path 50888. The RTN building block B1_1 has the reference number 50001, the RTN building block B1_2 the reference number 50002 etc.

Identical decision positions in the decision graphs have the same decision position numbers as reference number in the figures, which decision position numbers are explained below. The recursive call function, which requires the introduction and running of one of the RTN building blocks from the total of RTN building blocks, is shown in the figures at the decision positions used with *, which represents a marker for these decision positions, and thus has the decision position number and thus the reference number 300 in all figures.

Preferably it is predetermined that during running of the inner, directed decision graphs of the RTN building blocks, decision positions along decision paths are reached, wherein each decision position is, depending on an associated mark, either compared with a text, a symbol, a variable or a number, or a jump position to any decision position within the inner, directed decision graph of the current RTN building block is carried out, or an RTN building block from the total of RTN building blocks is used, which again is run.

By means of this selection option at the decision positions, the form of the query is much more flexible than according to the state of the art, especially by means of the possibility to mark an arbitrary number of decision positions with a recursive call function within any RTN building block. If required, further associated marks for decision positions may be specified. Thus, the range of the definition of a decision position is not limited to one special function, but may be selected as desired under consideration of the syntactical order.

Throughout this description, the inner, directed decision path of the RTN building blocks is expressed by means of an RTN syntax, similar to that used with EBNFs (Extended Backus Naur Forms), which is extended by a jump option within the inner, directed decision path, which, when used as decision position is indicated with the associated mark in the inner, directed decision path of the RTN building blocks.

The most important difference to the known ENBF is the addition of a special mark for the recursive call function, which carries out the introduction of and running trough one of the RTN building blocks from the total of RTN building blocks.

A directed decision path of an RTN building block means a directed graph according to the state of the art, wherein the knots of the graph are decision positions. A decision path is a possible way through the directed decision graph from a decision position reachable first within the same to a decision position defined last. The total of all decision paths thus represents a possibility to run a decision graph from the first decision position to the last decision position; the overlaying of these different running options via the decision paths is shown graphically with the resulting decision graph having branching points at certain positions.

For marking a decision position for the above recursive call function, the RTN syntax of the RTN building blocks uses the symbol *, if a keyword is expected at a decision position of an RTN syntax, this expected keyword is to be placed between " ". If a variable is to be indicated at a decision position of an RTN syntax, the sequence V: and a name are indicated at this decision position, which shortly describes this variable to give a general idea.

In order to show an optionality of one or more decision positions in the decision graph, or in other words the branching positions that result from the overlaying of the possible decision paths, the symbol [ is used for the start of an optionality, and the symbol ] for the end of the respective optionality.

In order to specify the above additional jump option, so-called jump positions are envisioned as decision positions within the decision graph, wherein a jump position may redirect to a different decision position within the respective inner, directed decision graph.

If such a jump position within an RTN syntax is to be carried out at a decision position, the decision position in the decision graph that is to be jumped to is marked with the symbol ( followed by a number and the symbol ), and the decision position where a jump is to be carried out is marked with the symbol *( followed by the number to which the jump is to be carried out and the symbol ).

In order to show a logical exclusive OR at one or more decision positions within a decision graph, the symbol ( is put, followed by any decision position that is part of this obligatory, alternative partial decision path. For the purpose of separation from further partial decision paths independent from each other and related to this logical, exclusive OR, the symbol | is indicated, followed by the subsequent partial decision path. In this way, any number of partial decision paths may be linked with each other or by an OR. At the end of such a logical, exclusive OR, the symbol ) is indicated.

Figure 4:
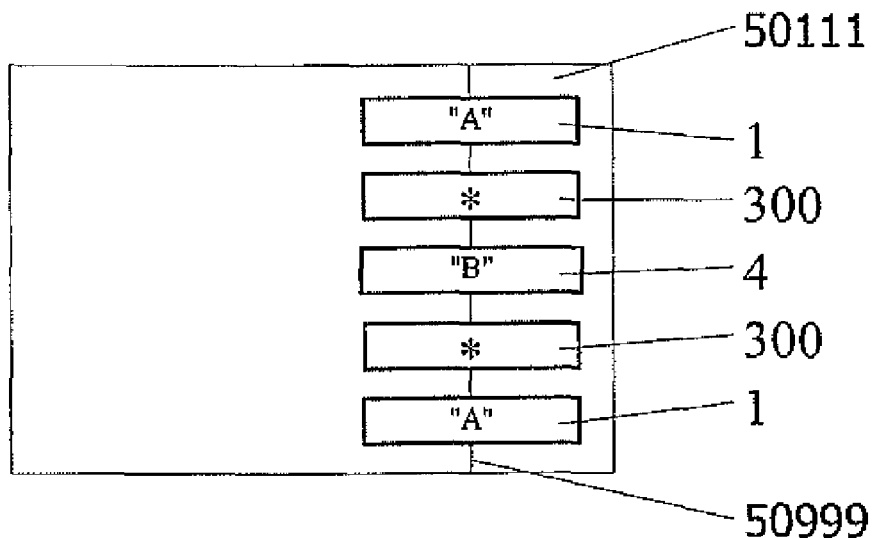
FIGS. 4, 5, 6, 7, 18, 19, 20 are each schematic representations of several RTN building blocks according to one embodiment of the inventive method, which have only one decision path, but each represent the result of a combination of other RTN building blocks.
Figure 5:
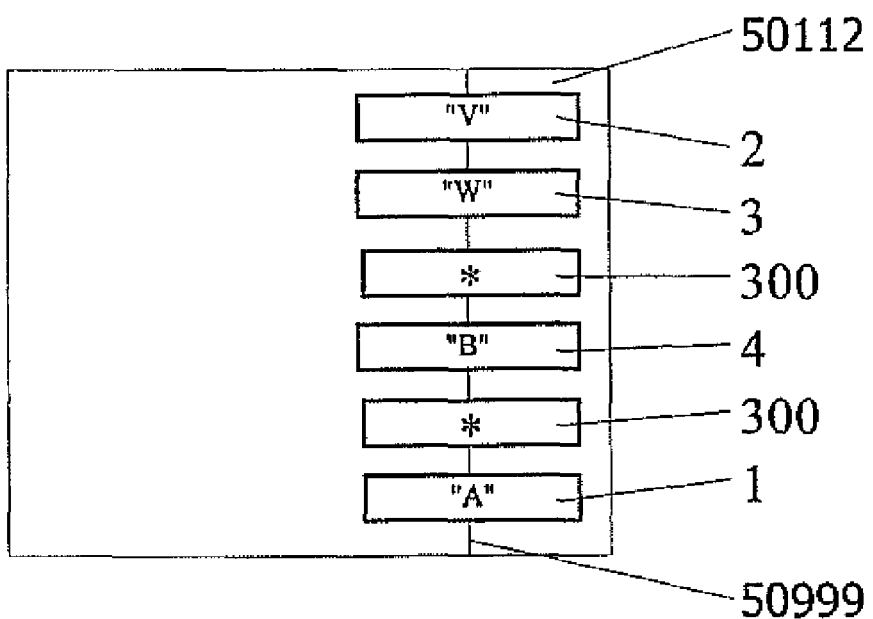

FIGS. 4 and 5 show the RTN building blocks 50111 and 50112, which both have a decision path 50999 and are defined independently from each other. These two RTN building blocks 50111 and 50112 may, however, for example because of partly identical processing-relevant RTN building block information, unified to a single RTN building block, i.e. the RTN building block B1_1 by overlaying the access paths of the two RTN building blocks, wherein within the unified RTN building block B1_1 the use of a logical, exclusive OR is required for the differing parts of the two decision paths.

In the same way, the RTN building blocks 50131 (FIG. 6) and 50132 (FIG. 7) may be unified by overlaying their access paths, wherein the unified RTN building block is the RTN building block B1_3. In this overlaying of the two RTN building blocks, the use of an optionality is required because the RTN building block 50132 contains a decision position keyword "Y" in its decision path 50999, which is not present in the RTN building block 50131.

Figure 18:
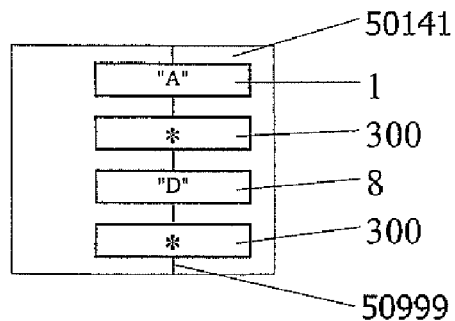
Figure 19:
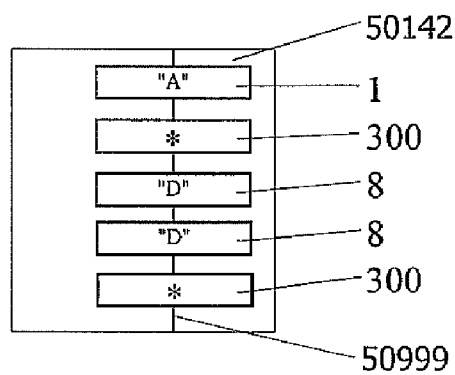
Figure 20:
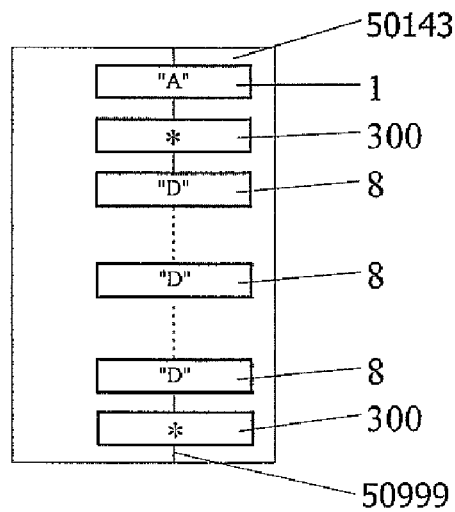
Figure 21:
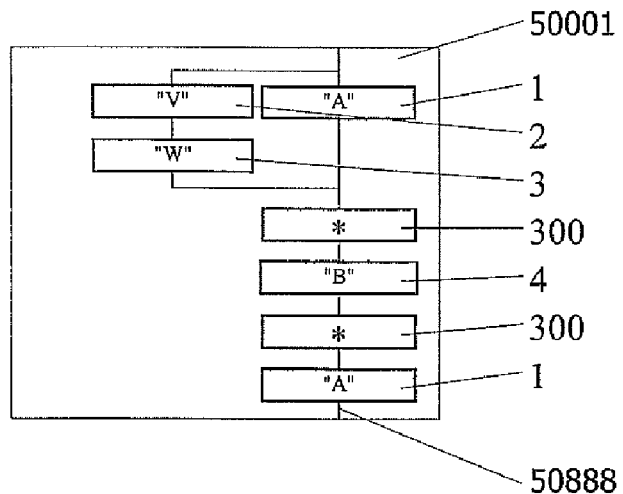
FIGS. 21 to 28 are each schematic representations of an RTN building block according to one embodiment of the inventive method.
Figure 22:
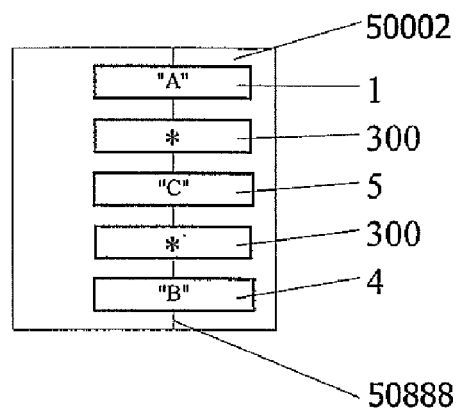
Figure 23:
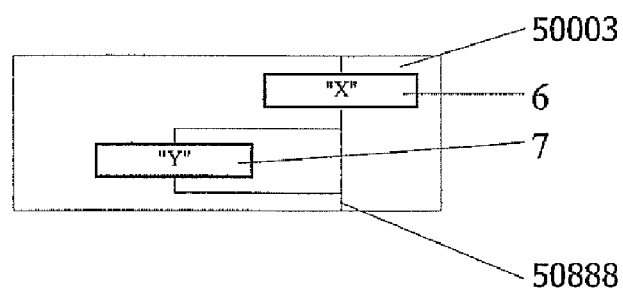
Figure 24:
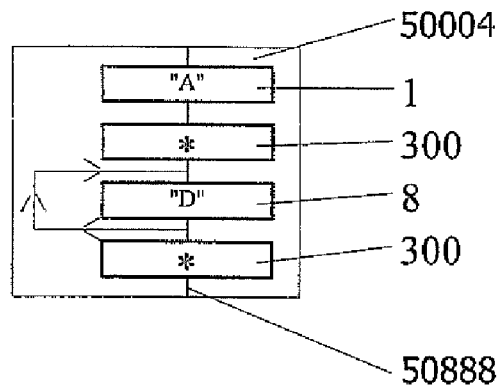
Figure 25:
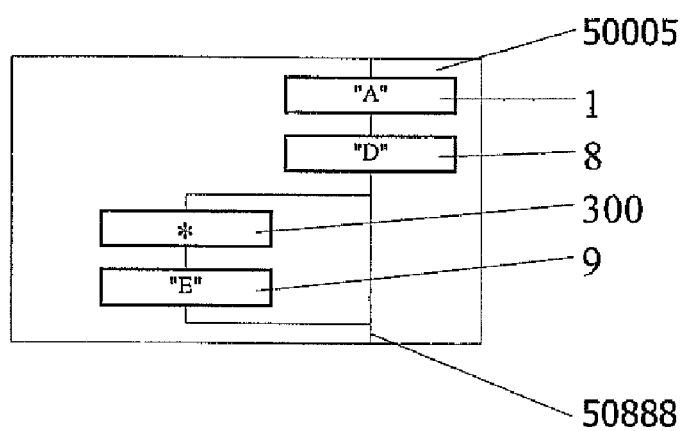
Figure 26:
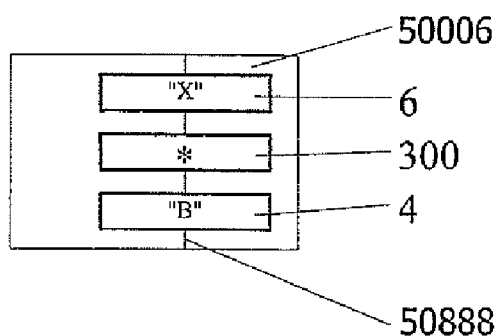
Figure 27:
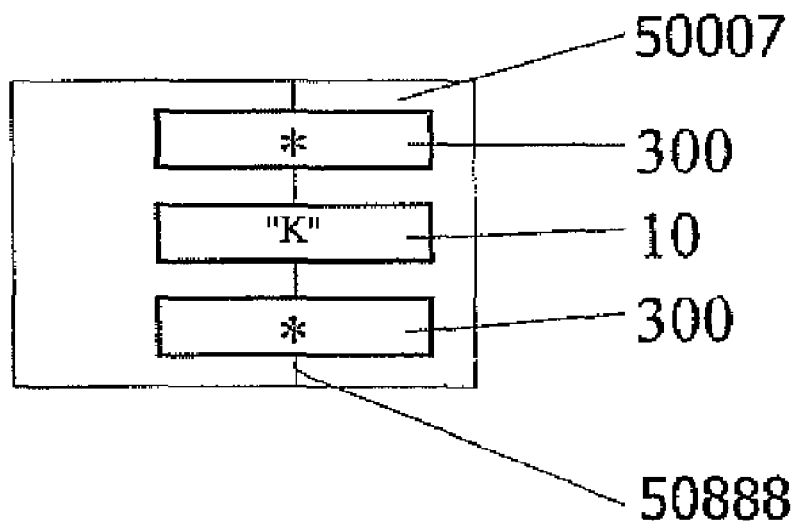
Figure 28:
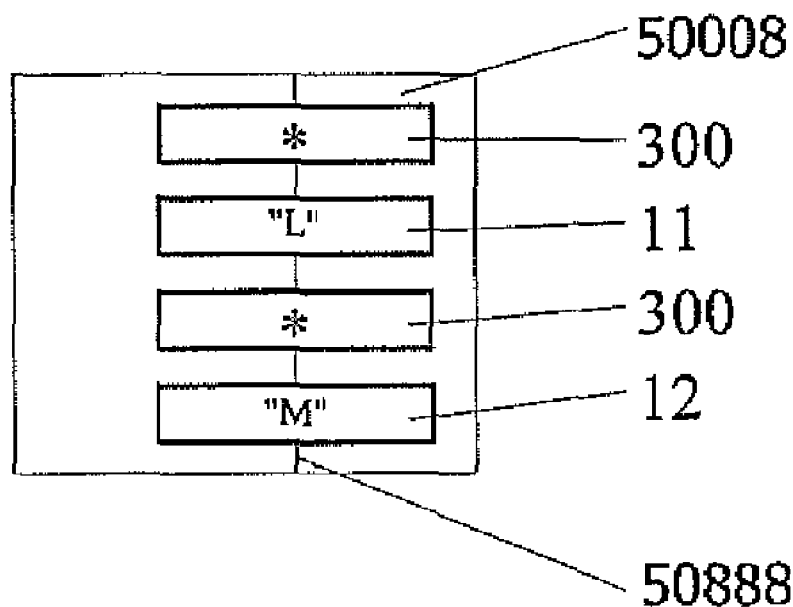

FIG. 18, FIG. 19 and FIG. 20 show the independent RTN building blocks 50141, 50142 and 50143, wherein RTN building block 50143 represents an RTN building block with a finite number of decision positions keyword "D" and is thus intended to show the plurality of all RTN building blocks with more than two decision positions keyword "D". In order to unify these partly shown three RTN building blocks to one RTN building block, i.e. RTN building block B1_4, by means of overlaying of their access paths 50999, an optional jump decision position is required.

The RTN syntax of the RTN building block B1_4 is thus interpreted as follows:

"A" * (1) "D" [(*1)]*

The first decision position of the inner, directed decision graph of the RTN building block B1_4 thus prescribes the keyword "A" as current keyword in a statement to be analyzed.

When reached, i.e. after a successful comparison of the first decision position of this decision graph, the subsequent second decision position carries out a recursive call function, which means the introduction of and running an RTN building block from the total of RTN building blocks.

The third decision position following in the decision path expects the keyword "D" as current keyword in the statement to be analyzed, which keyword results after the stepwise comparison of the keywords of the same statement with the decision positions of the recursively used RTN building block with its optional further nestings at the second decision position as current keyword.

After successful comparison of the third decision position comes a branching point specified by [ ], starting from which the two decision paths identical at decision positions so far take different courses independently from each other, which means that two different decision paths may be reached from this branching point. The first possible decision position within this first branching possibility is the fourth decision position (*1), which defines a jump position to a different decision position in the decision graph, in this case a jump to the third decision position, the subject of which is the keyword "D". The alternative second possible decision position of this branching point is the fifth decision position, which means the call function, i.e. the introduction and running of one of the RTN building blocks from the total of RTN building blocks.

As soon as the fifth decision position is reached and can be successfully compared, the end of this RTN building block B1_4 is reached.

Thus, an RTN building block from the total of RTN building blocks may be introduced at the second as well as at the fifth decision position, which RTN building block again expects a recursive call function at least one decision position of its decision graph, so that, for example, the same RTN building block B1_4 may be introduced at one or at both decision positions of its inner, directed decision graph, which allows the recursively nested execution of the recursive call function to be carried out as often as desired.

Based on the RTN building block defined in example 1, the following statements are valid in example 2.

EXAMPLE 2

Syntax to be Processed: A X X B D D D A D

The following recursive nesting in RTN building block B1_4 results for the syntax given in example 2:
RTN building block B1_4: "A" *-position1 "D" "D" "D" *-position3
*-position1 introduces the RTN building block B1_6:
RTN building block B1_6: "X"*-position2 "B"
*-position2 introduces the RTN building block B1_3:
RTN building block B1_4: "X"
*-position3 introduces the RTN building block B1_5:
RTN building block B1_5: "A" "D"

Figure 46:
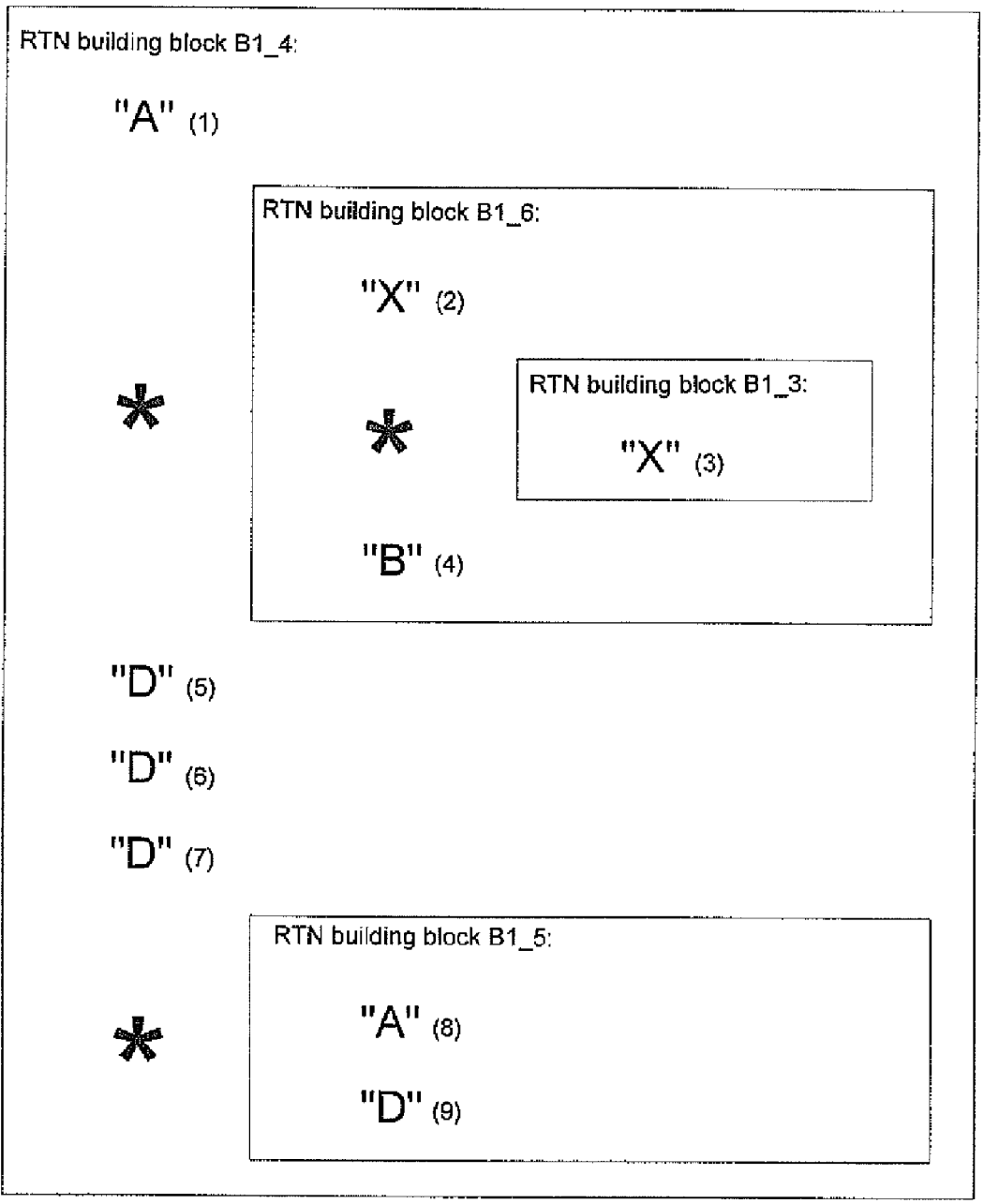
FIGS. 46 and 47 are each schematic representations of the nesting of RTN building blocks according to one embodiment of the inventive method.

This finished nesting for example 2 is graphically shown in FIG. 46.

For example 2, this results in the following hierarchical nesting of the RTN building blocks with the processing-relevant RTN building block information allocated to them and not defined in more detail:

| RTN building block B1_4 | processing-relevant information V4_1 to V4_x |
| RTN building block B1_6 | processing-relevant information V6_1 to V6_x |
| RTN building block B1_3 | processing-relevant information V3_1 to V3_x |
| RTN building block B1_5 | processing-relevant information V5_1 to V5_x |

Figure 47:
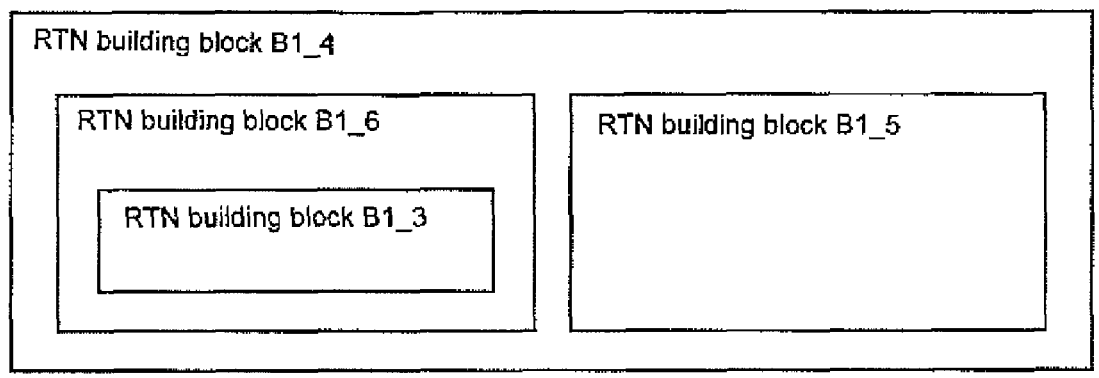

For a better understanding, FIG. 47 shows a graphical representation summarizing the hierarchical nesting of the RTN building blocks without the keywords and recursive call functions 300.

At this point, the finished or extended/modified set of RTN building blocks is available for formulating and processing of queries, and the following process step may be used to reach high velocity for further processing:
  determining all decision positions that may be reached as the first decision position in the decision graph of the respective RTN building block and adding the same to the RTN building block-independent reference group as its elements,
  forming the residual decision graphs for all first decision positions reachable by combining the decision paths that may be followed starting from the respective first decision position with the omission of these first decision positions, and adding the respective processing-relevant RTN building block information thereto,
  so that after carrying out all substeps for all RTN building blocks, the reference group contains the first decision positions of all RTN building blocks, and these first decision positions refer to their associated residual decision graphs.

For the RTN building blocks given in example 1, the formation of the RTN building block-independent reference group is shown in detail for three of these RTN building blocks for a better understanding:

Decision Graph of RTN Building Block B1_1:
((1)"A" | (2)"V" (3)"W") (4)* (5)"B" (6)* (7)"A"

The first decision position in this RTN building block B1_1 that may be reached is the decision position (1)"A" and the decision position (2)"V".

consequently, the decision position (1)"A" and the decision position (2)"V" are added as elements to the independent reference group.

Consequently, the residual decision graph reachable from the first decision position (1)"A" of the RTN building block B1_1 is:
(4)* (5)"B" (6)* (7)"A" with processing-relevant RTN building block information (VRB-I) V1_1 to V1_x The element "A" in the RTN building block-independent reference group refers to this residual decision graph, which results in:
(1)"A"-> (4)* (5)"B" (6)* (7)"A"

Consequently, the residual decision graph reachable from the second decision position (2)"V" of the RTN building block B1_1 is:
(3)"W" (4)* (5)"B" (6)* (7)"A" with VRB-I V1_1 to V1_x The element "V" in the RTN building block-independent reference group refers to this residual decision graph, which results in:
(2)"V"-> (3)"W" (4)* (5)"B" (6)* (7)"A"

Figure 2:
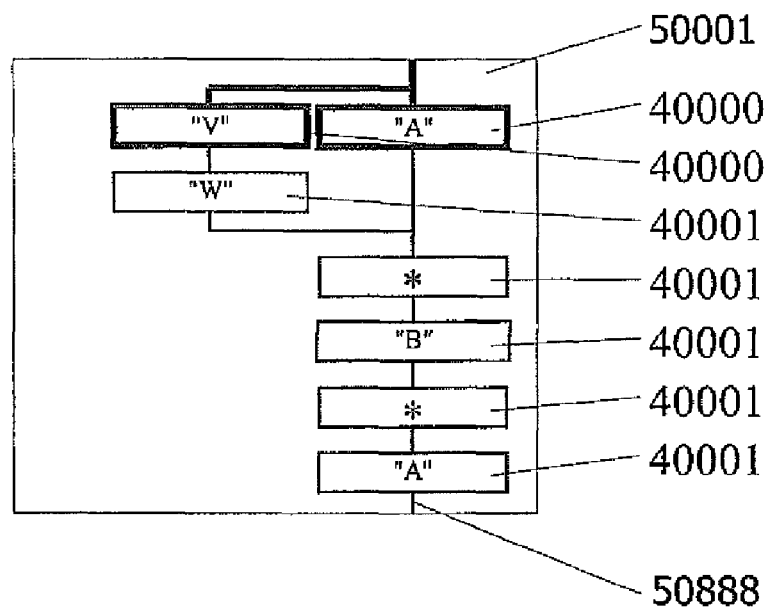
FIGS. 2, 3 are schematic representations of two RTN building blocks, the decision positions reachable first when running the decision graph of RTN building blocks according to one embodiment of the inventive method being marked.

FIG. 2 shows the RTN building block 50001, which is called RTN building block B1_1 above, with an inner, directed decision graph 50888. The two decision positions reachable first, keyword "V" and keyword "A", are marked with the reference number 40000, all other decision positions, that are not decision positions reachable first, are marked with the reference number 40001.

Decision Graph of RTN Building Block B1_1: "A" * "C" * "B" (for the sake of simplicity, the decision positions are not numbered anymore from now on)

A candidate for the first decision position in this RTN building block B1_2 is decision position 1 "A".

Consequently, the decision position "A" is added as an element to the independent reference group.

The residual decision graph reachable from the first decision position "A" of the RTN building block B1_1 thus is:
* "C" * "B" with VRB-I V2_1 to V2_x The element "A" in the RTN building block-independent reference group refers to this residual decision graph, which results in:
"A"-> * "C"* "B"

Figure 3:
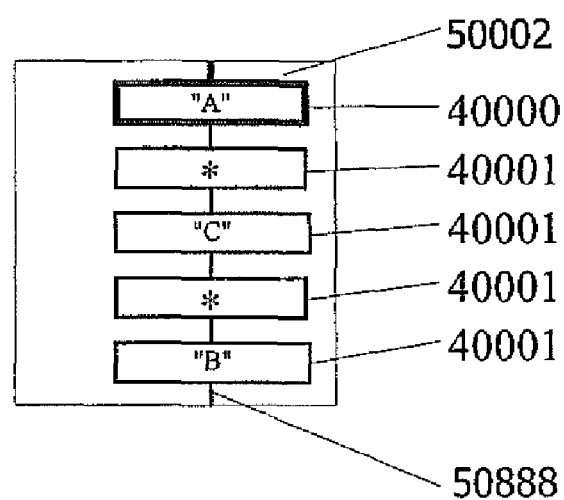

FIG. 3 shows the RTN building block 50002, which is called RTN building block B1_2 above, with an inner, directed decision graph 50888. The only decision position reachable first, keyword "A", is marked with the reference number 40000, all other decision positions that are not reachable first are marked with the reference number 40001.

Decision Graph of RTN Building Block B1_3: "X" ["Y"]

A candidate for the first decision position in this RTN building block B1_3 is the decision position 1 "X".

Consequently, the decision position "X" is added as an element to the independent reference group.

The residual decision graph reachable from the first decision position "X" of the RTN building block B1_3 thus is: ["Y"] with VRB-I V3_1 to V3_x The element "X" in the RTN building block-independent reference group refers to this residual decision graph, which results in:

"X"-> ["Y"]

After the above application of the step for forming reference groups to all of the RTN building blocks given in example 1, the RTN building block-independent reference group contains the following elements with corresponding references to residual decision graphs: (wherein VRB-I=processing-relevant RTN building block information)

| "A" | -> | * "B" * "A" | VRB-I:V1_1 to V1_x |
|---|---|---|---|
| "A" | -> | * "C" * "B" | VRB-I:V2_1 to V2_x |
| "A" | -> | * (1) "D" [(*1)] * | VRB-I:V4_1 to V4_x |
| "A" | -> | "D" [* "E"] | VRB-I:V5_1 to V5_x |
| "V" | -> | "W" * "B" * "A" | VRB-I:V1_1 to V1_x |
| "X" | -> | ["Y"] | VRB-I:V3_1 to V3_x |
| "X" | -> | * "B" | VRB-I:V6_1 to V6_x |
| * | -> | "K" * | VRB-I:V7_1 to V7_x |
| * | -> | "L" * "M" | VRB-I:V8_1 to V8_x |

In order to reduce the number of elements of the RTN building block-independent reference group, equal elements of the RTN building block-independent reference group can be unified to a single element in this reference group by means of a unification step, and the associated, originally several, residual decision graphs independent from each other can be unified to a single residual decision graph by overlaying them.

For the element "A" in the above reference group, which appears four times altogether within the same, after unification to obtain a single element "A" within this RTN building block-independent reference group and forming the optimal residual decision graph by unification via overlaying all individual residual decision graphs, the following new residual decision graph appears for its reference:

"A" -> (* ("B" * "A" | "C" * "B" | (1) "D" [(*1)]*) | "D" [* "E"])

For the element "X" in the above reference group, which appears twice altogether within the same, after unification to obtain a single element "X" within this RTN building block-independent reference group and forming the optimal residual decision graph by unification via overlaying all individual residual decision graphs, the following new residual decision graph appears for its reference:

"X" -> (["Y"] | "B")

The unified residual decision graph of the reference group element "X" has, due to its decision paths, which may only be followed after unsuccessful comparison with the decision position keyword "Y" as well as the * decision position, nevertheless the possibility to leave the RTN building block despite these unsuccessful comparisons. This addition decision path results form the RTN building block B1_3, which has its second and simultaneously last decision position keyword "Y" marked as optional decision position.

Thus, the residual decision graph of the reference group element "X" is again modified, so that the characteristic of optionality applies to the entire logical exclusive OR:

"X" -> [("Y" | * "B")]

This simple further modification leads to a further simplification of the residual decision graph in this and similar cases because now it is definitely checked whether the CAN provision applies for the decision position "Y" or the recursive call function *, and in cases in which the CAN provision does not apply, the RTN building block can be marked as successfully run.

For the element * in the above reference group, which appears twice altogether within the same, after unification to obtain a single element * within this RTN building block-independent reference group and forming the optimal residual decision graph by unification via overlaying all individual residual decision graphs, the following new residual decision graph appears for its reference:

* -> ("K" * | "L" * "M")

Overall, this results in the following RTN building block-independent reference group with respective references for each element to their rest decision graphs:

| "A" | -> | (* ("B" * "A" | "C" * "B" | (1) "D" [(*1)] *) | "D" [* "E"]) |
|---|---|---|
| "V" | -> | "W" * "B" * "A" |
| "X" | -> | [ ("Y" | * "B") ] |
| * | -> | ("K" * | "L" * "M") |

The elements of the reference group as well as the residual decision graphs allocated to them are independent of the RTN building blocks forming them. Nevertheless, the processing-relevant RTN building block information of the RTN building blocks in the nesting resulting from a statement to be analyzed are still required for further processing and especially for the creation of an access plan. This is guaranteed by allocating all processing-relevant RTN building block information of exactly one RTN building block containing this decision position as such to each decision position of the residual decision graph when the above unification step is applied to equal elements of the reference group and its residual decision graphs.

Thus, during analysis of the syntax of the statement to be analyzed, the nesting as well as the associated processing-relevant RTN building information can be used for further processing and thus also for generating an access plan.

For the sake of simplicity, the building block-relevant information V1_1 to V1_x is referred to as V1 in the description below, the building block-relevant information V2_1 to V2_x as V2, etc.

This is shown in the following example with the reference group element "X" with the associated residual decision graph, wherein the element "X" from the reference group before application of the unification is shown again, but with processing-relevant RTN building block information for each decision position:

| "X" | -> | V3 ["Y" V3] | Decision position-containing RTN building block: B1_3 |
|---|---|---|---|
| "X" | -> | * V6 "B" V6 | Decision position-containing RTN building block: B1_6 |

After overlaying these two residual decision graphs of the reference group element "X" the following new residual decision graph with taken on processing-relevant RTN building block information for each decision position results:

"X" -> (V3 ["Y" V3] | * V6 "B" V6)

This results in the following reference group with corresponding references for each element to their residual decision graphs, with all decision positions present in residual decision graphs already having allocated the associated processing-relevant RTN building block information:

"A" →
   (* V1 ("B" V1 * V1 "A" V1 | "C" V2 * V2 "B" V2 | (1) "D"
   V4 [(*1)]*V4) | "D" V5 [* V5 "E" V5])
"V" →
   "W" V1 * V1 "B" V1 * V1 "A" V1
"X" →
   V3[("Y" V3 | * V6 "B" V6)]
* →
   ("K" V7 * V7 | "L" V8 * V8 "M" V8)

Figure 29:
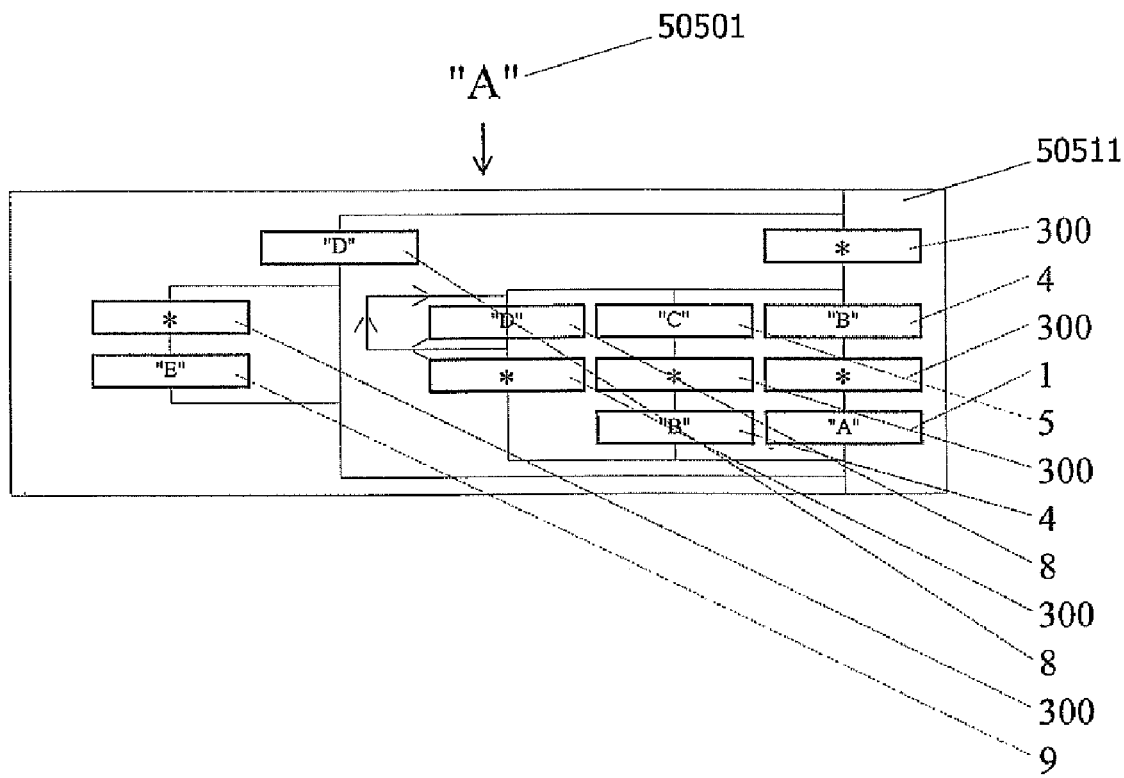
FIGS. 29 to 32 are each schematic representations of a reference group element with the associated residual decision graph according to one embodiment of the inventive method.
Figure 30:
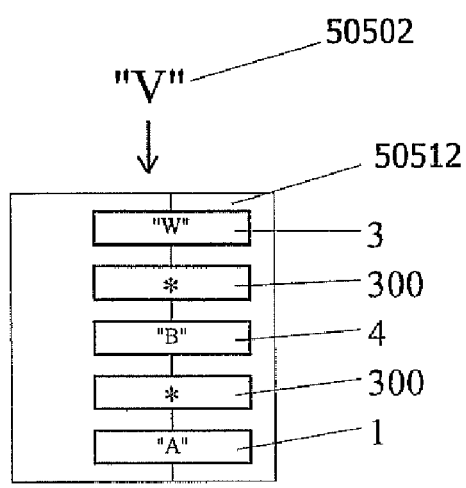
Figure 31:
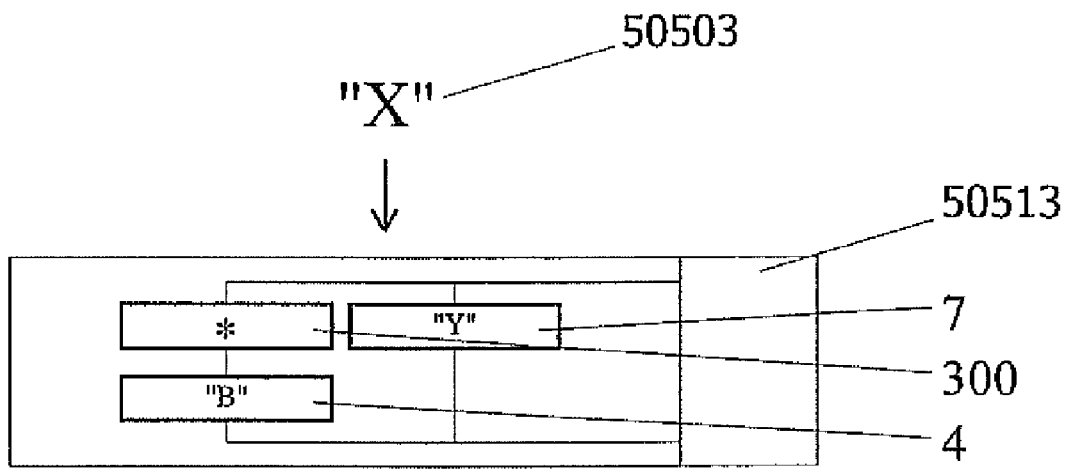
Figure 32:
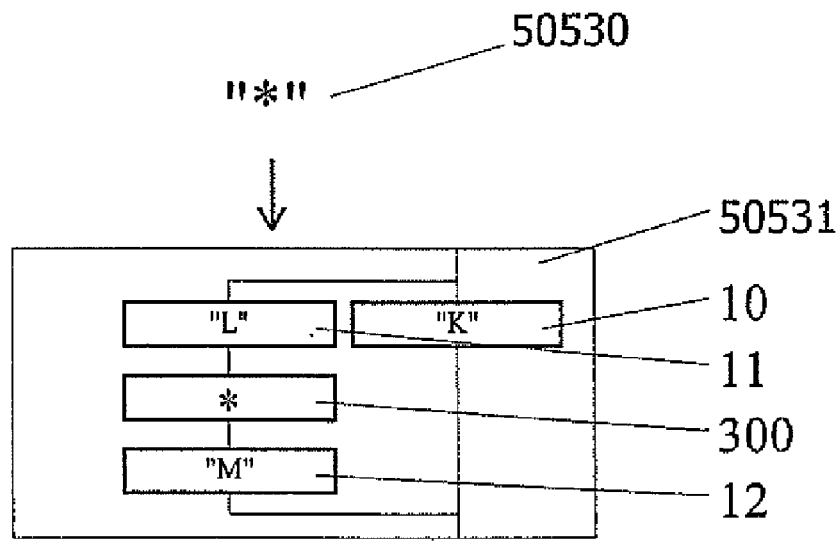
Figure 33:
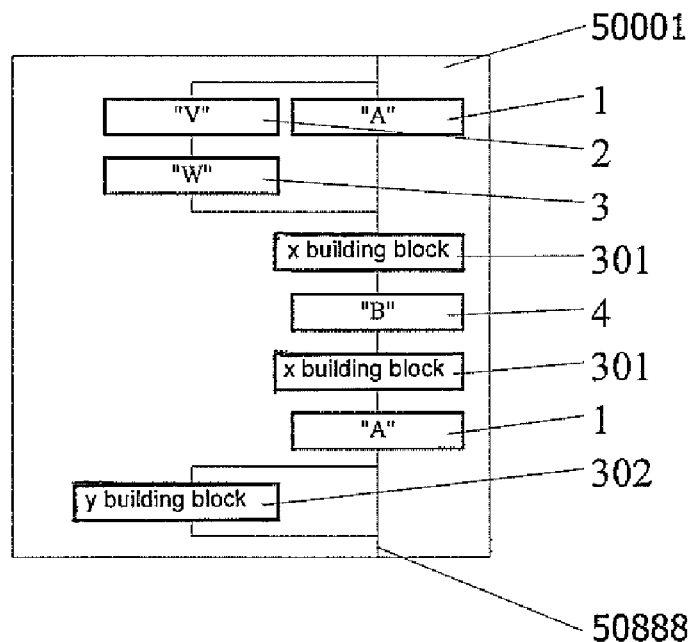
FIGS. 33 to 40 are each schematic representations of an RTN building block according to one embodiment of the inventive method.
Figure 34:
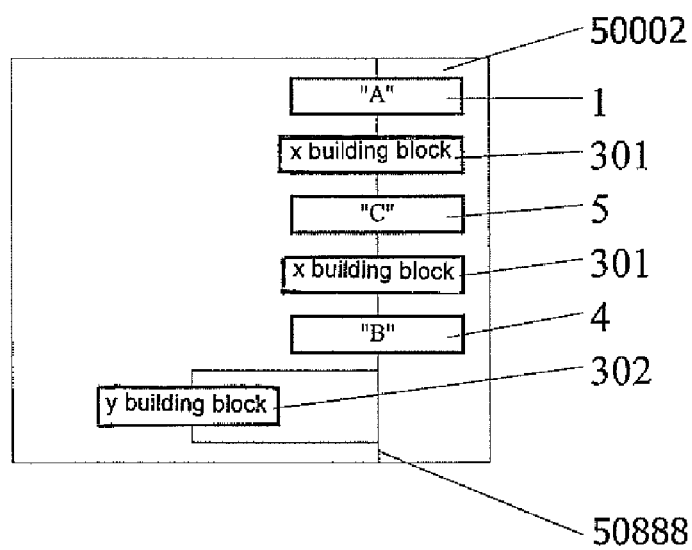
Figure 35:
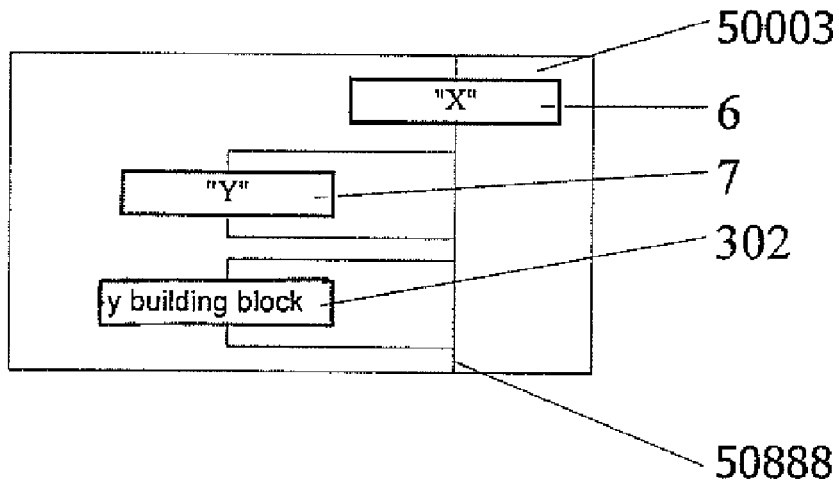
Figure 36:
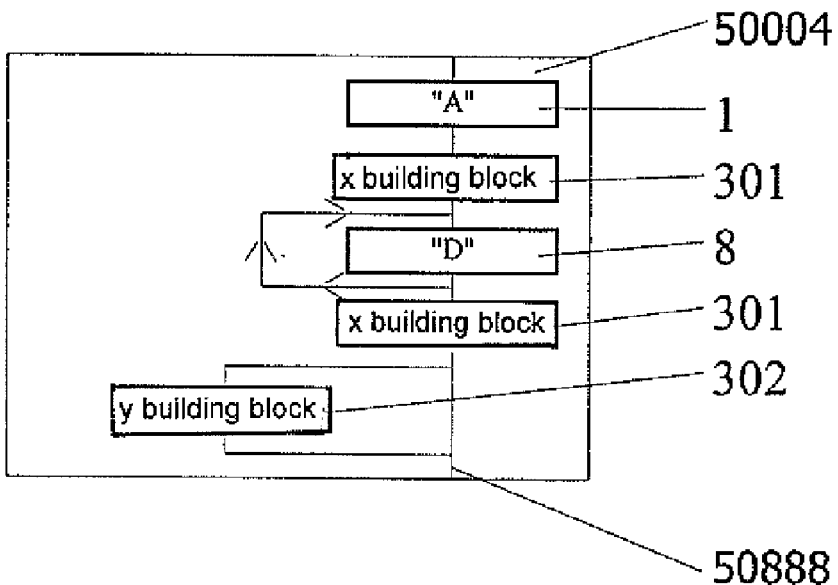
Figure 37:
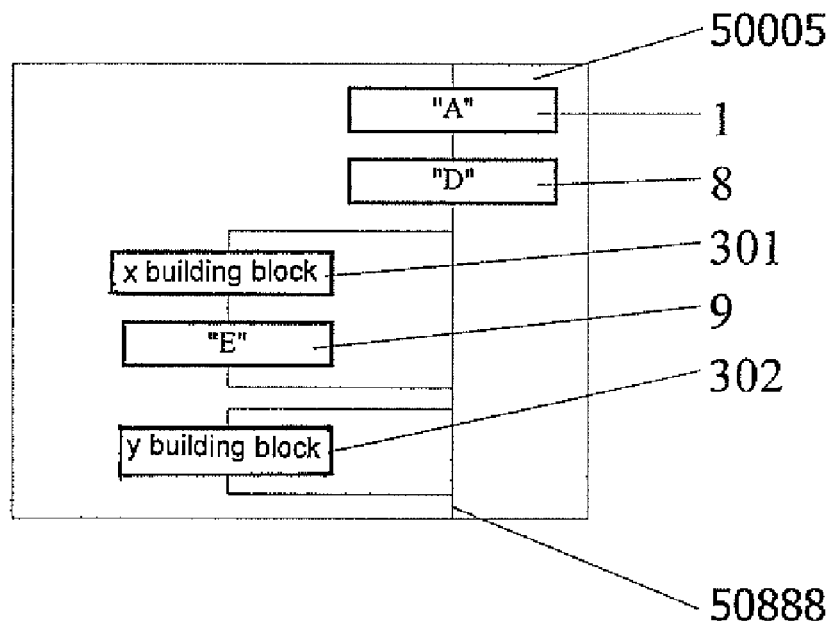
Figure 38:
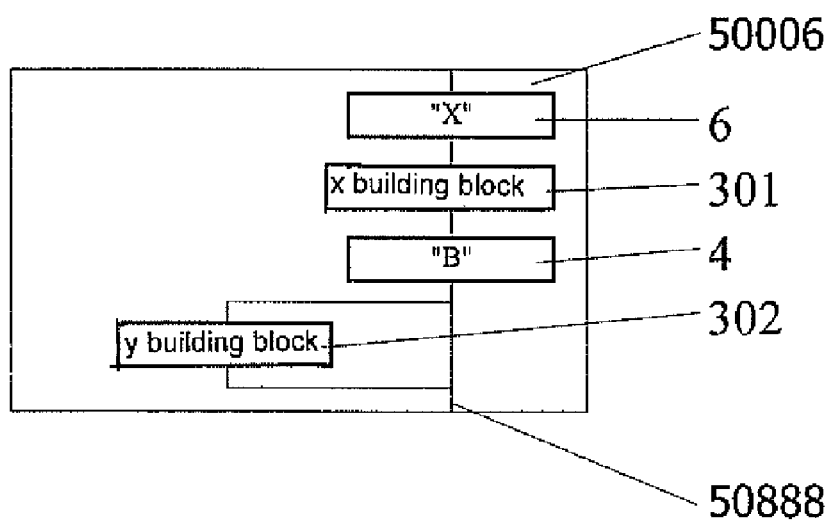
Figure 39:
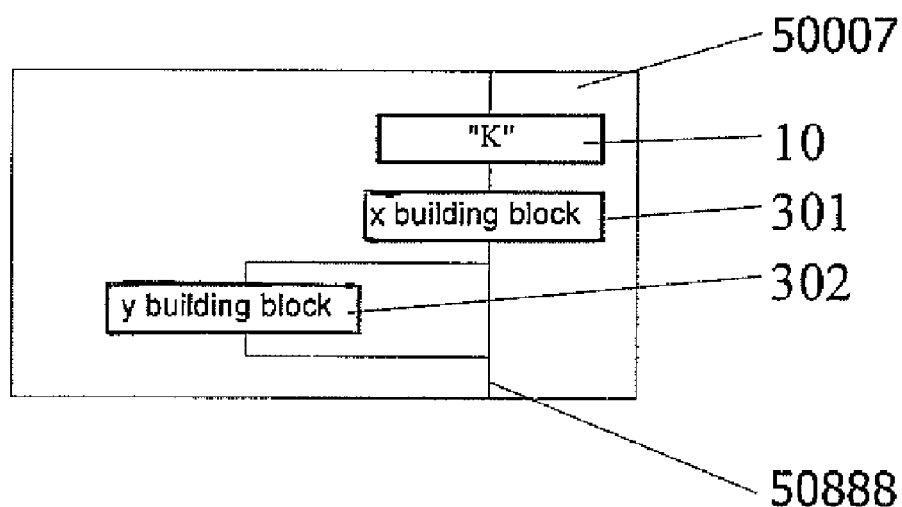
Figure 40:
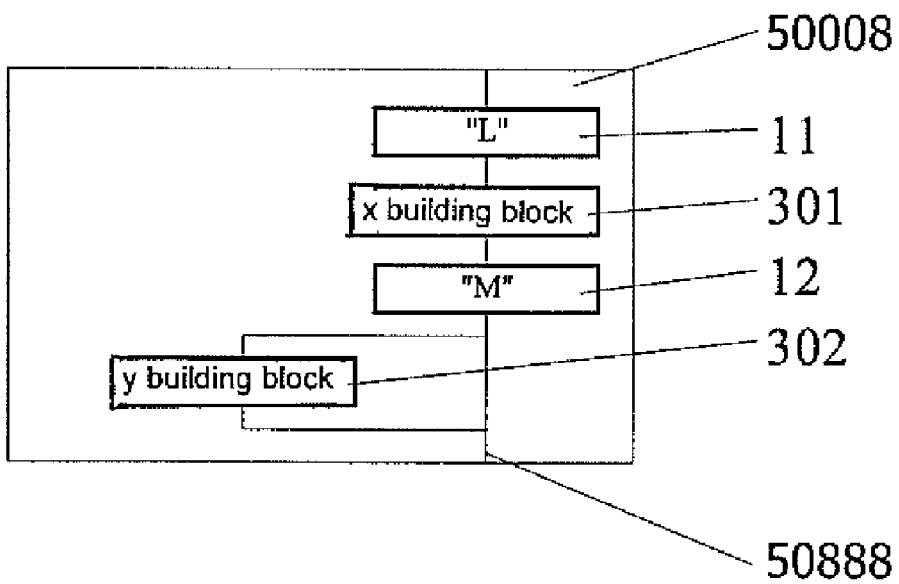

FIG. 29 shows the element "A" of the reference group with the reference number 50501 with the associated unified residual decision graph 50511. Similarly, FIG. 30 shows the element "V" of the reference group with the reference number 50202 with the associated unified residual decision graph 50512. FIG. 31 is a graphical representation of the element "X" of the reference group with the reference number 50503 with the associated unified residual decision graph 50513, and FIG. 32 of the element "*" of the reference group with the reference number 50530 with the unified residual decision graph 50531. For reasons of clarity, all these figures only show the decision positions of the inner, directed residual decision graph without associated processing-relevant RTN building block information.

The reference group element "X" has an optionality stated as a subsequent decision position, insofar as a keyword "X" alone is sufficient to obtain the processing function V3 when identifying the reference group element "X". This mark "processing function v3" is for example found before the first decision position of its residual decision graph to be carried out.

As may be seen from the above example of the reference group elements "A", "X" and "*", the final processing-relevant RTN building block information is sometimes only obtained after a number of decision positions are called depending on a syntax to be analyzed. Basically, the marking of a position, at which a processing-relevant RTN building block information allocated to a decision position is set, is variable and does not limit the invention.

The advantage of a unified, i.e. one that is cleared from duplicates and correspondingly reduced, reference group, lies in a higher analysis speed of a statement.

Processing without the inventive RTN building block-independent reference group could, for example, prescribe that in a selection step, the inner decision graphs of all RTN building blocks are run by means of the keywords, and that all possible paths of these decision graphs are followed until either no match with the chosen path through the decision graph is found and the process is aborted, or the chosen path is run until the end, wherein at least a part of the decision paths has a recursive call function at least one of the decision positions, by which one of the RTN building blocks is run as a result of the application of the selection step to the total of RTN building blocks, so that the selection step may be carried out in a recursively nested mode as often as desired starting from the at least one of the decision positions.

The disadvantage of such a selection step overcome by introducing and applying the inventive reference group refers to the cancellation of a number of potentially unsuccessful runs of decision graphs of the RTN building blocks to be carried out otherwise, since the RTN building block suitable for a certain sequence of keywords of a statement within the plurality of stated RTN building blocks is, in unfavorable cases, found at a middle or even rear position.

The creation of the RTN building block-independent reference group takes place once for an RTN with its associated RTN building blocks and is then generated anew, when at least one of the RTN building blocks of the RTNs changes or when new RTN building blocks are added to the RTN or existing RTN building blocks are removed.

After creating the RTN building block-independent reference group with the allocation of residual decision graphs for the individual elements of the same, a statement to be processed is analyzed and nested by finding and following the elements of the reference group and their residual decision graphs according to the process, so that through the building block-relevant information, an access plan for the relational database system is created in a subsequent step.

According to the process, all keywords of the statement to be processed are run by carrying out a reference execution step for the keyword at the first position of the statement to be processed, in which step the matching keyword is searched in the reference group and, when found, the allocated residual decision graph is followed, so that the respectively subsequent keywords of the statement to be processed are run and all possible decision paths of the allocated residual decision graph are followed until either no match with the chosen decision path is found and the respective reference execution step is aborted, or the chosen decision path is run until the end, wherein at those decision positions of the allocated residual decision graph reached, which cause the execution of a recursive call function, the reference execution step is applied recursively.

With reference to the RTN building blocks B1_1 to B1-8 stated in example 1 and the syntax to be analyzed "A X X B D D D A D" stated in example 2, example 3 shows the inventive analysis of this statement by means of the reference group step by step:

EXAMPLE 3

Syntax to be Analyzed: A(1) X(2) X(3) B(4) D(5) D(6) D(7) A(8) D(9)

Again, the reference group to be used with its elements and with the residual decision positions allocated to these elements, are shown:

"A" -> (* ("B"* "A" | "C" * "B" | (1) "D" [(*1)] *) | "D" [* "E"])
"V" -> "W" * "B" * "A"
"X" -> [("Y" | * "B")]
* -> ("K" * | "L" * "M")

Finding the keyword "A"(1) at the first position in the reference group Element "A" is found in the reference group, thus execution of the reference execution step, also comparison of the subsequent keywords in the statement with the element "A" of the reference group of the allocated residual decision graph.

"A" -> (* ("B" * "A" | "C" * "B" | (1) "D" [(*1)] *) | "D" [* "E"])

The first decision position to be compared in the residual decision graph of the element "A" in the reference group is a * position, i.e. a position requiring a recursive call function, insofar as for a successful comparison at this decision position, an RTN building block from the total of RTN building blocks is to be introduced and run.

The current recursive call order is thus as follows:
1$^{st}$ reference group element: "A"

According to the invention, this means that the keyword "X"(2) following the first keyword "A"(1) in the reference group is searched as recursive call.

The keyword "X"(2) is found in the RTN building block-independent reference group, so that for the current, i.e. subsequent, keyword in the statement "X"(3), the residual decision graph of this element "X" of the reference group is followed.

"X" -> [("Y" | * "B")]

The current recursive call order is thus as follows:
1$^{st}$ reference group element: "A"
2$^{nd}$ reference group element: "X"

The position to be compared in the residual decision graph is: "Y", comparison with the current keyword "X"(3) of the statement is not successful, consequently the second decision path is followed as current residual decision path: * "B"

This first decision position in the current decision path is a * position, i.e. a position requiring a recursive call function, insofar as for a successful comparison at this decision position, an RTN building block from the total of RTN building blocks is to be introduced and run.

The current keyword still unchanged "X"(3) in the statement to be analyzed is thus searched in the reference group. After this keyword "X"(3) is found as an element in the reference group, the residual decision graph for this element "X" of the reference group is followed:

"X" -> [("Y" | * "B")]

The current recursive call order is thus as follows:
1$^{st}$ reference group element: "A"
2$^{nd}$ reference group element: "X"
3$^{rd}$ reference group element: "X"

Following this residual decision graph for the current, i.e. subsequent, keyword "B"(4) in the statement. Comparing the keyword "B"(4) with the decision position "Y" in the residual decision graph. Since the comparison is not successful, the second decision path is followed as current decision path of the residual decision graph.

This first decision position in the current decision path is a * position, i.e. a position requiring a recursive call function, insofar as for a successful comparison at this decision position, an RTN building block from the total of RTN building blocks is to be introduced and run.

The current keyword of the statement to be analyzed "B"(4) is NOT found in the reference group, so that the * position of the current residual decision graph was not carried out successfully and the subsequent decision path is followed as current decision path.

Due to the optionality of OR, the third, current decision path of the residual decision path indicates that this RTN building block has been run successfully by finding the keyword "X"(3) in the reference group.

After the last reference execution step has been carried out successfully, the last recursion is terminated and the further current decision path of the RTN building block, which has called the reference execution step for its * decision position, is followed:

The current recursive call order is thus as follows:
1$^{st}$ reference group element: "A"
2$^{nd}$ reference group element: "X"

The next decision position in the current decision path of the 2$^{nd}$ recursion step requires the keyword "B", which corresponds to the current keyword "B"(4) in the statement to be analyzed.

With the successful comparison with this last position of the current decision path, the * position of the 1$^{st}$ recursion stage was successfully run, which led to the termination of the 2$^{nd}$ recursion stage.

The current recursive call order is thus as follows:
1$^{st}$ reference group element: "A"

The next decision position in the current decision path of the 1$^{st}$ recursion state expects the keyword "B", which is NOT the same as the current keyword "D"(5) of the statement to be analyzed. Thus, the next decision path in the OR is followed, the first decision position of which requires the keyword "C". Since this decision position does also not correspond to the current keyword "D"(5) of the statement to be analyzed, the third decision path in the OR is followed.

This first decision position in the third decision path prescribes the keyword "D", because of the match with the current keyword "D"(5) in the statement to be analyzed, this third decision path in the OR is followed. The next decision position again prescribes the keyword "D", which also corresponds to the current, i.e. subsequent, keyword "D"(6) in the statement to be processed. Further following the current decision path, again the keyword "D" is demanded at the current decision position, which also corresponds to the current, i.e. subsequent, keyword "D"(7) in the statement to be processed.

Again, the next decision position in the current decision path of the 1$^{st}$ recursion stage is followed, which again prescribes the keyword "D", this decision position now does corresponding to the current, i.e. subsequent, keyword "A"(8) of the statement to be analyzed anymore. When the comparison with the decision position prescribing the keyword "D" is not successful, there is an alternative decision position that can be reached, i.e. the decision position *, also a position demanding a recursive call function, which means that for a successful comparison at this decision position, an RTN building block from the total of RTN building blocks is to be introduced and run.

The still unchanged current keyword "A"(8) in the statement to be analyzed is thus searched in the reference group. After this keyword "A"(8) is found as element in the reference group, the residual decision graph for this element "A" of the reference group is followed:

The current recursive call order is thus as follows:
1$^{st}$ reference group element: "A"
2$^{nd}$ reference group element: "A"

The first decision position of the 2$^{nd}$ recursion step demands a * position, i.e. a position requiring a recursive call function, insofar as for a successful comparison at this decision position, an RTN building block from the total of RTN building blocks is to be introduced and run.

The current, i.e. subsequent, keyword "D"(9) of the statement to be analyzed is not found in the reference group, which means that the comparison for the current * decision position was not carried out successfully. Consequently, the second decision path of the residual decision path of the 2$^{nd}$ recursion stage is followed, the first decision position of which demands the keyword "D". After the successful comparison of this decision position with the current keyword "D"(9), the end of the statement is determined just like the successful run of the 2$^{nd}$ as well as subsequently the 1$^{st}$ recursive recursion stage.

After completion of the analysis of the statement to be processed via the reference group and its residual decision graph, the following nested result is obtained for example 3:

| "A" *(B1) "D" "D" "D" *(B3) | processing-relevant RTN building block information V4 |
|---|---|
| (B1): "X" *(B2) "B" | processing-relevant RTN building block information V6 |
| (B2): "X" | processing-relevant RTN building block information V3 |
| (B3): "A" "D" | processing-relevant RTN building block information V5 |

By definition, RTN building blocks are admitted that contain a * decision position at the first decision position of their inner decision graph, i.e. a decision position prescribing the introduction and running of one of the RTN building blocks from the total of RTN building blocks.

If a statement is given that does not contain any RTN building blocks with a * decision position as first decision position, the order of the keywords given in the statement must correspond to the order of the keywords in the resulting RTN building block nesting by means of RTN building blocks introduced at * decision positions.

This is shown in the following simple example using RTN building blocks that are described further below.:

Given statement: (1)[(2)WHERE (3)((4)A (5)) (6)SELECT (7)B (8)]

For further processing of the RTN building block nesting to be used, which is created based on the above statement:

| (1)[ | * | * | (8)] |
|---|---|---|---|
| | (2)WHERE | * | |
| | | (3)( | * | (5)) |
| | | | (4)A | |
| | (6)SELECT | * | |
| | | (7)B | | |

The common special characteristic of all RTN building blocks beginning with a * decision position at the first position is that their first decision position cannot be directly evaluated without conversion, since an RTN building block is introduced at exactly this first decision position marked as * decision position, into which, however, a nesting of RTN building blocks that may be repeated as often as desired can be introduced because of the recursive call function.

This means that in a given statement, RTN building blocks from the total of RTN building blocks are identified corresponding to the keywords, and their inner, directed decision graph is followed, however, after completion of one of the identified RTN building blocks, a subsequent keyword may be present in the given statement, which is to call an RTN building block with a * decision position at the first position, which could not be identified before.

Given statement: (1)A (2)+ (3)B (4)= (5)C

After the first keyword of the statement (1)A has successfully run through a presumably simplest RTN building block with only one decision position keyword "A", the next keyword (2)= in the stated syntax is found. There is no RTN building block beginning with the first decision position keyword "=", but there is an RTN building block with the RTN syntax * "=" *. The keyword "=", however, can only be evaluated when the first decision position * of this RTN building block can be temporarily skipped or removed.

For the statement given above, the following nesting based on the stated RTN building blocks, exactly two of which have a * decision position at the first position in this case, is to be created:

| | * | (4)= | * | |
|---|---|---|---|---|
| | | * | (2)+ | * |
| | | | (1)A | |
| | | | (3)B | |
| | (5)C | | | |

In order to enable determining and nesting the used RTN building blocks with their processing-relevant RTN building block information by means of an algorithm in each statement, the use of a conversion step before processing the statement to be analyzed is necessary, in order to divide up the RTN building blocks into two generic groups and to note down the corresponding generic group for each RTN building block for the further processing as part of the processing-relevant RNT building block information.

After a presetting step, in which the RTN building blocks are defined, each RTN building block is allocated to either a first or a second generic group in a conversion step before execution of the reference group-forming step and thus also before the analysis of a given statement, wherein the RTN building blocks starting with a text, a symbol, a variable or a number as decision position reachable first are allocated to the first generic group and converted so that the decision positions containing a recursive call function, which prescribes the introduction and running of one of the RTN building blocks from the total of defined RTN building blocks, are limited to limiting the introduction and running to only one RTN building block of the first generic group, and the RTN building blocks that start with a recursive call function as decision position reachable first are allocated to the second generic group and converted so that the first decision position is removed and the decision positions that contain a recursive call function, which prescribes the introduction and running of one of the RTN building blocks from the total of defined RTN building blocks, are limited to limiting the introduction and running to only one RTN building block of the first generic group, and to all RTN building blocks of the first generic group and those RTN building blocks of the second generic group that end with a text, a symbol, a variable or a number at the last decision position, an optionally executable decision position is added at the last position, at which the introduction and running of an RTN building block of the second generic group is prescribed.

As an example, the conversion of an RTN building block without * decision position as first decision position in the inner decision graph of the RTN building block, as stated in example 1, is shown:

RTN Building Block B1_2:

"A" * "C" * "B"

Allocation to first generic group -> converted RTN syntax:

"A" RTN building block of first generic group "C" RTN building block of first generic group "B" [RTN building block of second generic group]

As an example, the conversion of an RTN building block with * decision position as first decision position and with * decision position as last decision position in the inner decision graph of the RTN building block is shown:

RTN Building Block B1_7:

* "K" *

Allocation to second generic group -> converted RTN syntax:

"K" RTN building block of first generic group

As an example, the conversion of an RTN building block with * decision position as first decision position and without * decision position as last decision position in the inner decision graph of the RTN building block is shown:

RTN Building Block B1_8:

* "L" * "M"

allocation to second generic group -> converted RTN syntax:

"L" RTN building block of first generic group "M" [RTN building block of second generic group]

FIGS. 33, 34 to 40 show the RTN building blocks B1_1 (50001), B1_2 (50002) to B1_8 (50008) with an inner, directed decision graph 50888 each, as results from each RTN building block after the conversion step shown above. The * decision position 300 converted at the decision positions in question, which now prescribes the introduction and running of an RTN building block from the total of RTN building blocks of the first generic group, is marked in all figures as X building block and the respective decision position number and thus with the reference number 301. All decision positions RTN building block of second group optionally added to decision positions are marked in the figures as Y building block and the decision position number and thus the reference number 302.

This conversion step guarantees that each given statement can be broken down into RTN building blocks with algorithms according to the state of the art, i.e. that the full flexibility of the RTN building blocks can be utilized when formulating queries.

After this conversion step, each RTN building block must, after allocation to one of the generic groups and corresponding conversion of its inner, directed decision graph exclusively begin with at least one text, at least one symbol, at least von variable or at least one number, and the recursive call function, which prescribed the introduction and running of one of the RTN building blocks from the previous total of defined RTN building blocks, now prescribes the introduction and running of an RTN building block either only from the total of RTN building blocks of the first generic group or only from the total of RTN building blocks of the second generic group.

Furthermore, after this conversion step, RTN building blocks of the second generic group are optionally called only at the last decision position of one of the decision graphs of an RTN building block.

The conversion for the present RTN building blocks carried out during allocation to the generic groups has an influence on the allocation of the elements to the RTN building block-independent reference group, insofar as the RTN building block-independent reference group is divided into a first RTN building block-independent reference subgroup and a second RTN building block-independent reference subgroup, wherein the decision positions reachable first within the decision graphs of all RTN building blocks of the first generic group of the first RTN building block-independent reference subgroup are allocated as their elements with associated residual decision graphs resulting after the conversion step, and the decision positions reachable first within the decision graphs of all RTN building blocks of the second generic group of the second RTN building block-independent reference subgroup are allocated as their elements with resulting associated residual decision graphs.

This division into reference subgroups is carried out to enable an easier processing of the * decision positions at the first position.

Furthermore, with these two newly introduced reference subgroups, the isomorphism between the RTN building blocks allocated to the two generic groups and correspondingly converted and the reference group is guaranteed, so that an algorithmic analysis by means of the reference groups can be carried out easily as well.

For the RTN building blocks from example 1, this leads to the following RTN building block-independent reference group with the following elements in the first reference subgroup with unchanged processing-relevant RTN building block information for each decision position:

EXAMPLE 4

Elements of the First Reference Subgroup:
"A" ->
(RTN building block of the first generic group V1 ("B" V1 RTN building block of the first generic group V1 "A" V1 | "C" V2 RTN building block of the first generic group V2 "B" V2 | (1) "D" V4 [(*1)] RTN building block of the first generic group V4) | "D" V5 [RTN building block of the first generic group V5 "E" V5]) [RTN building block of the second generic group]

"V" ->
"W" V1 RTN building block of the first generic group V1 "B" V1 RTN building block of the first generic group V1 "A" V1 [RTN building block of the second generic group]

"X" ->
V3 [("Y" V3 | RTN building block of the first generic group V6 "B" V6)] [RTN building block of the second generic group]

For the RTN building blocks from example 1, this leads to the following RTN building block-independent reference group with the following elements in the second reference subgroup with unchanged building block-relevant information for each decision position:

"K" ->
RTN building block of the first generic group V7

"L" ->
RTN building block of the first generic group V8 "M" RTN building block of the first generic group V8 [RTN building block of the second generic group]

Figure 41:
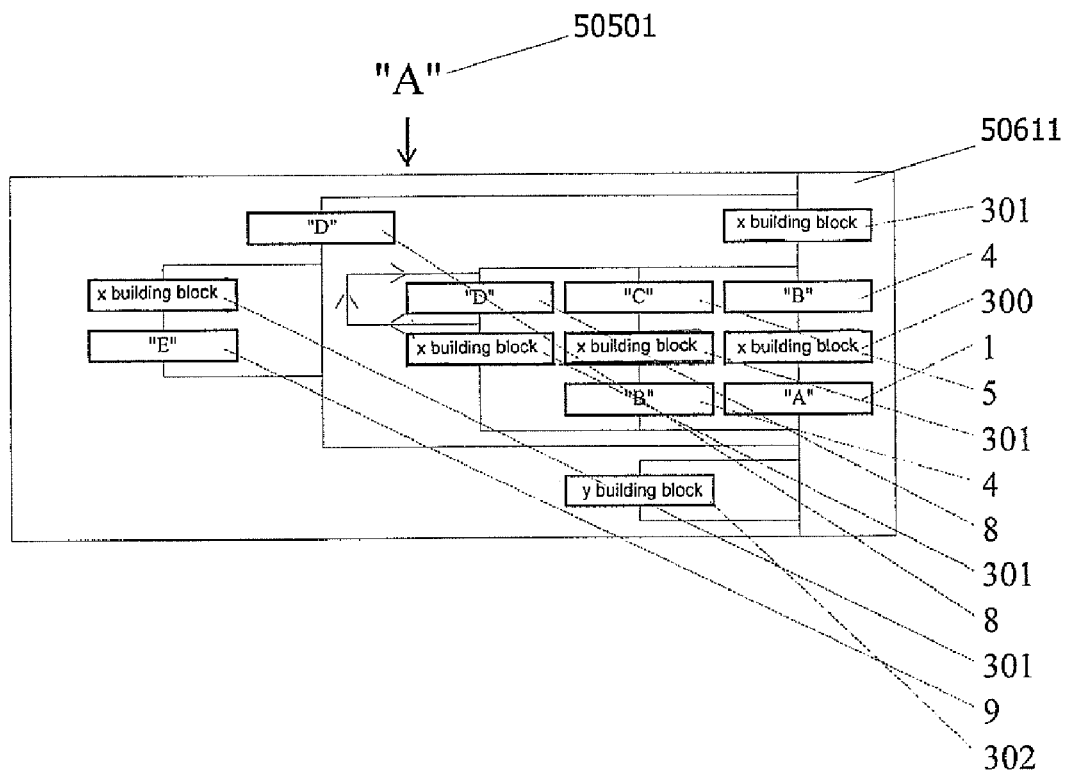
FIGS. 41 to 45 are each schematic representations of a reference group element with the associated residual decision graph according to one embodiment of the inventive method.
Figure 42:
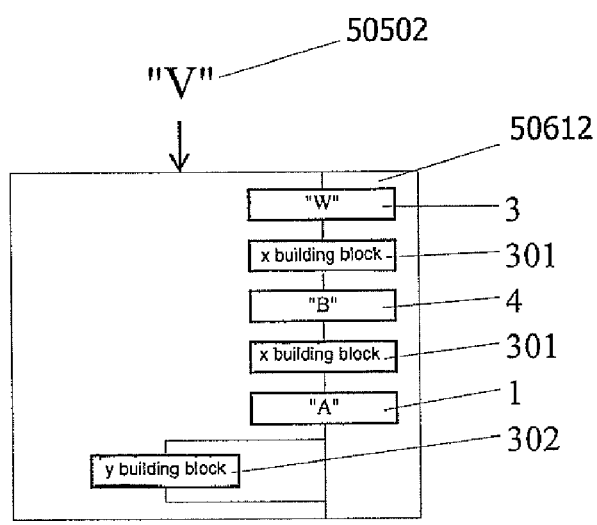
Figure 43:
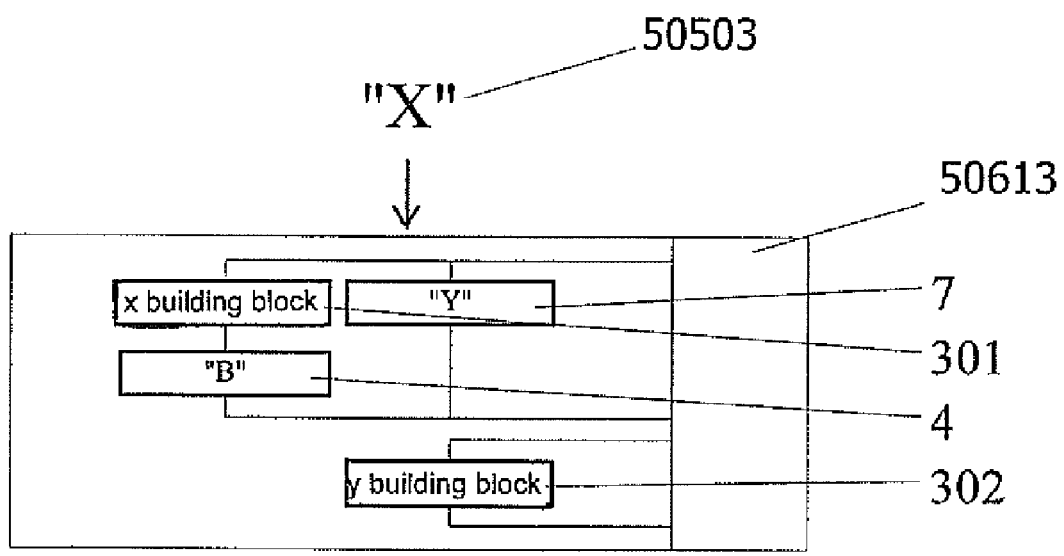
Figure 44:
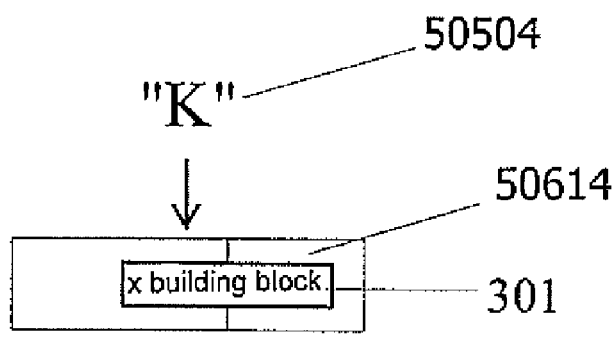
Figure 45:
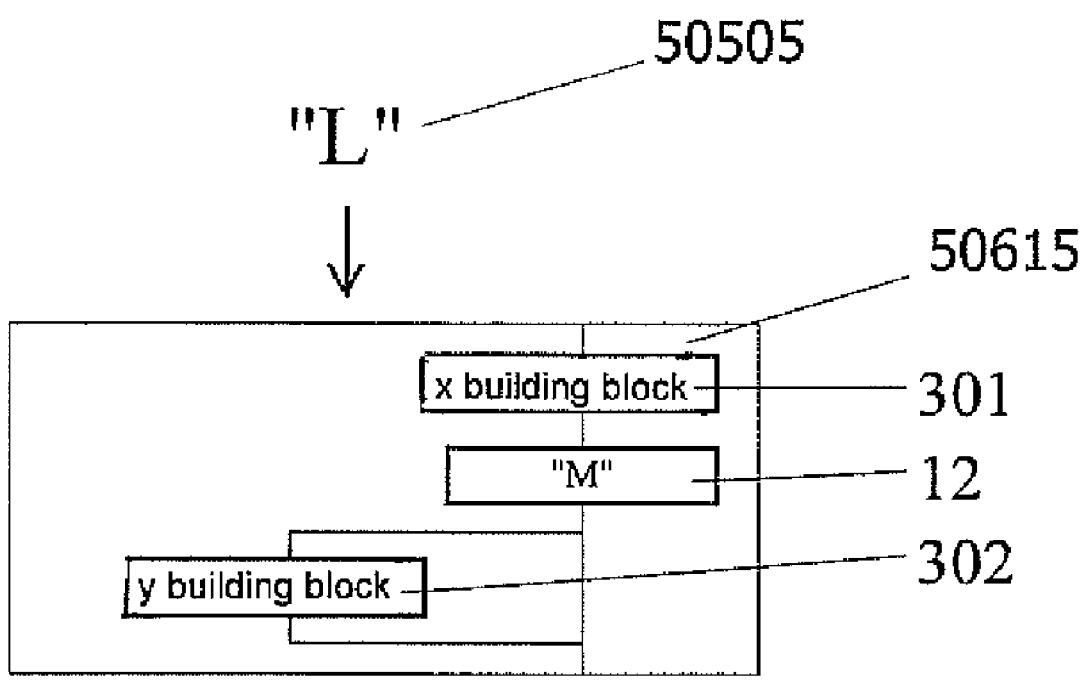

FIG. 41 shows the element "A" (reference number 50501) of the first reference group with the associated residual decision graph 50611 resulting after the conversion step. By analogy, the FIGS. 42 and 43 show the elements "V" (reference number 50502) and "X" (50503) of the first reference subgroup with the corresponding residual decision graphs 50612 and 50613. Similarly, the FIGS. 44 and 45 show the elements "K" (reference number 50503) and "L" (reference number 50504) of the second reference group with their associated residual decision graphs 50614 and 50615.

If at a decision position of a residual decision graph, which prescribes the introduction and running of an RTN building block from the total of RTN building blocks of the first generic group, the keyword to be seeked is not searched as an element in a single reference group anymore, but only as an element in the first reference subgroup, then the residual decision graph allocated thereto is followed when it is found.

Similarly, at a decision position of a residual decision graph, which prescribes the introduction and running of an RTN building block from the total of RTN building blocks of the second generic group, the keyword to be seeked is searched as an element in the second reference subgroup, and the residual decision graph allocated thereto is followed when it is found.

A further example shows the analysis of a statement by using the first and second reference subgroup as resulting after the inventive use of the conversion step to the RTN building blocks defined independently in example 1:

EXAMPLE 5

Syntax to be Analyzed: A(1) D(2) X(3) Y(4) L(5) X(6) K(7) A(8) D(9) M(10) E(11)

The first and second reference subgroup shown in example 4 is used with the respective residual decision graph allocated to each of their elements.

Finding the keyword "A"(1) at the first position in the first reference subgroup. Element "A" is found in the first reference subgroup, so that the reference execution step is carried out, and the subsequent keywords in the statement are compared with the residual decision graph allocated to the element "A" in the first reference subgroup.

The first decision position to be compared in the residual decision graph of the element "A" in the first reference subgroup is RTN building block of the first generic group, i.e. a decision group requiring a recursive call function, insofar as an RTN building block from the total of RTN building blocks of the first generic group is to be introduced and run for a successful comparison at this decision position.

The current recursive call order thus is as follows:
1$^{st}$ element of the first reference subgroup: "A"

According to the invention, this means that in the statement the current, i.e. subsequent to the keyword "A"(1), keyword "D"(2) is searched in the first reference subgroup as recursive call.

The keyword "D"(2) is not found in the RTN building block-independent first reference subgroup, so that the second possible decision path of the residual decision graph of the current element "A" of the first reference subgroup is followed.

The next decision position requires the keyword "D", which corresponds to the current keyword "D"(2). Thus, for the current, i.e. subsequent, keyword in the statement "X"(3), the current decision path of the residual decision graph of this element "A" from the first reference subgroup is followed.

This subsequent decision position to be compared in the residual decision graph is: RTN building block of the first generic group, i.e. a decision position requiring a recursive call function, insofar as for a successful comparison at this decision position, an RTN building block from the total of RTN building blocks of the first generic group is to be introduced and run.

The current keyword "X"(3) is thus searched as element in the first reference subgroup and found therein.

The current recursive call order is thus as follows:
1$^{st}$ element of the first reference subgroup: "A"
  2$^{nd}$ element of the first reference subgroup: "X"

The current, i.e. subsequent, keyword in the statement to be analyzed "Y"(4) is thus successfully compared with the first decision position of the residual decision graph of the first reference group element "X", insofar as this first decision position of the residual decision graph prescribes the keyword "Y".

Due to the conversion step, which, according to the invention, allocates all RTN building blocks to a first or second generic group, respectively, and adds a further optional decision position RTN building block of the second generic group, which follows each last decision position of the inner, directed decision graph, to certain ones of these RTN building blocks, each previously last decision position of all residual decision graphs of elements of the first reference subgroup are followed by an optional decision position RTN building block of the second generic group.

This next decision position RTN building block of the second generic group in the residual decision graph of the current first reference subgroup element "X" requires the recursive call function, insofar as for a successful comparison at this decision position, an RTN building block from the total of RTN building blocks of the second generic group is to be introduced and run.

The current, i.e. subsequent, keyword "L"(5) of the statement to be analyzed is thus searched in the second reference subgroup and found there as an element.

The current recursive call order thus is as follows:
1$^{st}$ element of the first reference subgroup: "A"
  2$^{nd}$ element of the first reference subgroup: "X"
    3$^{rd}$ element of the second reference subgroup: "L"

The first decision position of the residual decision graph of this element "L" of the second reference subgroup prescribes an RTN building block of the first generic group.

The current, i.e. subsequent, keyword "X"(6) in the statement to be analyzed is, because of the required recursive call function for an RTN building block of the first generic group, searched in the first reference subgroup and found there.

The current recursive call order thus is as follows:
1$^{st}$ element of the first reference subgroup: "A"
  2$^{nd}$ element of the first reference subgroup: "X"
    3$^{rd}$ element of the second reference subgroup: "L"
      4$^{th}$ element of the first reference subgroup: "X"

The current keyword "K"(7) is compared with the residual decision graph of this first reference subgroup element "X" to find possibly matching decision positions. However, neither may the first decision position keyword "Y" of the first possible decision path be followed, nor may the first decision position RTN building block of the first generic group of the second possible decision path be introduced successfully, since the current keyword "K"(7) is not identified as an element of the first reference subgroup.

The possible third decision path of this residual decision graph for the element "X" of the first reference subgroup optionally prescribes a decision position RTN building block of the second generic group. The still unchanged current keyword "K"(7) is thus, in compliance with this first decision position RTN building block of the second generic group of the third possible decision path, subsequently successfully searched in the second reference subgroup.

The current recursive call order thus is as follows:
1$^{st}$ element of the first reference subgroup: "A"
  2$^{nd}$ element of the first reference subgroup: "X"
    3$^{rd}$ element of the second reference subgroup: "L"
      4$^{th}$ element of the first reference subgroup: "X"
        5$^{th}$ element of the second reference subgroup: "K"

The resulting current decision position is the first decision position of the residual decision graph of the element "K" in the second reference subgroup, i.e. RTN building block of the first generic group.

The subsequent current keyword "A"(8) is consequently searched as an element in the first reference subgroup, and since it is found therein, the residual decision graph of the element "A" of the first reference subgroup is followed in the recursion stage.

The current recursive call order thus is as follows:
1$^{st}$ element of the first reference subgroup: "A"
  2$^{nd}$ element of the first reference subgroup: "X"
    3$^{rd}$ element of the second reference subgroup: "L"
      4$^{th}$ element of the first reference subgroup: "X"
        5$^{th}$ element of the second reference subgroup: "K"
          6$^{th}$ element of the first reference subgroup: "A"

The subsequent current keyword "D"(9) is unsuccessfully compared with the first decision position of the residual decision graph of the first reference subgroup element "A" in the 6$^{th}$ recursion stage because this first decision position requires an RTN building block of the first generic group, the current keyword "D"(9), however, is not found as an element in the first reference subgroup.

The second possible decision path of the first reference subgroup element "A" requires the keyword "D", which corresponds to the current keyword "D"(9).

The current decision path following this decision position "D" prescribes an RTN building block of the first generic group as subsequent decision position, which, however, cannot be successfully introduced for the subsequent current keyword "M"(10), since the current keyword "M"(10) is not found as an element in the first reference subgroup.

The subsequent possible decision position, which follows after the decision position keyword "D" of the current decision path of the element "A" of the first reference subgroup, is the optional decision position RTN building block of the second generic group. Since the keyword "M" is not found as an element in the second reference subgroup either and this last decision position is optional, the residual decision graph of this element "A" of the first reference subgroup is regarded as having run successfully. Consequently, the recursion for this first reference subgroup element "A" is terminated, and the next decision position of the residual decision graph of the now 5$^{th}$ recursion stage is used for further following the decision positions.

The current recursive call order thus is as follows:
1$^{st}$ element of the first reference subgroup: "A"
  2$^{nd}$ element of the first reference subgroup: "X"
    3$^{rd}$ element of the second reference subgroup: "L"
      4$^{th}$ element of the first reference subgroup: "X"
        5$^{th}$ element of the second reference subgroup: "K"

The residual decision graph of this second reference group element "K" is completed with the successful introduction and running of an RTN building block of the first generic group, since, according to the process, no optional decision position RTN building block of the second generic group was added to this residual decision graph during the conversion step.

The current recursive call order thus is as follows:
1$^{st}$ element of the first reference subgroup: "A"
  2$^{nd}$ element of the first reference subgroup: "X"
    3$^{rd}$ element of the second reference subgroup: "L"
      4$^{th}$ element of the first reference subgroup: "X"

The residual decision graph of the first reference group element "X" is successfully completed with the introduction and running of an RTN building block of the second generic group.

The current recursive call order thus is as follows:
1$^{st}$ element of the first reference subgroup: "A"
  2$^{nd}$ element of the first reference subgroup: "X"
    3$^{rd}$ element of the second reference subgroup: "L"

After an RTN building block of the first generic group has been successfully introduced at the corresponding decision position in the residual decision graph of the second reference group element "L", the subsequent decision position keyword "M" of the same current residual decision graph, which follows after this decision position RTN building block of the first generic group, is entered. This decision position keyword "M" is compared positively, since it corresponds to the current keyword "M"(10). Consequently, the optional decision position RTN building block of the second generic group for the residual decision graph of this element "L" of the second reference subgroup, which is added at the last decision position according to the invention, is checked for the subsequent current keyword "E"(11), which, however, is not found as an element of the second reference subgroup. This negative comparison for this decision position terminates the 3$^{rd}$ recursion stage positively, since this added decision position is only optional.

The current recursive call order thus is as follows:
1$^{st}$ element of the first reference subgroup: "A"
  2$^{nd}$ element of the first reference subgroup: "X"

When the residual decision path of the first reference group element "X" in the 2$^{nd}$ recursion stage has also reached the last, optional decision position RTN building block of the second generic group that had been newly added according to the procedure, and the comparison had previously been carried out negatively, this 2$^{nd}$ recursion stage is completed positively as well.

The current recursive call order thus is as follows:
1$^{st}$ element of the first reference subgroup: "A"

The last residual decision path still open expects the keyword "E" at its subsequent prescribed decision position, which corresponds to the still unchanged current keyword "E"(11).

When the last keyword of the statement has been thus analyzed and the last decision position in the 1$^{st}$ recursion stage has been reached, i.e. when no further recursion stages are open, the statement has been run successfully, and a possible access plan may now be created based on the processing-relevant building block information, which creation, however, is beyond the scope of this example.

The completed nesting of this example 5 is as follows for the RTN building blocks as given in example 1, wherein the plurality of processing-relevant RTN building block information of the individual RTN building blocks is unified to "VRB-I x" in the following.

| | |
|---|---|
| "A" "D" RTN building block of the first generic group (B1) "E" | VRB-I 5 |
|   (B1): "X" "Y" RTN building block of the second generic group (B2) | VRB-I 3 |
|     (B2): "L"RTN building block of the first generic group (B3) "M" | VRB-I 8 |
|       (B3): "X"RTN building block of the second generic group (B4) | VRB-I 3 |
|         (B4): "K"RTN building block of the first generic group (B5) | VRB-I 7 |
|           (B5): "A" "D" | VRB-I 5 |

Figure 48:
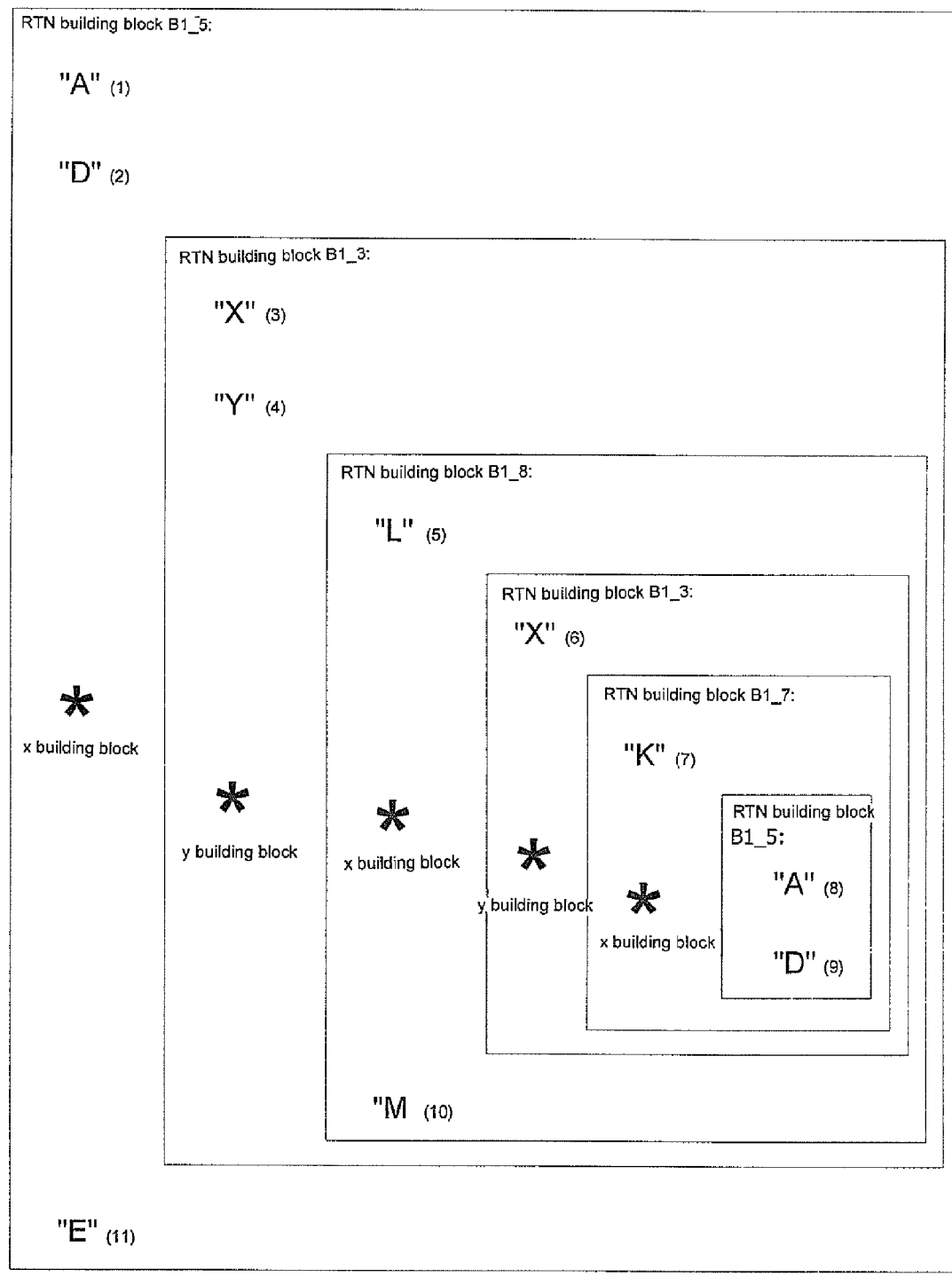
FIGS. 48 and 49 are each schematic representations of the nesting of RTN building blocks according to one embodiment of the inventive method.
Figure 49:
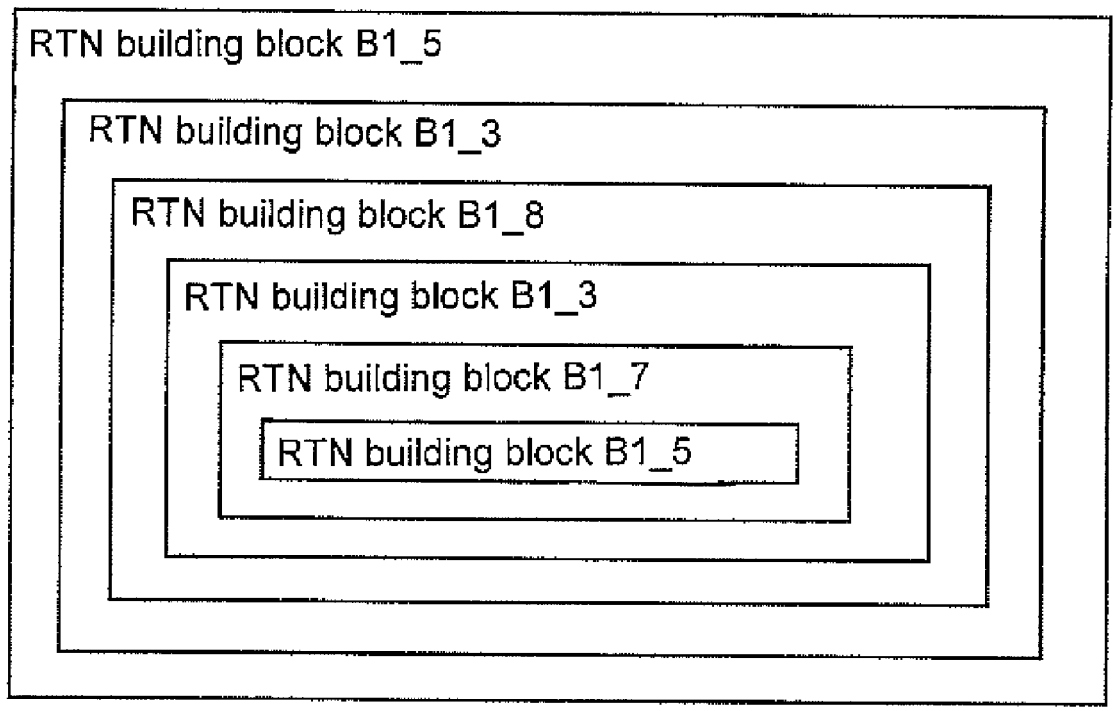

FIG. 48 shows the completely nested example 5 with keyword decision positions and * decision positions. FIG. 49 shows the completely nested example 5 without keyword decision positions and * decision positions.

For optimizing reasons, in those cases in which a decision position requires an RTN building block of the first generic group, which is, however, not successfully identified for the current keyword, the search process may be marked as unsuccessful with directly subsequent decision positions, which also optionally require the RTN building block of the first generic group, since the search process for the current, in this case unchanged, keyword was already unsuccessful at least once. By analogy, this is also true for decision positions RTN building block of the second generic group, which case happens often, insofar as at least to a certain number of the defined RTN building blocks, an optional decision position RTN building block of the second generic group is added according to the process, and these decision position may be checked several times in a row in the case of recursive nestings.

In order to allow an automatic analysis of all given statements, the use of the conversion step, which allocates the RTN building blocks of a first or second generic group, is required so that none of the RTN building blocks starts with a recursive call function.

If, however, the keyword-wise processing of a given statement is carried out via the first and second reference subgroup to be used after the conversion step, an incorrect nesting with regard to the RTN building blocks and thus a wrong nesting of the processing-relevant RTN building block information allocated to the RTN building blocks is obtained.

Thus, the desired nesting of the statement given in example 5 with regard to the RTN building blocks defined in example 1 should give the following final result, after which further processing steps can be carried out through the processing-relevant RTN building block information:

| | |
|---|---|
| "A" "D" *(B1) "E" | VRB-I 5 |
|   (B1): *(B2) "L" *(B3) "M" | VRB-I 8 |

| | | |
|---|---|---|
| (B2): "X" "Y" | VRB-I 3 | |
| (B3): *(B4) "K" *(B5) | VRB-I 7 | |
| (B4): "X" | VRB-I 3 | |
| (B5): "A" "D" | VRB-I 5 | |

Figure 50:
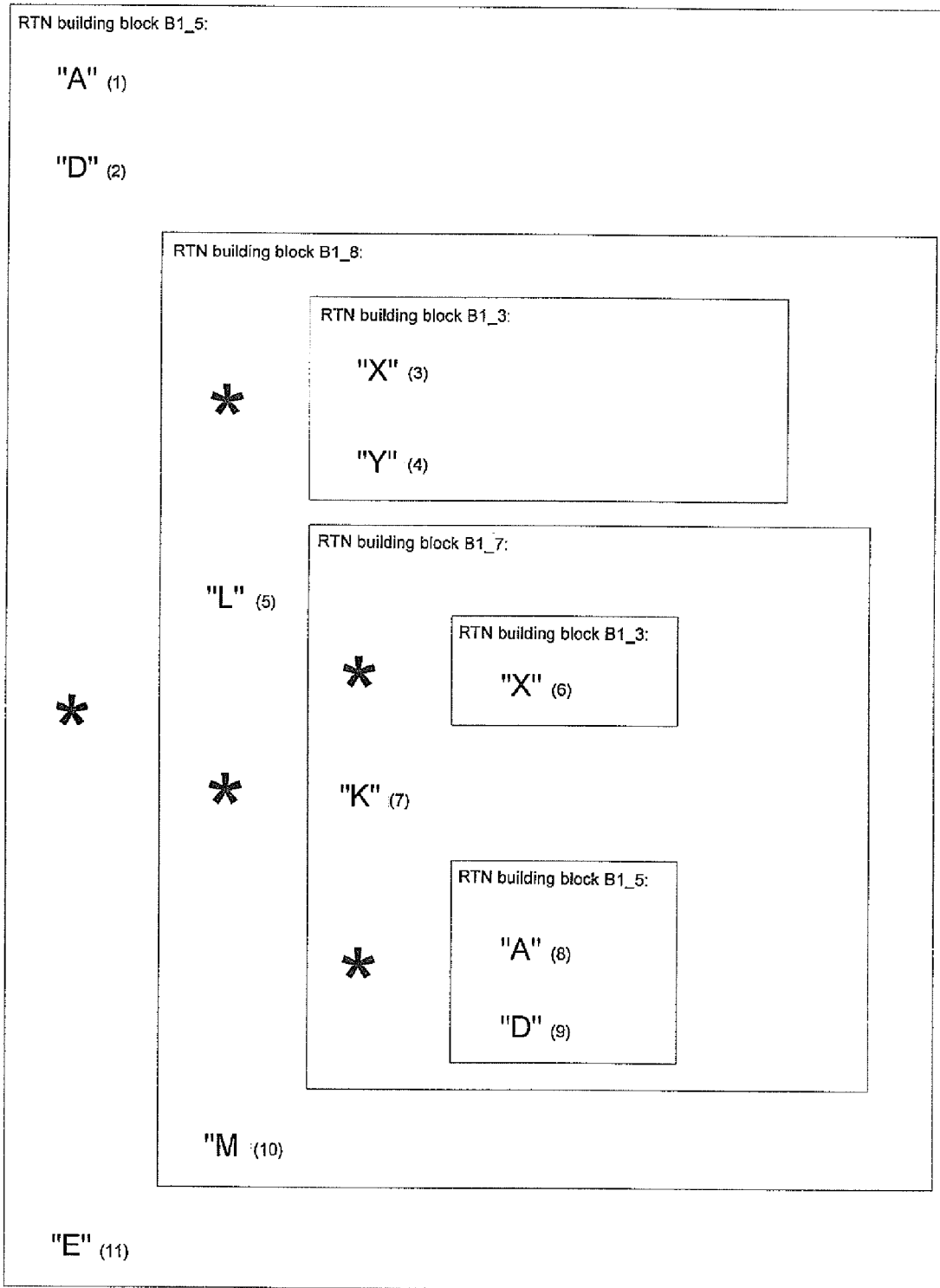
FIGS. 50 and 51 are each schematic representations of the nesting of RTN building blocks according to one embodiment of the inventive method.
Figure 51:
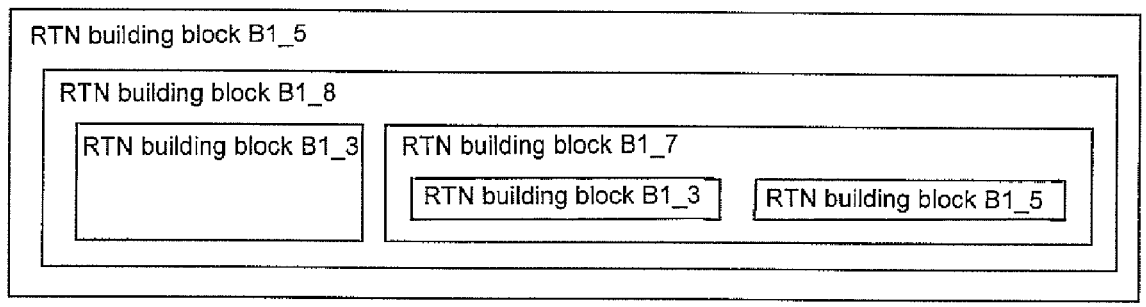

FIG. 50 shows the completely nested example 5 in a desired nesting of the RTN building blocks with keyword decision positions and * decision positions. FIG. 51 shows the completely nested example 5 in a desired nesting of the RTN building blocks without keyword decision positions and * decision positions.

In this example 5, only one final nesting is possible with reference to the RTN building blocks from example 1 to be used as defined BEFORE application of the conversion step and allocation of the same to a first or second generic group. This final nesting is used for further processing and thus eventually for generating an optimal access plan to a given data structure and must therefore refer to the given RTN building blocks BEFORE application of the conversion step. The conversion step is only applied to carry out an automatic algorithmic analysis of each given syntax.

In particular because of this necessary conversion into the two subgroups, however, a nesting of the RTN building blocks not appropriate for further processing is obtained, since each RTN building block of the first generic group, if present in the statement, calls an RTN building block of the second generic group, which RTN building block of the second generic group is, however, always superordinated to at least this calling RTN building block of the first generic group.

By definition, there are RTN building blocks that start with a recursive call function as first decision position in its inner, directed decision graph and are thus allocated to the second generic group. In the case of multiple nestings, it is not possible to clearly determine which RTN building blocks these RTN building blocks are superordinated to without further marking, since at a decision position that requires the recursive call function, any RTN building block of the first or second generic group can be introduced, which is not unambiguous in nestings of RTN building blocks.

The following simple example is to illustrate that with the RTN building blocks defined in example 1:

EXAMPLE 6

Statement to be Analyzed: X(1) K(2) A(3) D(4) L(5) X(6) Y(7) M(8)

For this example 6, the following two nesting possibilities are obtained, which are both allowed with reference to the RTN building blocks of example 1, which differ, however, in the orders of the processing-relevant RTN building block information. In order to also achieve a desired nesting for each statement, the introduction of further processing-relevant RTN building block information is necessary, which preferably can be a first and a second weighting for each of the given RTN building blocks.

First nesting possible for example 6 by use of the RTN building blocks in example 1:

| | | | | |
|---|---|---|---|---|
| *(B1) | K(2) | *(B2) | | processing-relevant building block information V7 |
| (B1): X(1) | | | | processing-relevant building block information V3 |
| (B2): *(B3) | L(5) | *(B4) | M(8) | processing-relevant building block information V8 |
| (B3): A(3) | D(4) | | | processing-relevant building block information V5 |
| (B4): X(6) | Y(7) | | | processing-relevant building block information V3 |

Second nesting possible for example 6 by use of the RTN building blocks in example 1:

| | | | | |
|---|---|---|---|---|
| *(B1) | L(5) | *(B2) | M(8) | processing-relevant building block information V8 |
| (B2): *(B3) | K(2) | *(B4) | | processing-relevant building block information V7 |
| (B3): | X(1) | | | processing-relevant building block information V3 |
| (B4): | A(3) | D(4) | | processing-relevant building block information V5 |
| (B2): X(6) | Y(7) | | | processing-relevant building block information V3 |

As can be seen, from both of these possible and respectively valid nestings, access plans to a given data structure can be created, wherein these two access plans would not be identical.

In order to always obtain an unambiguously desired nesting of RTN building blocks especially in those cases in which at least one of the RTN building blocks used is an RTN building block of the second generic group, specifying at least a first, and optionally also a second, weighting for each RTN building block as part of its processing-relevant RTN building block information is, as already mentioned, necessary, by which the nesting of the RTN building blocks used, which is desired depending on the syntax to be analyzed, is created algorithmically.

In order to specify such an inventive at least first, and optionally also second, weighting for each of the RTN building blocks given as processing-relevant building block information of the same, first a specific possible query language is given further below, which consists almost exclusively of RTN building blocks and thus shows the practical utilization of RTN building blocks as well as a desired final nesting of a statement with this at least one weighting for each RTN building block. The allocation of the weightings for each RTN building block and their effects are easily understood when it is not shown with an abstract, but a specific language.

Before showing a specific query, we will disclose a step that increases the speed of the analysis of a given statement according to the inventive method, i.e. by means of finding keywords of a statement in the first or second reference group, which result from the application of the conversion step to the RTN building blocks, and correspondingly following the residual decision graphs of each identified element of this reference subgroup.

In order to obtain optimized speed, all decision positions of decision graphs of the RTN building blocks can be allocated an unambiguous RTN building block-independent decision position number, which is equal for identical decision positions, and a collection of reserved keywords can be formed thereof. Those decision positions that require the introduction of a number, a variable or a string are also allocated the same unambiguous decision position number. The same is true for the two, multiply usable decision positions RTN building block of the first generic group and RTN building block of the second generic group; for these two decision positions, the same unambiguous decision position number is allocated to all introduced decision positions in the decision graph.

After specification of a statement to be analyzed, each keyword therein is checked as to whether this keyword of the statement is present in a collection of reserved keywords, i.e. for example in a list. Each keyword of the statement is thus checked as to whether it is a reserved keyword, i.e. a keyword that is required at least one decision positions of all decision graphs of the RTN building blocks, or, if it is not present in this collection of reserved keywords, a variable, a number or a string. Those keywords of a statement that are found in the collection of reserved keywords are replaced in said statement to be analyzed by the decision position number of this element found in the collection, i.e. the reserved keyword found. The other keywords of the statement, which are not present in the collection of reserved keywords, are allocated the corresponding decision position number, depending on whether they represent a number, a variable or a string.

The analysis of the given statement converted into decision position numbers proceeds according to the inventive method, with the first and the second reference subgroup as well as the residual decision graphs of their respective elements, however, being previously drawn on by use of the RTN building blocks with decision position numbers allocated thereto in the form of decision position numbers.

In addition, a further optimization as shown below is also possible: By conversion of all present decision positions into decision graphs as well as conversion of all keywords in a statement to be analyzed into respective decision position numbers, the inventive RTN building block-independent reference group with its two reference subgroup can be represented in the form of two independent number arrays, one for the first and one for the second reference subgroup, instead of as a list with elements. The number arrays allocated to the two reference subgroups have the same number of elements, wherein each element is addressed via an index number unambiguously allocated thereto. The lowest index number in the two number arrays is the lowest decision position number used, the highest index number corresponds to the highest decision position number used, wherein those decision position numbers that are allocated to the recursive call functions RTN building block from the total of RTN building blocks, RTN building block of the first generic group and RTN building block from the second generic group do not have to be considered, since these decision position numbers are not present as elements in the first or second reference subgroup as a result of the conversion step. However, only those elements (index numbers) of number arrays allocated to the first reference group refer to corresponding residual decision graphs that are already present as elements in the first reference subgroup and thus refer to a residual decision graph allocated thereto. The same holds for the number array that is allocated to the second reference subgroup.

Of course, any other memory form having the same function may be used instead of an array.

In summary, an optimization is obtained by
providing each decision position of the inner, directed decision graph of the RTN building blocks, which is present after application of the conversion step to the RTN building blocks, with an RTN building block-independent decision position number unambiguous for equal decision positions, and
representing the first as well as second reference subgroup each as a number array with the same number of elements, wherein elements of the array are addressed with index numbers, and the lowest index number of the two number arrays is the lowest decision position number used and the highest index number of the two number arrays is the highest decision position number used, wherein, however,
only those index numbers of the number arrays allocated to the first or second reference group refer to corresponding residual decision graphs that are already present as elements of the first or second reference subgroup, and furthermore
all decision positions of the residual decision graphs are also allocated one of these unambiguous decision position numbers allocated to this decision position, and
each keyword of a statement to be analyzed is allocated the decision position number allocated to this keyword, which number may also be the decision position number of a variable, a number or a string, whereby,
when the identification of a keyword of the statement in the first or second reference subgroup is required, the decision position number allocated to this keyword is addressed as index number of the number array of the first or second reference group and the presence of a residual decision graph for this index number is checked, and furthermore
the keywords of the statement with the decision positions of the residual decision graph are compared by comparing the decision position numbers of the respective current keyword of the statement with the decision position number at the respective decision position of the residual decision graph.

This allocation of decision position numbers to decision positions in the RTN building blocks and to keywords of a statement allows the introduction of number arrays for the first and second reference subgroup, respectively. When inventive RTN building blocks are used, this number array is especially useful because at each of the * decision positions present in the decision graphs of the RTN building blocks, there is a very high number of introduction possibilities for RTN building blocks, which is only limited by the number of RTN building blocks given.

By using the number array instead of a list for the elements of the first and second reference subgroup, it is not necessary anymore to find the RTN building blocks to be introduced at the * decision positions according to a statement to be analyzed by checking the RTN building blocks of the first or second generic group until the respectively prescribed RTN building block is identified, which, in the worst case, requires a comparison with all RTN building blocks of the respective generic group. Due to the decision position number allocated to the respective keyword of the statement, the RTN building block to be introduced can be directly addressed without comparison with other RTN building blocks in the respective number array and its presence can be thus verified.

Consequently, when a * decision position is reached in a residual decision graph, the index number can be directly addressed in the number array of the RTN building block-independent first or second reference subgroup, and it can be tested whether for this index number in the number array, and thus for this keyword in the statement to be analyzed, a residual decision graph to be followed is present in the respective reference subgroup.

The decision positions of the residual decision graphs may also be replaced by decision position numbers unambiguously allocated to the respective decision positions, in order to allow a quicker number comparison at these positions as well, which results in a speed advantage especially with those decision positions at which the decision graph of the respective current RTN building block allows at least a second decision path, insofar as the decision position number is searched only once for the respective current keyword in the statement but optionally compared with a decision position number twice or multiple times. Thus, the clearly slower comparison of two strings in the residual decision graph is avoided.

All those cases in which an RTN building block of the second generic group may optionally be introduced after successful completion of an RTN building block of the first generic group, this optimization is also especially useful because in at least some cases, no RTN building block of the second generic group is required according to the statement to be analyzed, since the overall nesting is assumed to be finite. The corresponding decision position number of the current statement keyword is addressed via the index number in the number array of the second reference subgroup, and it is found that a corresponding residual decision graph for this index number is missing. Subsequent comparisons with the current residual decision graph until a match is found with the thus unchanged current keyword of the statement to be analyzed are also not carried out as a string comparison but as a quicker number comparison.

Based on the RTN building blocks defined in example 1, this single conversion into decision position numbers unambiguous for each decision position would mean the following:

EXAMPLE 7

All decision positions occurring at least once in the decision graph of the RTN building blocks and the decision position numbers arbitrarily allocated thereto, but unambiguous in each case:

| | | |
|---|---|---|
| "A" | -> | allocated decision position number: 1 |
| "V" | -> | allocated decision position number: 2 |
| "W" | -> | allocated decision position number: 3 |
| "B" | -> | allocated decision position number: 4 |
| "C" | -> | allocated decision position number: 5 |
| "X" | -> | allocated decision position number: 6 |
| "Y" | -> | allocated decision position number: 7 |
| "D" | -> | allocated decision position number: 8 |
| "E" | -> | allocated decision position number: 9 |
| "K" | -> | allocated decision position number: 10 |
| "L" | -> | allocated decision position number: 11 |
| "M" | -> | allocated decision position number: 12 |
| Variables, i.e. keywords not appearing in this list: | -> | allocated decision position number: 0 |
| * position, i.e. a decision position requiring the recursive call function: | -> | allocated decision position number: 300 |
| Decision position requiring the recursive call function for an RTN building block of the first generic group: | -> | allocated decision position number: 301 |
| Decision position requiring the recursive call function for an RTN building block of the second generic group: | -> | allocated decision position number: 302 |

Based on the decision position numbers allocated above, the first and the second RTN building block-independent reference subgroup resulting from the conversion step of the RTN building blocks in example 1, as well as the residual decision graphs correspondingly allocated to their elements, are converted as follows independently from the processing-relevant RTN building block information:

Elements of the first reference subgroup from example 4 without stating the processing-relevant RTN building block information at the decision positions in the residual decision graphs before conversion of the decision positions into decision position numbers:

"A" ->
   (RTN building block of the first generic group ("B" RTN building block of the first generic group "A" | "C" RTN building block of the first generic group "B" | (1) "D" [(*1)] RTN building block of the first generic group) | "D" [RTN building block of the first generic group "E"])
   [RTN building block of the second generic group]

"V" ->
   "W" RTN building block of the first generic group "B" RTN building block of the first generic group "A" [RTN building block of the second generic group]

"X" ->
   [("Y" | RTN building block of the first generic group "B")] [RTN building block of the second generic group]

After conversion of the decision position numbers unambiguously allocated for each decision position, this first reference subgroup from example 4 looks as follows:

| | | |
|---|---|---|
| No. 1 | -> | ( *(no. 4 no. 301 no. 1 | no. 5 no. 301 no. 4 | (1) no. 8 [(*1)] No. 301 ) | no. 8 [no. 301 no. 9] ) [no. 302] |
| No. 2 | -> | no. 3 no. 301 no. 4 no. 301 no. 1 [no. 302] |
| No. 6 | -> | [ (no. 7 | [no. 301 no. 4) ] [no. 302] |

Consequently, the following number array with the index number 0 to 12 is obtained for this first reference subgroup, into which the decision position numbers 300, 301 and 302 that require the recursive call function are not included:

| | | |
|---|---|---|
| No. 0 | -> | (no residual decision graph allocated) |
| No. 1 | -> | ( *(no. 4 no. 301 no. 1 | no. 5 no. 301 no. 4 | (1) no. 8 [(*1)] No. 301 ) | no. 8 [no. 301 no. 9] ) [no. 302] |
| No. 2 | -> | no. 3 no. 301 no. 4 no. 301 no. 1 [no. 302] |
| No. 3 | -> | (no residual decision graph allocated) |

-continued

| | | |
|---|---|---|
| No. 4 | -> | (no residual decision graph allocated) |
| No. 5 | -> | (no residual decision graph allocated) |
| No. 6 | -> | [ (no. 7 | [no. 301 no. 4) ] [no. 302] |
| No. 7 | -> | (no residual decision graph allocated) |
| No. 8 | -> | (no residual decision graph allocated) |
| No. 9 | -> | (no residual decision graph allocated) |
| No. 10 | -> | (no residual decision graph allocated) |
| No. 11 | -> | (no residual decision graph allocated) |
| No. 12 | -> | (no residual decision graph allocated) |

Elements of the second reference subgroup from example 4 without specification of the processing-relevant building block information at the decision positions in the residual decision graph before conversion of the decision positions into decision position numbers:

"K" ->
   RTN building block of the first generic group

"L" ->
   RTN building block of the first generic group "M" RTN building block of the first generic group [RTN building block of the second generic group]

After conversion of the decision position numbers unambiguously allocated for each decision position, this second reference subgroup looks as follows:

| No. 10 | -> | no. 301 | |
|---|---|---|---|
| No. 11 | -> | no. 301 | no. 12 [no. 302] |

Consequently, the following number array is obtained for this second reference subgroup, into which the decision position numbers 300, 301 and 302 are not included:

| No. 0 | -> | (no residual decision graph allocated) | |
|---|---|---|---|
| No. 1 | -> | (no residual decision graph allocated) | |
| No. 2 | -> | (no residual decision graph allocated) | |
| No. 3 | -> | (no residual decision graph allocated) | |
| No. 4 | -> | (no residual decision graph allocated) | |
| No. 5 | -> | (no residual decision graph allocated) | |
| No. 6 | -> | (no residual decision graph allocated) | |
| No. 7 | -> | (no residual decision graph allocated) | |
| No. 8 | -> | (no residual decision graph allocated) | |
| No. 9 | -> | (no residual decision graph allocated) | |
| No. 10 | -> | no. 301 | |
| No. 11 | -> | no. 301 | no. 12 [no. 302] |
| No. 12 | -> | (no residual decision graph allocated) | |

An example for the keyword-wise conversion of a statement into the decision position numbers allocated to the respective keyword decision positions according to example 7, the syntax to be analyzed in example 2 is used again.

Syntax to be processed BEFORE conversion into decision position numbers:
A(1) X(2) X(3) B(4) D(5) D(6) D(7) A(8) D(9)

Syntax to be processed AFTER conversion into decision position numbers: no. 1(1) no. 6(2) no. 6(3) no. 4(4) no. 8(5) no. 8(6) no. 8(7) no. 1(8) no. 8(9)

Processing of the statement to be analyzed is equal to the inventive method shown in example 2. The only difference, described above, is that instead of the respective current keyword of the statement to be analyzed, the current decision position number, which is allocated to this respective current keyword, is used as string, and that the identification of elements in the first or second reference group in the number array allocated occurs via the decision position number of the respective statement keyword and the comparison at the decision positions of the residual decision graphs to be followed are also conducted with the decision position numbers and not with strings.

Overall, use of these decision position numbers results in the syntactical and access plan generating analysis of a given statement according to the inventive method not suffering from a speed loss as compared to processing of a statement based on a known RTN, despite the multiplied number of possible decision positions.

A query language defined by an RTN building block according to the state of the art follows the decision positions of exactly one overall decision graph, which contains a relatively small number of decision positions reachable first, keyword by keyword. At every decision position of this one overall decision graph forming the RTN building block, either a text, a symbol, a variable, a number or a jump position are prescribed depending of the associated mark, or the recursive introduction and running of exactly the same overall decision graph is required. Running an equal decision graph introduced at the decision position of a superordinated overall decision graph can again only be started at a limited number of first reachable decision positions of the overall decision graph. Consequently, expressivity by means of a statement based on a conventional RTN building block is limited as compared to a statement using the inventive RTN building blocks.

Similarly, it can be seen that each of the statements expressable according to the state of the art can, even if it makes use of all possibilities of the underlying overall decision graph, be taken on together with corresponding processing-relevant RTN building block information for the inventive analysis without syntactic or structural changes, due to the RTN building blocks being definable as required. The reason is that with the inventive RTN building blocks, each of which contains an inner, directed decision graph independent from the other RTN building blocks, a further * decision position, which prescribes the introduction and running of an RTN building block from the total of all RTN building blocks, can be used at any decision position of the inner, directed decision graph, by means of which every overall decision graph can be reproduced with the same processing functions by aid of the inventive RTN building blocks.

In order to create an optimal access plan from a given statement, stating the independent processing-relevant building block information explained above is necessary for each of the defined RTN building blocks. For reaching highest possible flexibility and thus highest possible expressivity and later optimizability of an access plan to be generated, a first and a second processing-relevant RTN building block main information group are formed, wherein that processing-relevant RTN building block information that refers to the respective RTN building block by which it is defined independently from its inner, directed decision graph are allocated to the first processing-relevant RTN building block main information group, and that processing-relevant RTN building block information that is allocated to specific decision positions in inner, directed decision graphs of the RTN building blocks and that is only considered as soon as the decision position allocated thereto is reached is allocated to the second processing-relevant RTN building block main information group.

In order to allow maximum flexibility and the best possible optimizability of a language based on inventive RTN building blocks, it is necessary to create a first, a second and a third processing-relevant RTN building block information group, wherein the processing-relevant RTN building block information is allocated to the first processing-relevant RTN building block information main group of these three RTN building block information groups, so that the processing-relevant RTN building block information that is used immediately when the run of the RTN building blocks allocated thereto is started, either during the analysis and RTN building block-wise nesting of a given statement or also during subsequent further analysis and generation of an access plan of this resulting final nesting, is allocated to the first processing-relevant building block information group, and the processing-relevant RTN building block information that is used after starting but before completing the run of the RTN building blocks allocated thereto, especially with the RTN building block-wise nesting of a statement to be analyzed, but also in subsequent analysis and generation of an access plan of this resulting final nesting, is allocated to the second processing-relevant building block information group, and the processing-relevant RTN building block information that is only used after completion of the run of the RTN building block allocated thereto, especially with subsequent further analysis and generation of an access plan of a final nesting, but also in the RTN building block-wise nesting of a statement to be analyzed, is allocated to a third processing-relevant building block information group.

It is also necessary that a fourth, a fifth and a sixth processing-relevant RTN building block information group are created, the processing-relevant RTN building block information of the second processing-relevant RTN building block information main group of these three RTN building block information groups being allocated in a way that the processing-relevant RTN building block information that, when the decision position associated therewith is reached, is exclusively specified as parameter for subsequent processing-relevant RTN building block information, which was specified by means of a corresponding allocation, in the corresponding decision graph and is thus only used by means of processing-relevant RTN building block information of the fifth or sixth processing-relevant RTN building block information group at decision positions in question, is allocated to the fourth processing-relevant RTN building block information group, and the processing-relevant RTN building block information that, when the decision position allocated thereto is reached, specifies that all parameters found due to the corresponding allocation, which parameters are the same as the decision positions with processing-relevant RTN building block information of the fourth processing-relevant RTN building block information group reached in the same decision graph, are preferably used as processing function, is allocated to the fifth processing-relevant RTN building block information group, and the processing-relevant RTN building block information that, when the decision position allocated thereto is reached, prevents the use of exactly those parameters that are collected by aid of the processing-relevant RTN building block information of the fourth RTN building block information group in an RTN building block either, as desired, subordinated, superordinated or neighboring to the corresponding RTN building blocks in the nesting, and specifies these prevented parameters as further parameters of the RTN building block in question for a later use, is allocated to the sixth processing-relevant building block information group.

Furthermore, several of the RTN building blocks defined according to the invention as well as several of the decision positions present in the inner, directed decision graphs may, irrespective in which of the RTN building blocks they are present, in part be allocated the same processing-relevant RTN building block information.

This is practical because part of the processing-relevant RTN building block information, such as the first or second weighting or the rearrangement weighting shown below, have identical values for many RTN building blocks, so that not all processing-relevant RTN building block information for each RTN building block can be unambiguous, which does not constitute a disadvantage in processing.

In order to allow several independent parameters for a later use thereof in one RTN building block, wherein, however, only the parameter specified to be the last one in the order, i.e. the parameter reached last, is used, a processing-relevant RTN building block information of the fifth processing-relevant RTN building block information group induces the application for exactly that parameter of all parameters specified therefore by means of allocation of the fourth processing-relevant RTN building block information group that is, due to a syntax to be analyzed, specified as the last decision position reached in the running order with an allocated processing-relevant RTN building block information of the fourth processing-relevant RTN building block information group, so that those parameters are discarded for the allocated processing that were specified in the same decision graph by decision positions reached before with allocated processing-relevant RTN building block information of the fourth processing-relevant RTN building block information group. This means that in those cases in which a decision graph is followed and in which more than one processing-relevant RTN building block information of the fourth processing-relevant RTN building block information group is found in this decision graph and specified as parameter, only the last one of the specified parameters of the running order is used, when an allocated decision position in the same decision graph is reached that contains a processing-relevant RTN building block information of the fifth processing-relevant RTN building block information group.

However, in order to use an assembled parameter for each decision position reached in the same decision graph, it is possible that processing-relevant RTN building block information of the fourth processing-relevant building block information group are provided with a mark, which mark specifies that, when the associated decision position in the respectively same decision graph is reached, the parameter specified as last one by means of processing-relevant RTN building block information of the fourth processing-relevant building block information group without this mark is not replaced by this further parameter but extended thereby, and this extended parameter is put to use when the decision position is reached that contains the allocated processing-relevant RTN building block information of the fifth processing-relevant building block information group.

Consequently, collecting parameters depending on the decision positions reached in a decision graph is possible, and these collected parameters can be used at a decision position allocated to these parameters and having a processing-relevant RTN building block information of the fifth processing-relevant building block information group.

If, within one RTN building block, several pieces of independent processing-relevant RTN building block information of the fourth processing-relevant RTN building block information group are to be used at different decision positions in the inner, directed decision graph of this RTN building block, marking of processing-relevant RTN building block information of the fourth and the fifth processing-relevant RTN building block information group belonging together at the respective decision positions is to be specified. This is done to allow these several independent applications to associated parameters.

By definition it is permitted to give several pieces of processing-relevant RTN building block information of the fourth, the fifth as well as the sixth processing-relevant RTN building block information group at a single decision position.

It is thus also possible to specify e.g. two independent parameters at a decision position by means of processing-relevant RTN building block information of the fourth processing-relevant RTN building block information group, and to use these parameters independently depending on the decision positions reached.

The following examples serve to illustrate these processing-relevant RTN building block information groups with a query language based on the invention:

By means of the inventive method with its degrees of freedom in the formulation of statements it becomes possible to define a query language which follows the logic below:

A query language that is based on RTN building blocks prescribes that each RTN building block used is allocated at least one processing input set, to which processing input set all processing-relevant RTN building block information of this RTN building block that is to be used is carried out. Similarly, each of the given RTN building blocks provides at least one processing output set, i.e. the set or sets to which at least one processing information has been applied.

A processing-relevant RTN building block information of the first processing-relevant RTN building block information group thus determines which and how many processing input sets are to be used for one RTN building block, especially based on the current nesting resulting from the statement to be analyzed.

Possible input sets of an RTN building block are processing output sets of the given RTN building block (s) obtainable at a recursive call function of this RTN building block, or the processing input set of an RTN building block superordinated to this RTN building block as well as at least one of the processing output sets of the immediate neighbor of this RTN building block in the final nesting of all RTN building blocks.

The processing-relevant RTN building block information that changes values of elements of at least one set to be processed or adds new, e.g. calculated, values to these elements, removes elements from the same set or changes their values is called processing function in the following.

RTN building blocks neighboring each other with regard to the nesting result from an RTN building block directly superordinated thereto, which requires the application of the recursive call function, i.e. of a decision position, that prescribes the introduction or running of one of the RTN building blocks from the total of RTN building blocks, at least twice or any number of times.

So as to always clearly note the end of each RTN building block and the RTN building blocks introduced therein, it is necessary that at least one decision position which demands a keyword (text, symbol, variable or numeral) is prefixed to the inner, directed decision graphs of the RTN building blocks at those decision positions at which an unlimited number of consecutive calls of recursive call functions which cannot be determined in advance is carried out, and that at least one decision position that also demands a keyword follows this.

An example thereof is the RTN building block "levels", in which the decision position 300 can follow consecutively as often as desired, with this building block by definition starting with a previous keyword ("[") and ending with a subsequent keyword ("]"): "[" (1) * (*1)"]".

There is assumed a plurality of tables and stored queries in a relational database system which in the following are termed as sets and are abstracted.

By the transforming and introducing into RTN building blocks, each formulatable statement is brought into the same abstraction form which is based on a nesting of RTN building blocks, independent of the processing function which is allocated to the RTN building blocks in use. By this identical abstraction one algebra satisfies all RTN building blocks and nesting possibilities.

A finite number of basic building block groups can always be declared, with several assumptions, i.e. processing-relevant RTN building block information, being required which apply unless superordinated or introduced RTN building blocks specify a different definition of their own.

Examples for Possible Basic Building Block Groups (FIGS. 14, 15, 16, 17)

Variant 1 (FIG. 14): RTN building block 601 with any keyword 600 and exactly one decision position 300, in which an RTN building block from all RTN building blocks is introduced, with one RTN building block of this variant specifying at least one keyword 600 either BEFORE and/or AFTER the decision position 300.

Variant 2 (FIG. 15): RTN building block 602 with any keyword 600 and at least two or more decision positions 300, with all present decision positions 300 each being separated by at least one keyword.

Variant 3 (FIG. 16): RTN building block 603 with any keyword 600 which is located exclusively BEFORE or AFTER the decision position 300 which can be called as often as desired.

Variant 4 (FIG. 17): RTN building block 604 with any keyword 600 which is located at the beginning and the end of the decision path 50999 and which comprises a decision position 300, followed by a decision position 300 that can be called as often as desired, with any number of keywords 600 being able to follow after the first decision position 300.

All nesting possibilities resulting from the formulation of any statement may be divided up into these or further variants or their combinations. There are shown processing steps which are respectively applied in these variants as long as the used RTN building blocks do not describe other processing methods and processing set allocations, respectively.

Figure 8:
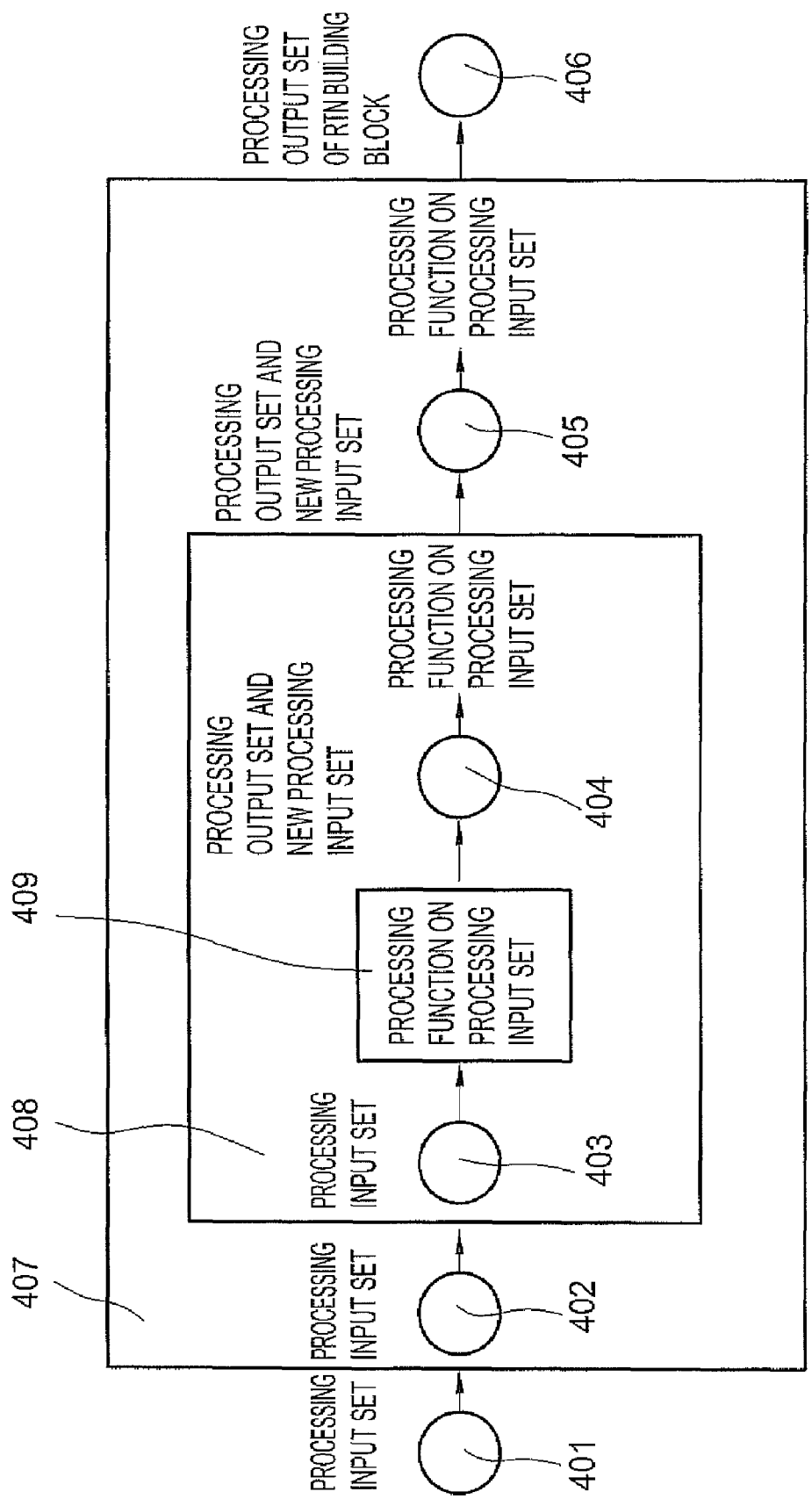
FIGS. 8, 9, 10, 11, 12, 13 are each schematic representations of the input set allocations of different RTN building block nestings and special forms, respectively, as applied in embodiments of the method according to the invention.
Figure 14:
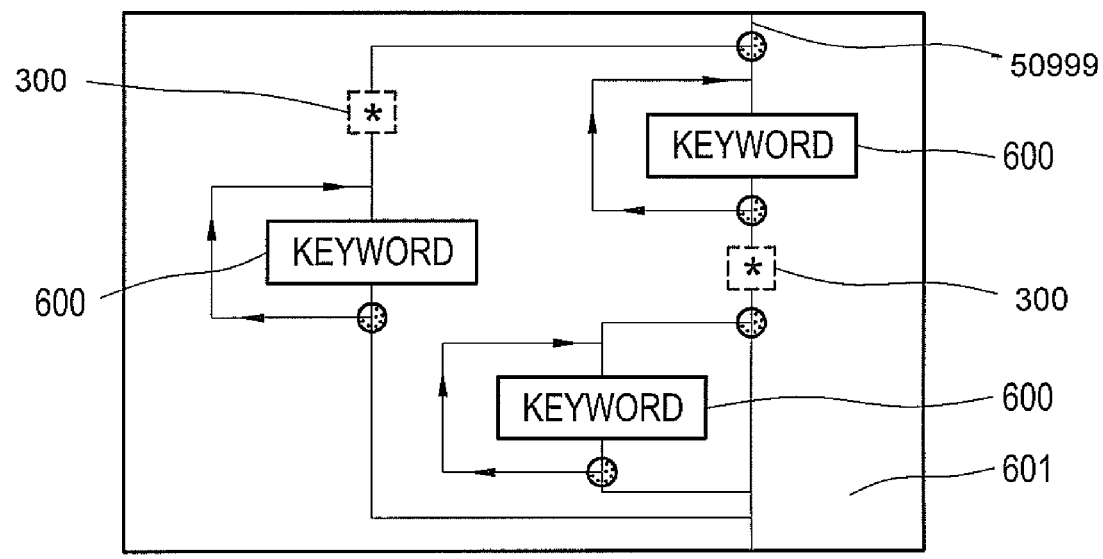
FIGS. 14, 15, 16, 17 are each schematic representations of group variants of RTN building blocks, as applied in embodiments of the method according to the invention.

Variant 1 (FIGS. 8, 14)

For those RTN building blocks of all RTN building blocks which are defined according to the variant 1 shown in FIG. 14, the following processing set allocation applies:

If a decision position 300 is provided in a superordinated RTN building block, the additional RTN building block which is introduced at this position as processing input set, is allocated the processing input set which had been allocated to the superordinated RTN building block. This process is carried out up to the inner-most nested RTN building block so that the processing input set is always transferred to the directly introduced respective RTN building block at the decision position 300. Unless no other RTN building blocks are introduced in the introduced RTN building block, the processing function of the introduced RTN building block is then applied to its allocated processing input set, and the resulting delivered processing output set of the introduced RTN building block is allocated to the superordinated RTN building block as new processing input set, following which the processing function of the superordinated RTN building block is carried out. The result of this application is delivered as processing output set of the superordinated RTN building block. Therefore, this principle allows the nesting of RTN building blocks as often desired.

Thus, FIG. 8 shows the nested RTN building blocks 407, 408, 409 according to

---

RTN building block 407 (keyword + decision position 300)
RTN building block 408 (keyword + decision position 300)
RTN building block 409 (keyword)

---

Processing input set 401 is transferred to RTN building block 407 and then transferred to the introduced RTN building block 408 as its processing input set 402, which, in turn, is identically passed on to the RTN building block 409 that is introduced in the RTN building block 408.

Once the inner-most nesting point is reached, the processing function of the RTN building block 409 is applied to the processing input set 403, and the result transferred as processing output set 404 to RTN building block 408 as the new processing input set.

Now the processing function of RTN building block 408 is applied to the new processing input set 404, with the result being transferred as processing output set 405 and as the new processing input set to RTN building block 407.

In the next step the processing function of the next, outer RTN building block, i.e. RTN building block 407, is applied to its new processing input set 405, and the result stored in the processing output set 406 of RTN building block 407.

A differing definition for individual RTN building blocks, however, cannot be excluded, as is already mentioned above. Variant 2 (FIGS. 9, 15)

Figure 15:
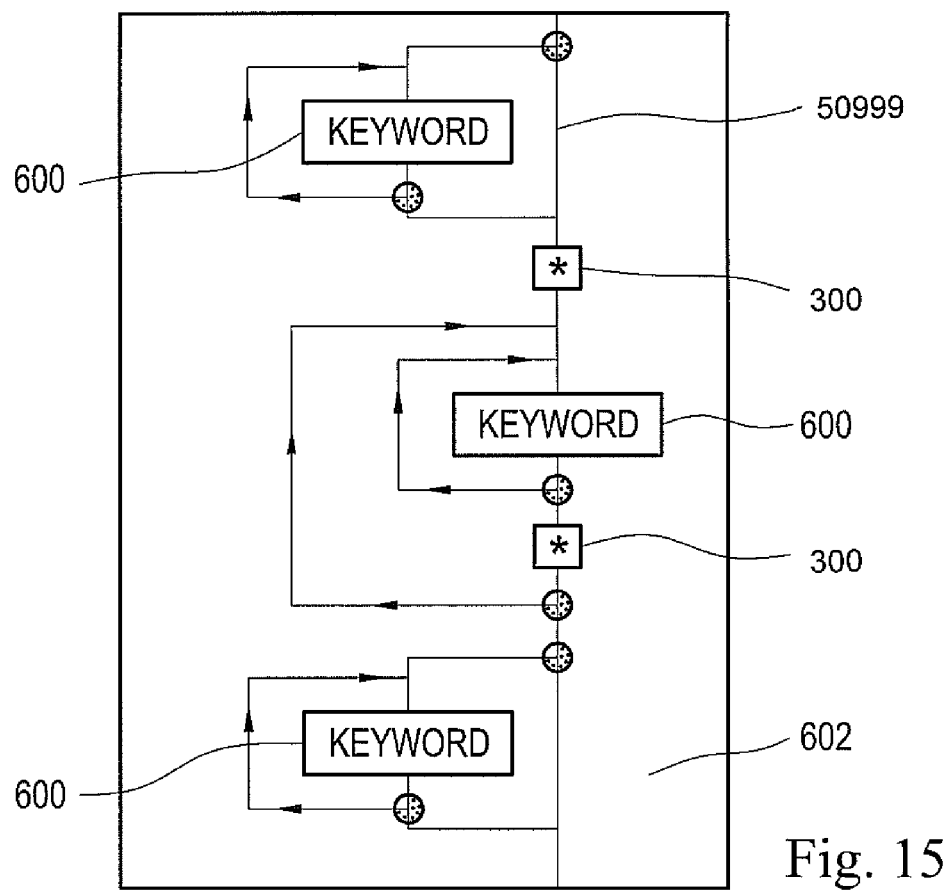

For those RTN building blocks of all RTN building blocks that are defined according to variant 2 shown in FIG. 15, the following allocation for processing sets applies:

If in each case at least one keyword is present between two or more decision positions 300 in a superordinated RTN building block, each time the same processing input set, i.e. the processing input set of the superordinated RTN building block, is allocated to the RTN building blocks that are introduced directly at the decision positions 300, with all resulting processing output sets being transferred as processing input sets of the processing function of the superordinated RTN building block, unless in special cases the outer and/or at least one of the introduced RTN building blocks uses a different definition.

Figure 9:
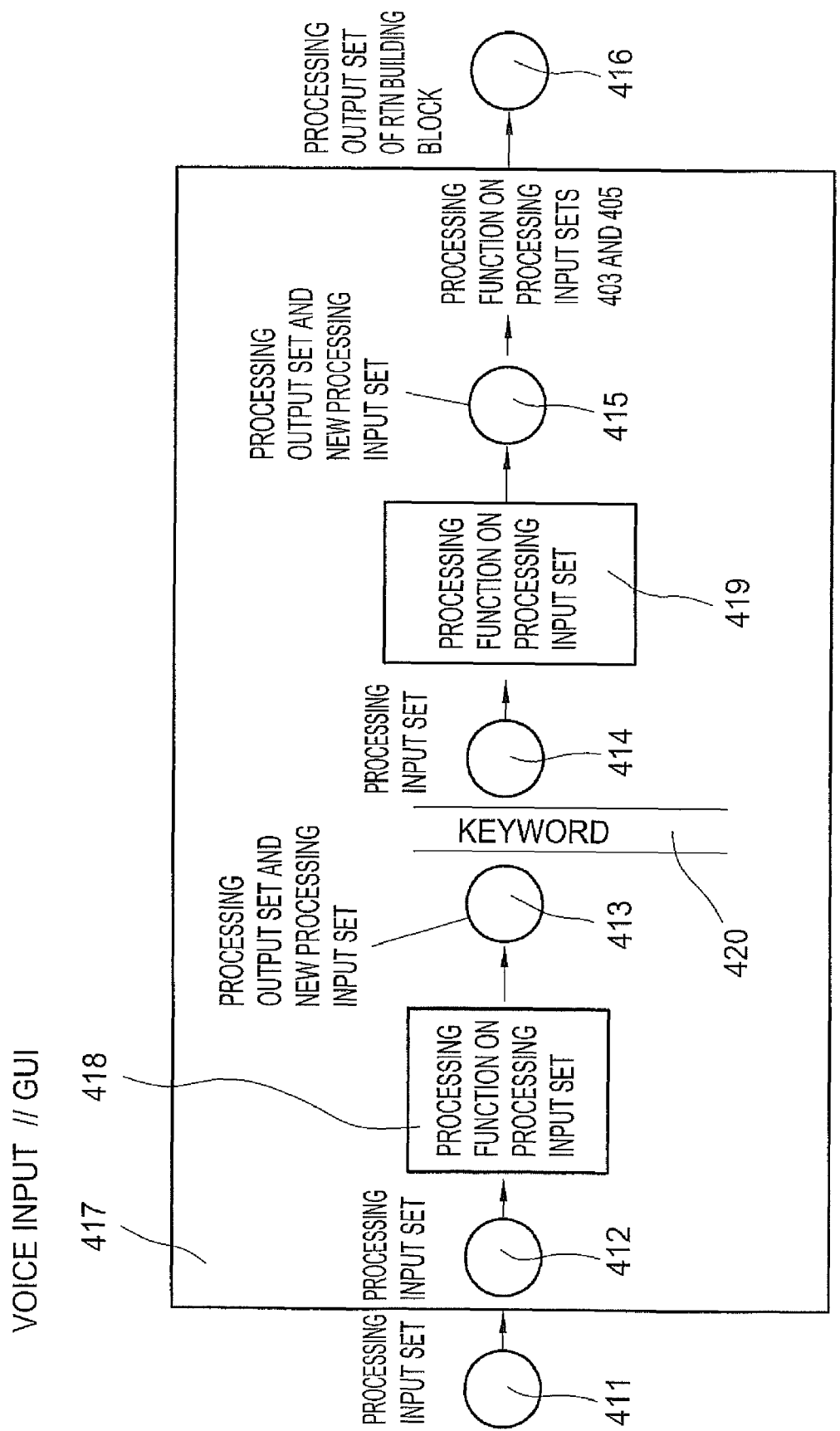

FIG. 9 shows the RTN building blocks 418 and 419 linked by a keyword 420 that are introduced in an RTN building block 417. This variant is applied, for example, in arithmetic or logic operations of RTN building blocks.

---

RTN building block 417 (dec. pos. 300 + keyword 420 + dec. pos. 300)
    RTN building block 418       RTN building block 419

---

The processing input set 411 is transferred to a superordinated RTN building block 417 and then handed over to the introduced RTN building block 418 as its processing input set 412. The associated processing function of the RTN building block 418 is then applied to the processing input set 412 and stored in the processing output set 413.

The RTN building block 419 also receives the processing input set 411 of its superordinated RTN building block 417 as processing input set 414. The associated processing function of the RTN building block 419 is then applied to its processing input set 414 and stored in the processing output set 415.

In the next step the superordinated RTN building block 417 is allocated the processing output sets 413 and 415 as its two new processing input sets, on which its processing function is from then on applied and subsequently stored in the one processing output set 416.

Figure 10:
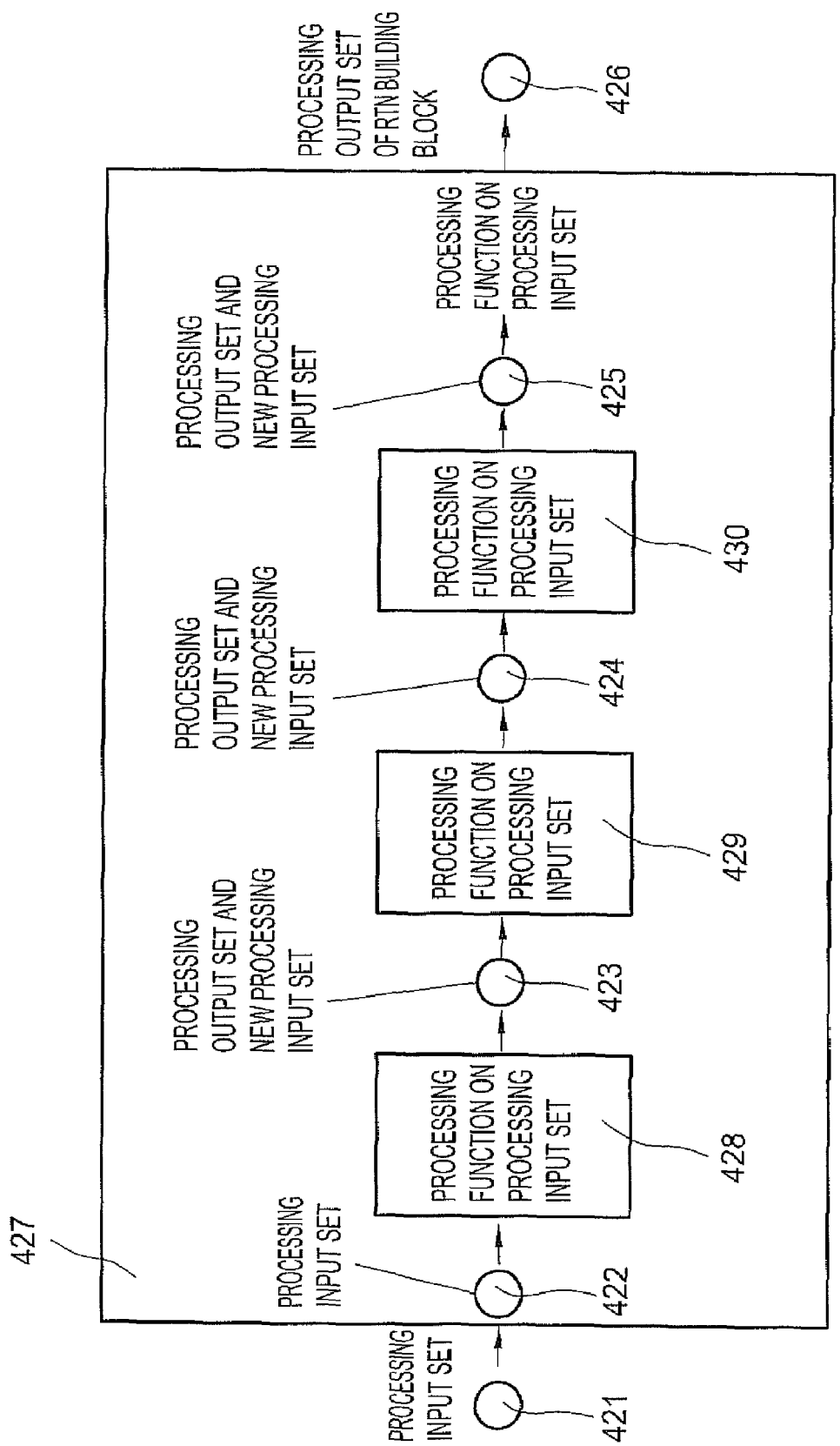

A differing definition for individual RTN building blocks, however, cannot be excluded, as is already mentioned above. Variant 3 (FIGS. 10, 16)

Figure 6:
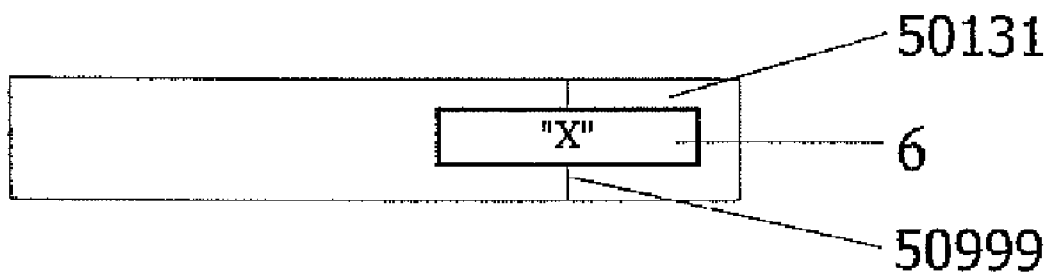
Figure 7:
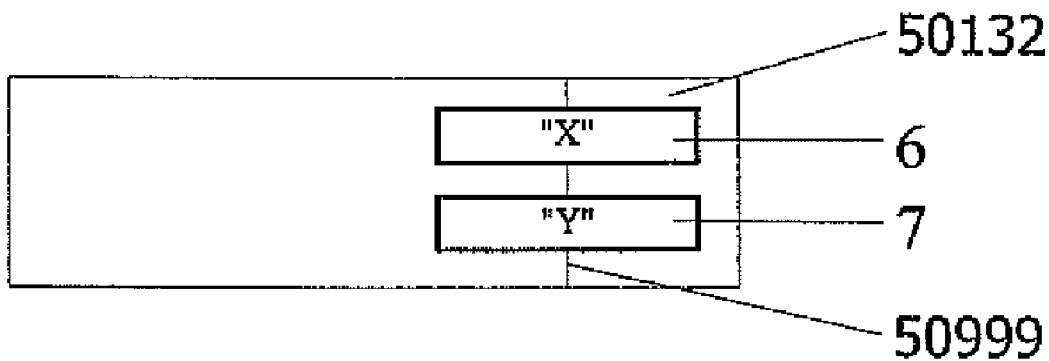
Figure 16:
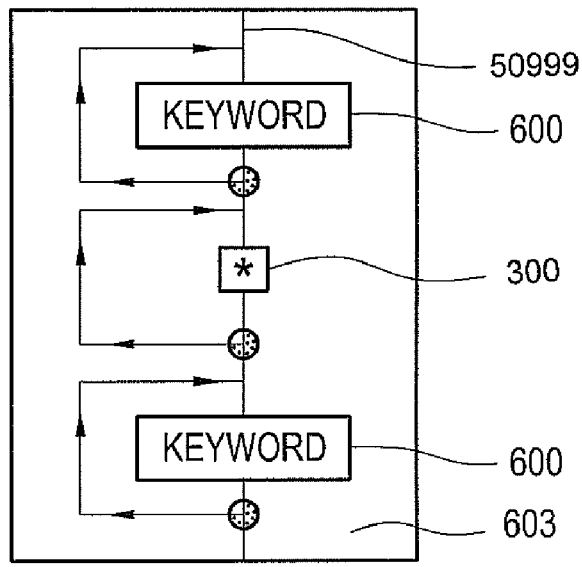

For each RTN building block of all RTN building blocks that are defined according to variant 3 shown in FIG. 16, the following allocation for processing sets applies:

The superordinated RTN building block has a decision path which makes it possible that the decision position 300 is reached consecutively as often as desired (see RTN 253 in FIG. 6).

For this case it applies that the RTN building block which is introduced at the first position of the order retrieves the processing input set of the superordinated RTN building block, other consecutive RTN building blocks each use the processing output set of the precursor as processing input set and the RTN building block that is last in the order hands over its processing output set as processing input set to the superordinated RTN building block which carries out its processing function, unless in special cases the outer or at least one of the introduced RTN building blocks uses a different definition. By doing so, as compared with SQL a substantially more free execution of queries is made possible, as already mentioned elsewhere.

FIG. 10 shows the RTN building blocks 428, 429, 430 that follow each other in a superordinated RTN building block 427 where, with the exception of the first and last RTN building block, in the given order of the RTN building blocks each processing output set of the previous RTN building block is retrieved as processing input set of the subsequent RTN building block, and the processing function that is allocated to the respective RTN building block is applied.

Specifically, a processing input set 421 of the superordinated RTN building block 427 is transferred as processing input set 422 of the RTN building block 428 that comes first in the order and its processing function applied thereon, resulting in a processing output set 423. The latter is passed on as processing input set 423 of the second RTN building block 429. In a similar way this happens to the subsequent RTN building block 430 and its resulting processing input set 424 the processing output set 425 of which is retrieved as new processing input set on which the processing function of the superordinated RTN building block 427 is applied, which results in the delivery of a processing output set 426.

Figure 12:
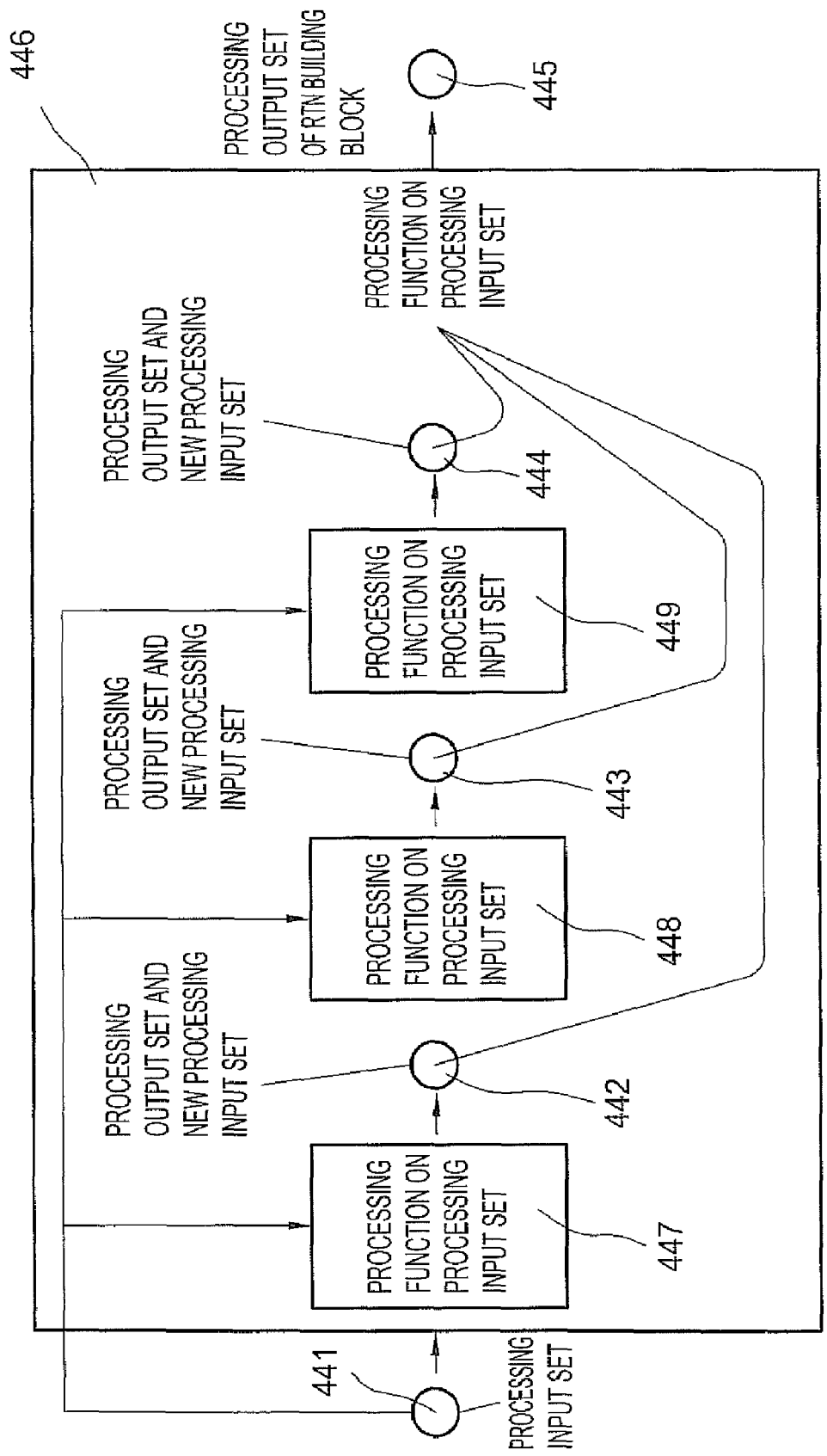

A useful possible redefinition of the variant 3 is given by the RTN building block 446 with the following set allocation properties and is shown in FIG. 12.

The superordinated RTN building block 446, however, has a decision path which enables that the decision position 300 can be reached consecutively as often as desired.

According to the definition of the special RTN building block 446 it applies that all RTN building blocks 447, 448, 449 which are introduced directly at the decision positions 300 are allocated the processing input set 441 of the superordinated RTN building block 446.

As processing input set of the superordinated RTN building block 446 the processing output sets 442, 443, 444 of all directly introduced RTN building blocks 447, 447, 449 are taken and stored in the processing output set 445 after applying the processing function.

Examples of the possible processing functions of this RTN building block 446, determined, for example, by own RTN building blocks:

1. All elements that have a certain number (at least, exactly, maximum, . . . ) of all processing output sets of the introduced RTN building blocks (ANY (*)).
2. All elements that are in each processing output set of the introduced RTN building blocks and in all processing output sets, respectively, with the exception of at least/a maximum of/exactly a certain number (ALL (*)).

By means of a separate RTN building block it can also be stated whether elements that are present in more than one processing output set of the introduced RTN building blocks should be taken on in the processing output set of the superordinated RTN building block once or several times.

If there are no RTN building blocks given as parameters for the processing function of this superordinated RTN building block 446, it is assumed that all elements which are present at least in one of the processing output sets 442, 443, 444 of the introduced RTN building blocks 447, 448, 449 should be delivered without duplicates.

Figure 11:
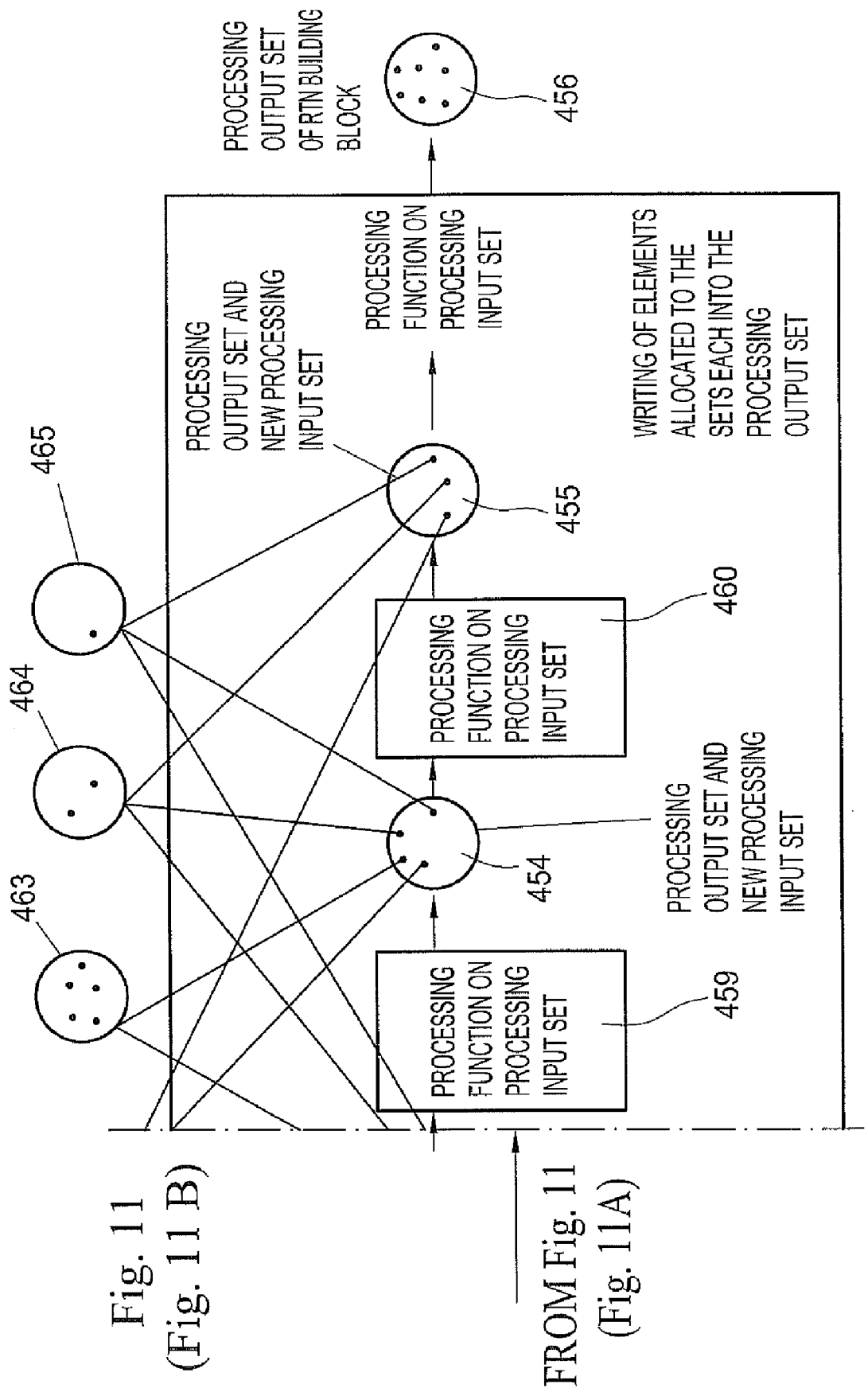
Figure 13:
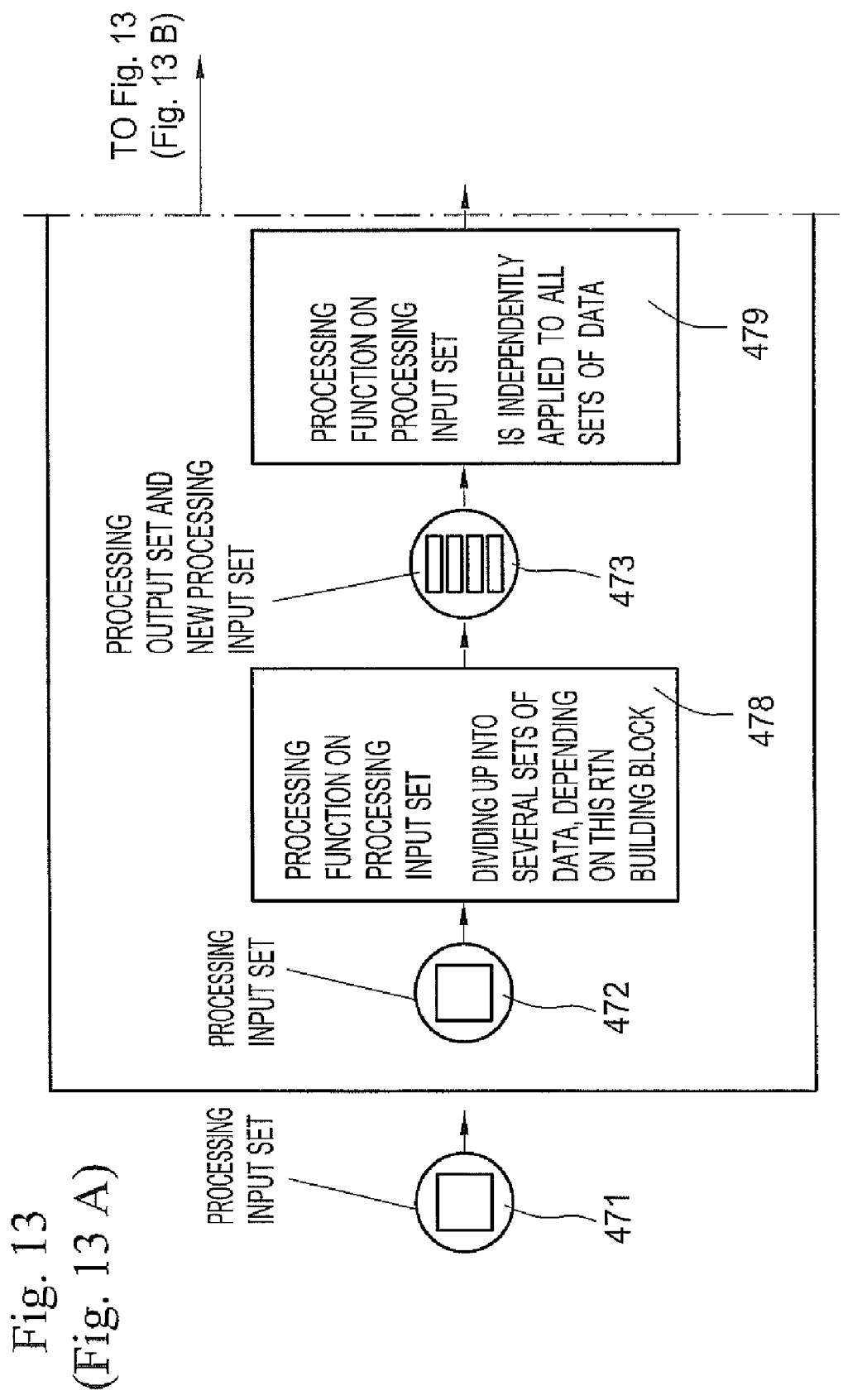
Figure 13:
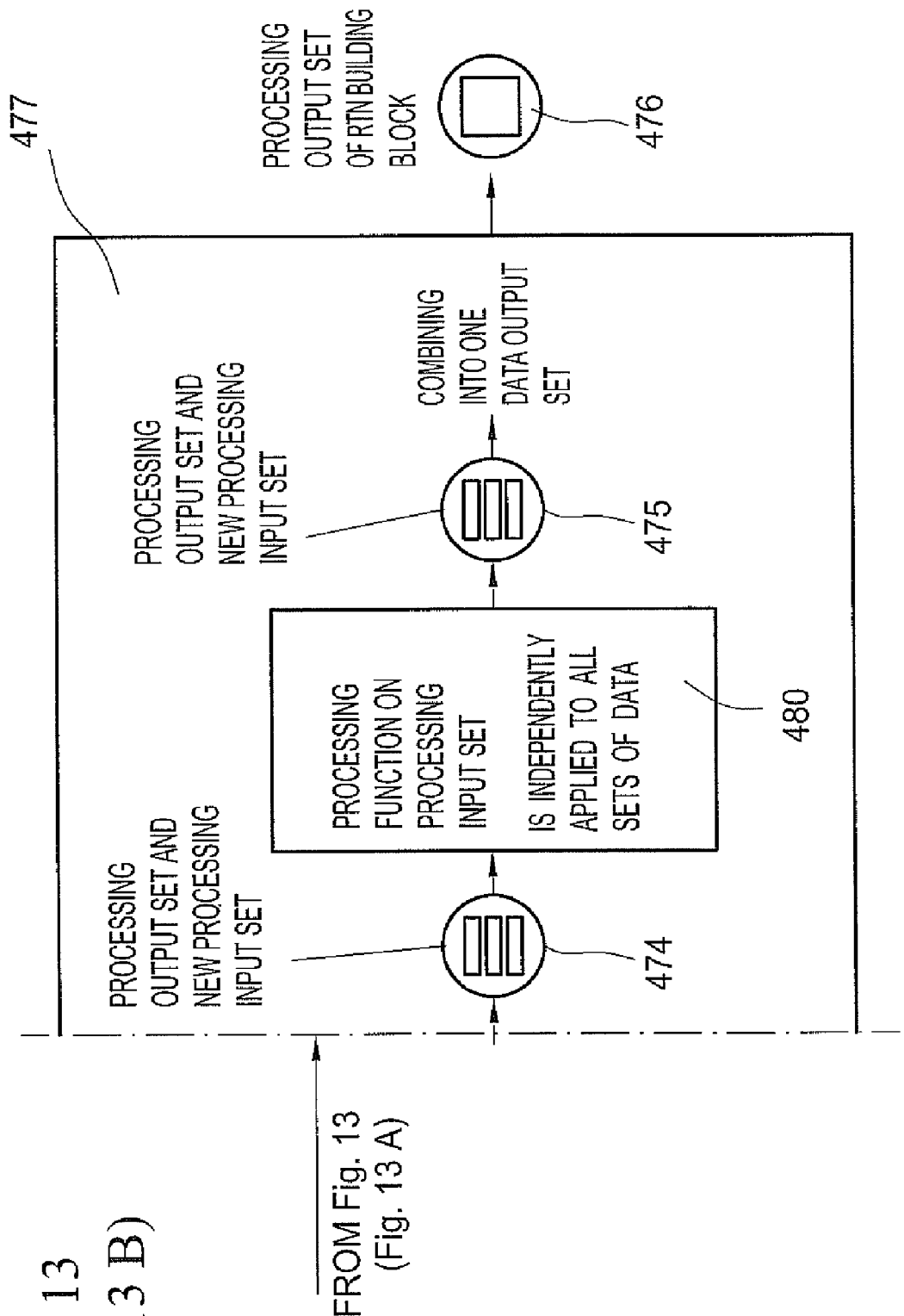
Figure 17:
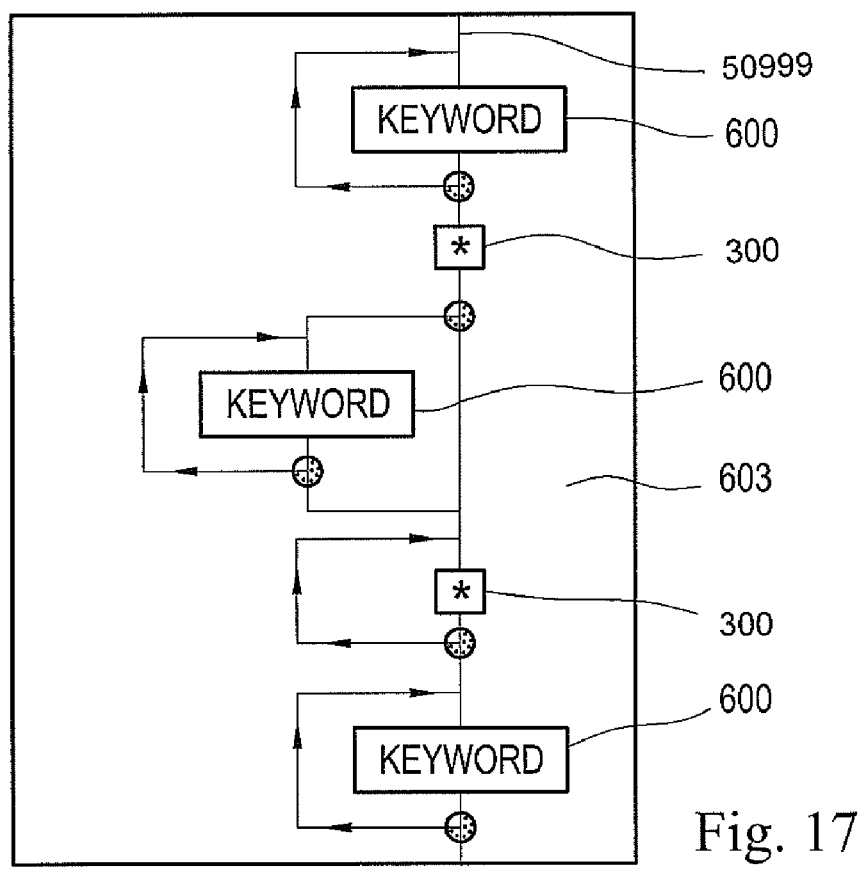

Variant 4 (FIGS. 11, 13, 17)

For those RTN building blocks of all RTN building blocks that are defined according to variant 4 shown in FIG. 17, the following allocation for processing sets applies:

The superordinated RTN building block (e.g. RTN building block 457 in FIG. 11 or RTN building block 477 in FIG. 13) has a decision path which specifies a decision position 300 after one or more keywords 600, after which any number of keywords 600 can follow and which makes it possible that the decision position 300 is reached consecutively as often as desired (see RTN 253 in FIG. 6), with this being ended by at least a keyword 600.

To RTN building blocks of this variant it applies that the first decision position 300 uses the data of the processing input set of the superordinated RTN building block and by means of the processing output set of the introduced RTN building block at the decision position 300 the processing function of this RTN building block is carried out, while for all other RTN building blocks that are introduced at the decision position 300, which can be called as often as desired, it applies to the set allocation the logic described for variant 3 (FIG. 16), with the first RTN building block of the decision position 300, which can be called as often as desired, being allocated the processing output set of the RTN building block at the first, not repeatable decision position as its processing input set. Once the end of the superordinated RTN building block which is marked with at least a keyword 600, is reached, at least a further processing function can be applied to the processing output set of the last RTN building block of the decision position 300 which can be called as often as desired.

In FIG. 11 an RTN building block of the variant 4 is shown which has introduced at the first decision position 300 of the superordinated RTN building block 457 the RTN building block 458 which accesses the processing input set 452 of the superordinated RTN building block 457, with the processing input set 452 corresponding to the processing input set 451.

The processing function of this RTN building block 457 firstly carries out a grouping according to identical value sets of the processing output set 453 of the RTN building block 458 for the elements of the processing input set 452 with reference to the respective grouped elements. In this way, the processing input set 451 that is passed on as processing input set 452, contains 17 elements. As a result of the processing function of the RTN building block 458, in the processing output set 453 these are grouped into five different elements, with each element referring to a respective set by the individual elements which were combined (set 461, 462, 463, 464, 465). The processing output set 453 is now the processing input set for the RTN building block 459. If elements are removed by the subsequent processing functions of the introduced RTN building blocks 459 and 460 from the respective processing output set 454, 455, the reference to the sets of the allocated elements (in FIG. 11 set 461 and 463) is also omitted. When completing this RTN building block it is defined that all elements of the allocated sets (sets 462, 464, 465) of the processing output set 465 in the processing output 456 of the RTN building block 457 are written into the processing output set 456 of the RTN building block 457. This last processing function is only carried out if it is explicitly called via at least an optional keyword in the RTN building block 457 or by a subsequent RTN building block.

In FIG. 13 an RTN building block of the variant 4 is shown, having introduced at the first decision position 300 of the superordinated RTN building block 477 the RTN building block 478 which accesses the processing input set 472 of the superordinated RTN building block 477, with the processing input set 472 corresponding to the processing input set 471.

The processing function of this RTN building block 477 firstly carries out a grouping according to identical value sets of the processing output set 473 of the RTN building block 478 for the elements of the processing input set 472, with elements having each to be grouped identically being written independently into the same output data sets of the processing output set 473.

Due to the presence of this RTN building block 477 it is assumed that each processing input set and each processing output set contains at least one input data set and at least one output data set, respectively, with the number, content and order within the data sets of the processing input sets and processing output sets not having to be identical. If no input data sets and no output data sets, respectively, are described, each processing input set and each processing output set contains exactly one input and output data set, respectively, which includes all elements. All processing functions are independently applied to all input data sets of the processing input sets (in FIG. 13: 473, 474) of the respective RTN building blocks (in FIG. 13: 479, 480) and correspondingly written into the output data sets of the processing output sets 474, 475 of the respective RTN building blocks 479, 480, with the provision that the output data sets still include elements. When completing this RTN building block it is defined that all output data sets of the processing output set 475 are written into the same output data set of the processing output set 476 of the RTN building block 477. This last processing function is only carried out if it is explicitly called via at least an optional keyword in the RTN building block 477 or by a subsequent RTN building block.

By referring to FIG. 13 it becomes clear that each processing function of an RTN building block refers to its processing input set and is always independently carried out on all elements of all input data sets in its processing input set, and stored in identical and other output data sets, respectively, of its processing output set, unless an RTN building block indicates a different definition.

The RTN building blocks are allocated processing input sets. Thus, RTN building blocks can be provided which individually describe the allocation of the processing input sets to the RTN building blocks.

A further possible characterization of the RTN building blocks can be carried out as follows and is stated as an example that there are no limitations also with regard to this characterization. Moreover, it is clearly evident that there are approaches with regard to the processing by an engine.

An example of this characterization before application of the conversion step to the RTN building blocks is shown in table 1, and after application of the conversion step in table 2.

The elements of the first and second reference subgroup for these RTN building blocks after the conversion step, as shown in table 2, are listed in table 3, table 4 shows the residual decision graphs corresponding to the individual elements shown in table 3.

It must be possible to both address Cartesian products as one set (RTN building block "FROM") and in each case go to an overall second set per element and by doing so, also reach a Cartesian product, with the values in this case being calculated and delivered (RTN building block "levels") according to each element of the first set depending on the criteria of the second set.

RTN Building Block "FROM"

"FROM" forms a Cartesian product for the resulting set of the RTN building block which is indicated at the decision position 300 of this RTN building block and makes it available as processing input set for the RTN building block at the first decision position 300 in its superordinated RTN building block "levels".

RTN Building Block "Levels"

"Levels" carries out all processing functions of those RTN building blocks that were stated subsequently in this RTN building block ("levels") at the decision positions 300 step by step according to each element of the processing input set of the RTN building block where this RTN building block ("levels") is contained, with the processing input set of each RTN building block being the processing output set of the RTN building block right before. The specificity of this RTN building block of variant 3 is that this RTN building block does not pass on its processing input set as processing input set for the first RTN building block introduced therein, but that the processing input set for the first RTN building block is defined by means of an RTN building block of its own (e.g. processing output set of an RTN building block "FROM") or from the sum of all sets and tables, respectively, used in this RTN building block.

The RTN building block which is introduced in this RTN building block "levels" at the first decision position 300 takes as processing input set a set (table, stored query or Cartesian product) which is defined in the RTN building block "levels" as processing input set by the processing output set of a particular RTN building block (e.g. "FROM"). If no processing input set for the introduced RTN building blocks is defined in the RTN building block "levels", this processing input set can be determined by data base-specific properties, e.g. by the theory of graphs, the table of relations and all stated RTN building blocks "tables" in this RTN building block "levels", independently from the nesting in the RTN building block "levels".

Since there is no surrounding RTN building block in the outermost RTN building block "levels" into which it could be introduced and the processing input set of which could be taken, an abstract start set with an element is taken, with the element containing, in an abstract way, all numbers, constants, letters and global functions, etc.

Each RTN building block "levels" provides itself and all RTN building blocks that are nested therein with the respective current element with all pieces of information (e.g. all table fields) of its processing input set, delivered by the superordinated RTN building block, with also the "deepest" nested RTN building block having access to these pieces of information of all RTN building blocks "levels".

The processing output set of the RTN building block "levels" is the processing output set of the last RTN building block which is introduced in the RTN building block "levels" at the last repeatable decision position 300.

RTN Building Block "Processing_SameParents"

This RTN building block was shown in FIG. 12 and explained above and is listed in the group of "special" set allocations because its set allocation does not correspond to the general description for variant 3.

All RTN building blocks introduced into this RTN building block are not allocated the processing output set of the RTN building block situated immediately before, but instead the processing input set of the RTN building block/bubble processing_SameParents.

The processing output set of the processing_SameParents bubble are all elements of all processing output sets of all elements which were introduced into this RTN building block. Depending on the additional RTN building blocks as parameter, the processing output set of this RTN building block can also include only those elements which are present in all or a particular (exact, minimum or maximum) number. By means of RTN parameter elements one can also determine whether those elements which are multiply present in processing output sets are multiply stored several times in the processing output set of this element or should be stored only once or not be included at all.

RTN Building Block "Processing_PrevParents Bubble"

All RTN building blocks introduced in this RTN building block are allocated as processing input set the processing output set of the RTN building block right before which makes this RTN building block correspond to set allocation according to variant 3. This RTN building block makes it possible that, for example, in a processing_SameParents bubble or in other RTN building blocks which allow for only one decision position 300, one RTN building block can deliver the processing output set of several consecutively and stepwise subsequently carried out processing functions.

RTN Building Block "BreakOn"

Each processing function is independently carried out on all input data sets in the processing input sets. If the dividing up into several data sets is to take place, this can be done by the RTN building block "BreakOn", with in each case elements of the processing input set of the RTN building block "BreakOn" which delivers the same values for the processing output set of the RTN building block that is introduced at the first decision position 300 (when there are several elements in this processing output set, the use of "ALL" and "ANY", respectively, is useful) being written into the respectively same data sets.

The combining into a data set, for example, can be determined by at least one keyword (e.g. "END", "BREAKON") after a decision position 300 which can be repeated as often as desired in the RTN building block "BreakOn".

RTN Building Block "GroupBy"

Each element of the processing input set and the processing output sets can in each case be allocated one set of values.

Many problems make it necessary to group according to identical values and for each grouped element optionally memorizes those elements that were grouped together with this element. This is determined by the RTN building block "GroupBy", while it is possible to write all elements of the sets that are allocated according to element in the processing output set of the RTN building block "GroupBy" and thereby removing the grouping after the completion of the processing functions. This can be determined by at least one keyword (e.g. "END GROUPBY") after a decision position 300 that can be called as often as desired. If in the statement no such keyword is given, the grouping remains from the first use on for all subsequent processing functions in the respective superordinated RTN building block.

RTN Building Block "OrderBy"

The elements of each set are always disposed in a certain order. After the optimization, not every processing function adheres to this order.

Therefore, there is provided an RTN building block ("OrderBy") that stores the elements of all input data sets of its processing input set independently from each other according to the sorted given value and the value set, respectively.

Each useful set processing function and value calculation function, respectively, or also display function etc. can be defined by an RTN building block and carried out in the query. In the following there are listed some examples of set processing functions.

RTN Building Block "WHERE"

This RTN building block is used to determine for each element of the processing input set that this element is written only into the processing output set when the RTN building block at the decision position 300 of this RTN building block "WHERE" delivers a value that is not zero. In case a set of values is delivered, definitions can be determined by the RTN building blocks "ALL" and "ANY", respectively, at the decision position 300.

RTN Building Block "MIN"/"MAX"

If from one data set in each case only those elements are to be selected which correspond to the biggest and smallest values, respectively, of a calculation for each element of the entire set, this can be determined by the RTN building blocks "MIN" and "MAX", respectively. If a certain set of the biggest and smallest values, respectively, are to be delivered, this can be carried out by a superordinated RTN building block ("set elements") which limits the number of elements of the processing output set of its RTN building blocks introduced at the decision position 300.

RTN Building Block "Set Elements Limiting"

If from the respectively current data set of a processing output set, based on the current sorting, only a certain number of elements is to be delivered, in this case an RTN building block "set elements limiting", recognizable i.e. by the keyword "#", can be used as superordinated RTN building block. This RTN building block determines that exactly the Xth element ("="), all elements up to ("<=") or starting from the (">=") Xth element of its processing input set is retrieved in its processing output set. A limitation can also be determined to a certain percentage with regard to the number of elements of the current data set in the processing input set ("%").

RTN Building Block "FIND"

Each processing function is respectively carried out on all input data sets of its processing input sets for each element, and the elements of the data set of the processing output set are taken as processing input set for the superordinated and subsequent RTN building block, respectively.

By using a particular RTN building block ("FIND"), it will be determined that the processing output set of the RTN building block "FIND" corresponds to the processing output set of this RTN building block without being changed, with the characterization that those elements which are present in the processing output set of the RTN building block which is introduced in the RTN building block "FIND" at the decision position 300, are marked in the delivered order in the processing output set of the RTN building block "FIND". Subsequent RTN building blocks each then independently carry out their processing functions on the respectively marked elements, instead of the entire set of data, with regard to the subsequent elements (RTN building block "NEXT") or the previous elements (RTN building block "PREV"). Further on the elements found in the processing functions are only marked. When using this RTN building block, the previous application of the RTN building block "ORDERBY" is quite useful.

If later an access to the entire set of data is to be carried out, this can be done, for example, by an extension in the RTN building block "FIND", which enables the calling of the decision position 300 as often as desired after a keyword that follows one of the first decision positions 300 (e.g. ":") and then necessarily prescribes at least one keyword (e.g. "END", "FIND"). Once this keyword is found, all marked elements of the processing output set of the last RTN building block in the RTN building block "FIND" at the decision position 300, which can be called as often as possible, are written into the processing output set of this RTN building block, and no other elements are marked any further, so that subsequent processing functions again access the entire set of data.

RTN Building Blocks "NEXT"/"PREV"

Each processing function is applied individually on each element in the processing data set. By doing so, it becomes possible, for example, to compare respective current elements with the values of subsequent ("NEXT") or previous ("PREV") elements. If the RTN building block "NEXT" has no superordinated RTN building block, from the entire set in each case only the Xth element ("="), all elements up to the Xth element ("<=") or all elements starting from the Xth element (">=") are delivered as processing output set of this RTN building block.

RTN Building Block "ANY"/"ALL"

For example, in the RTN building block "comparison", which compares the processing output sets of the RTN building blocks introduced at both decision positions 300, in cases where at least one of the introduced RTN building blocks returns a set of values, it can be determined whether all ("ALL") returned values or at least one ("ANY") of the returned values must match when being compared. In "ANY" it can also be determined that exactly ("="), at least (">=") or a maximum of ("<=") a certain number of elements must match for the comparison. In "ALL" it can be said that the comparison must match to exactly ("="), at least ("<=") or a maximum of (">=") X elements.

RTN Building Block "Intermediate Set"

If the processing output set of an RTN building block is to be stored for further processing with other RTN building blocks, this can be carried out by a superordinated RTN building block "intermediate set". This RTN building block indicates that its processing input set is temporarily stored in the set stated as variable name and can be used by all subsequent RTN building blocks as processing input set.

RTN Building Block "DO LOOP"

Certain problems may require that after each element of the processing input set of the RTN building block, which is introduced in the decision position 300 after the keywords "DO" ":" in the RTN building block "DO LOOP", with its element being subjected to the processing function of the introduced RTN building block, the processing output set of the RTN building block, which was stated at the decision position 300 after the keyword "UNTIL", is examined against not zero or not ZERO, and that depending thereon, the processing functions for this RTN building block are ended.

EXAMPLE 8

Take all companies of Vienna until the turnover2006 of the selected companies makes a total of more than 100,000 €.

```
SELECT
            DO :
                     WHERE (companies.city="VIENNA")
            LOOP UNTIL
                     SUM (companies.turnover2006) > 100000
```

By means of an RTN building block "set element forming" (",") these two processing output sets of the RTN building blocks, introduced at both decision positions 300 of this RTN building block, are combined into a combined processing output set of this RTN building block.

There are RTN building blocks that carry out different processing functions on their finally received processing input set depending on the final nesting present. The following two examples serve to illustrate this for two RTN building blocks affected from the total of RTN building blocks.

Depending on the nesting given, the RTN building block "IF-THEN-ELSE", which is to be allocated to the first generic group, carries out different processing functions, which may, however, be determined for each nesting present due to the total logic allocated to the RTN building blocks as processing-relevant RTN building block information:

The following abstract example serves to illustrate this:

EXAMPLE 9

```
Syntax to be analyzed:
[
IF date.year( ) < 2000 THEN
    FROM "data 1990-2000"
ELSE
    RESULTOF ( FROM "data current"
    WHERE "data current".year=date.year( ) )
END IF
AS    data
WHERE    data.field_A >=
    IF data.field_B = data.field_C THEN 500 ELSE 100
    END IF
]
```

The simplified and thus not completely resolved nesting of this statement desired at the end is as follows:

```
[    (1)*    (2)*    ]
    (1): (3)*    AS    data
        (3): IF (4)*    THEN    (5)*
        ELSE    (6)*    END IF
            (4): date.year( )    <=    2000
            (5): FROM    "data 1990-2000"
            (6): RESULTOF (    (7)*    (8)*    )
                (7): FROM    "data current"
                (8): WHERE "data current".year=date.year( )
    (2): WHERE (9)*
        (9): (10)*    >=    (11)*
            (10): data.field_A
            (11): IF    (12)*    THEN    (13)*
            ELSE    (14)*    END IF
                (12): data.field_B = data.field_C
                (13): 500
                (14): 100
```

To direct the focus of this example to the most important aspects, the nesting has not been completely resolved, so that the repeatedly used RTN building blocks "FROM *", "WHERE *", "* . *", etc., are not shown in a completely nested way.

In any case, it is evident that the RTN building block "IF-THEN-ELSE" provides, at its nesting position (3) used first and depending on the current year as its processing output set, either the processing set "data 1990-2000" or the result of the RTN building block (6) "processing_PrevParents bubble", which provides those elements, i.e. data sets, from the processing set "data current" at which the field "year" contains the current year. The obtained processing output set of this nesting position (3) is, due to the RTN building block (1) "AS" superordinated to this nesting position, called "data" in the following.

The second "IF-THEN-ELSE" used in this nesting at the nesting position (11) provides in its processing output set, depending on the element-wise comparison (12) data.field_B=data.field_C, for each element of its processing input set, the value of (13)500 or (14)100, which value is, in the superordinated RTN building block (9)"comparison", compared with the value provided for the same element at the nesting position (10)data.field_A.

An RTN building block also affected by this peculiarity is the RTN building block "comparison", which is to be allocated to the second generic group and contains the keyword "=" as one of its possible optional decision positions of its inner, directed decision graph. This is to be illustrated in the following example, which represents an extract of a given statement:

EXAMPLE 10

Syntax to be Analyzed:
WHERE    WHERE    (companies.city="Vienna")=Max ([events.turnover])#100

The nesting of this statement desired at the end is as follows:

```
WHERE    (1)*
    (1) : (2)*    =    (3)*
        (2): WHERE (4)*
            (4): (    (5)*    )
                (5): (6)*    =    (7)*
                    (6): (8)*    .    (9)*
                        (8): companies
                        (9): city
                    (7): "Vienna"
        (3): (10)*    #    (11)*
            (10): MAX    (12)*
                (12): (    (13)*    )
                    (13): [    (14)*    ]
                        (14): (15)*    .    (16)*
                            (15): events
                            (16): turnover
            (11): 100
```

Here, the RTN building block "comparison" is used at the nesting position (5), to compare each single value obtained for the elements from the processing output set of the RTN building block (6)"." with its two RTN building blocks again subordinated thereto (8)companies and (9)city with the constant value (7)"Vienna" and to add the positively compared elements to its processing output set.

The same RTN building block "comparison" is used at the nesting position (1), to take on exactly those elements of the two processing input sets finally obtained for its processing function, i.e. the processing output sets of the RTN building blocks directly subordinated thereto (2)"WHERE" and (3)"set elements limiting" for its processing output set, which is found in both of its finally obtained processing input sets.

Thus, the result of the syntax shown above is all companies from the city of "Vienna", the event turnover not defined of which is among the 100 highest event turnovers of all companies. The same result can of course also be obtained with differently written statements that are not shown because this example serves to illustrate the RTN building block "comparison".

Further RTN building blocks also carrying out different processing functions depending on the final nesting are the RTN building blocks "addition/subtraction operations" and "multiplication/division operation", which each have a different weighting allocated thereto because of the precedence of multiplication and division over addition and subtraction.

A Syntax Easy to Analyze
SELECT companies.turnover * 1.2
provides the result of the above operation.

In the following syntax to be analyzed
SELECT companies * departments
the RTN building block "multiplication/division operation" does not serve for multiplying two numbers but for forming a Cartesian product that can be limited by subsequent, e.g. neighboring, RTN building blocks.

Similarly, the RTN building block "addition/subtraction operations" can, when a decision position keyword "+" is reached, use a "UNION" (depending on the definition optionally also "UNION ALL") as processing function on its two final processing input sets, and when the decision position keyword "−" is reached, use a processing function EXCLUDE" on its two final processing input sets.

Thus, a given syntax
( WHERE (companies.city="Vienna") )
−
( MAX (companies.number_of_employees)  # 100 )

might for example only provide those companies from Vienna, the number of employees of which is not among the 100 largest.

Such nesting-dependent processing functions in an RTN building block can be easily carried out by a further allocation of the RTN building blocks to new groups, which determines these facts for single RTN building blocks by means of processing-relevant RTN building block information.

Similarly it may be determined which RTN building blocks may not be directly nested until a useful processing function is defined for such cases. Due to a given nesting, questions may be asked, namely in those cases in which more than one interpretations are permissible due to the given syntax.

The following example shows a case in which an automatic inquiry to the user may be necessary for a clear interpretation of the syntax to be analyzed:
Extract of a syntax to be analyzed:
BREAKON companies.city WHERE (companies=5)
This example allows at least three interpretations, wherein the user can decide which one of these three interpretations he actually wishes to evaluate:
$1^{st}$ possible interpretation:
Continue further analysis only if the processing input set of the set of companies, which corresponds to the processing input set of the RTN building block "brackets" and thus the processing input set "WHERE", contains exactly 5 elements (i.e. 5 companies).
In this case, the processing output set of the RTN building block "WHERE" would provide all elements (i.e. all companies) of a city in those cases in which exactly 5 elements (i.e. 5 companies) are present in this city, in all other cases the processing output set of the RTN building block "WHERE" would provide the value ZERO.
$2^{nd}$ possible interpretation:
In the processing output set of the RTN building block "WHERE", provide exactly the $5^{th}$ company of the processing input set of the same RTN building block. The processing output set of the RTN building block "WHERE" would thus, by means of the current sorting, provide exactly the $5^{th}$ element (i.e. the $5^{th}$ company—if at least 5 companies are present in the respective city) for each city for further processing.
$3^{rd}$ possible interpretation:
Provide all elements of the processing input set of the RTN building block "WHERE" that contain the value 5 in at least one (number) field of the table Companies. The processing output set of the RTN building block "WHERE" would thus provide all elements of the table Companies for each city for further processing that contain the value 5 in at least one (number) field of the table.
Further RTN building blocks are the RTN building blocks "table RTN building block" and "table field RTN building block", respectively, which contain the names of all tables and stored queries and table and query fields, respectively, in the current relational database as well as the RTN building blocks "variable", "number", "constants" (definition of valid constants), "global functions" (for a user to define embedded functions in another language, such as "CurrentUser( )"), RTN building blocks for comparisons (">", ">=", "<=", "<>", "=", "BETWEEN", "IN", . . . ), for logical operations ("AND", "OR", "XOR", . . . ), for the logical negation ("NOT"), for the combination into RTN building blocks ("( )") and for computer operations ("+", "−", "*", "/", "\", "^", "mod", "SQR", "LIM", . . . ).

A preferred variant are RTN building blocks for aggregate functions ("count", "all", "none", "sum", "AVG", "percent", . . . ) which are applied each on the elements of the processing input set allocated to them and which redeliver for each input data set exactly one value in their output data set.

RTN building blocks for data manipulation and data output, respectively, are necessary. Prior art commands of this kind can be suitably taken on as RTN building blocks, as is the case with "SELECT", "UPDATE", "INSERT INTO" and "DELETE", for example.

RTN building blocks can be introduced which define the SQL-usable join links "left join", "right join", "inner join" and "outer join". There can be RTN building blocks that contain functions of OLAP, T-SQL, GEO-SQL and functions defined in other SQL extensions.

Furthermore, it is possible to define convertible RTN building blocks, as is the case with RTN building block "IN", for example: Value IN (1, 2, 3, 4, 5) can be defined as RTN building block * "IN" "(*)", with * "," * being an RTN building block of its own. The RTN building block IN is identical with value=ANY (1, 2, 3, 4, 5) and can be either converted into these RTN building blocks or processed by the engine as such. The same holds for possible RTN building blocks UNION (ALL), INTERSECT, EXCLUDE which either combine sets without (UNION) or with (UNION ALL) duplicates and take only elements that are present in both stated sets (INTERSECT) or take only elements which are present in neither of the two sets (EXCLUDE). These RTN building blocks can be represented in combination with the RTN building blocks "ANY"/"ALL" with optionally the RTN building block "GroupBy" and can also be converted into these RTN building blocks.
(1, 2, 3, 4) UNION ALL (3, 4, 5, 6)=ANY (>=1)(1, 2, 3, 4), (3, 4, 5, 6)
>=1 is taken as standard and need not be stated.
(1, 2, 3, 4) UNION (3, 4, 5, 6)=GROUPBY ANY (>=1)(1, 2, 3, 4), (3, 4, 5, 6)
can be processed differently by the optimizer
(1, 2, 3, 4) INTERSECT (3, 4, 5, 6)=ALL (1, 2, 3, 4), (3, 4, 5, 6)
(1, 2, 3, 4) EXCLUDE (3, 4, 5, 6)=ANY (=1) (1, 2, 3, 4), (3, 4, 5, 6)

As is evident, it is possible to make much more precise descriptions with more than two sets by ANY and ALL, as it would be the case with UNION etc. A definition of these RTN building blocks can also be carried out for reasons of compatibility with SQL as well as for reasons of a more convenient applicability, especially because the presence of a multiplicity of RTN building blocks does not pose a disadvantage.

The same can be done with the RTN building blocks "AND", "OR"/"XOR": These RTN building blocks can be represented by combining the RTN building blocks "ANY"/ "ALL" with the RTN building block "processing_SameParents" and can be converted into these RTN building blocks.

```
WHERE (companies.industry="sale") AND
(MAX(companies.[employees.count])#100)
=
ALL companies.//WHERE (company.industry="sale")
MAX([employees.count])#100\\
WHERE (companies.industry="sale") OR
(MAX (companies.[employees.count])#100)
=
ANY    (>=1)    companies.//WHERE    (companies.industry="sale")
MAX([employees.count])#100\\
WHERE (companies.industry="sale") XOR
(MAX(companies.[employees.count])#100)
=
ANY    (=1)    companies.//WHERE    (companies.industry="sale")
MAX([employees.count])#100\\
```

WHERE (companies.industry="sale") AND (companies.[employees.count]>100) may, for example, also be represented in this way because the processing output set of the first outer RTN building block "WHERE" is handed over to the second outer RTN building block "WHERE" as processing input set:

WHERE (companies.industry="sale") WHERE (companies.[employees.count]>100)

Further convertible RTN building blocks are, for example, the RTN building block "set elements limiting", which can be converted into the RTN building block "FOR-NEXT", "IF THEN ELSE", which can be converted into the RTN building block "SELECT CASE", the RTN building block "count", which can be converted into the RTN building block "SUM" and "1", etc.

A query consists of a first initial RTN building block, concretely the RTN level element which comprises a necessary number of RTN building blocks in a given order.

By definition there are RTN building blocks which start with a decision position 300 in the decision graph. For determining the used RTN building blocks in each statement it is necessary to carry out a conversion step prior to the application of the selection steps on the first statement in order to divide up the RTN building blocks into two generic groups and to memorize the corresponding generic group for each RTN building block for the further processing.

In a conversion step prior to the application of the selection step, each RTN building block is allocated to either a first or a second generic group, with the RTN building blocks beginning with text, symbol, variable or number being allocated to the first generic group and being converted in such a way that the decision positions which include a recursive query function the selection step of which is applied to all RTN building blocks, are limited to the extent that the selection step can only be applied to the RTN building block of the first generic group, and the RTN building blocks beginning with a recursive query function being allocated to the second generic group and are being converted in such a way that the first decision position is removed, and with decision positions which include a recursive query function the selection step of which is applied to all RTN building blocks, being limited to the extent that the selection step is only applied to the RTN building block of the first generic group, and all RTN building blocks of the first generic group and those RTN building blocks of the second generic group ending with a text, symbol, variable or number at the last decision position being appended an optionally executable decision position at the last position where the selection step is only applied to the RTN building blocks of the second generic group.

For illustration, this conversion step will again be shown for several of the newly defined RTN building blocks:

As an example, in the following the conversion of an RTN building block without decision position 300 as first decision position in the decision graph is shown:
"("*")"
is converted into
"(" RTN building block of first generic group ")" [RTN building block of second generic group]

As an example, in the following the conversion of an RTN building block with decision position 300 as first decision position and with decision position 300 as last decision position in the decision graph is shown:
*("+"|"−")*
is converted into
("+"|"−") RTN building block of first generic group As an example, in the following the conversion of an RTN building block with decision position 300 as first decision position and without decision position 300 as last decision position in the decision graph is shown:
* "IN" "("*")"
is allocated to the second generic group and converted into
"IN" "(" RTN building block of first generic group ")" [RTN building block of second generic group]

This conversion step ensures that each given statement can be transformed into RTN building blocks through prior art algorithms, thus making it possible to use the full flexibility of the RTN building blocks when formulating queries.

Following this conversion step each RTN building block starts with at least one text, at least one symbol, one variable or one number, and each selection step is from then on only applied to RTN building blocks of the first generic group or only on RTN building blocks of the second generic group. Furthermore, after this conversion step, RTN building blocks of the second generic group are optionally called only at the last decision position of a decision graph.

As mentioned above, the required conversion into the two generic groups specifically leads to a nesting of the RTN building blocks, which does not apply to the further processing because in each case one RTN building block of the first generic group, if present in the statement, calls an RTN building block of the second generic group, with this RTN building block of the second generic group always being superordinated to at least this calling RTN building block of the first generic group. By definition there are RTN building blocks which start with a decision position 300 in the decision graph. In these RTN building blocks it cannot be confirmed clearly for multiple nestings which RTN building blocks they are superordinated to because at one decision position 300 all RTN building blocks of the first or second generic group can be introduced, which is not clear in nestings of RTN building blocks.

EXAMPLE 11

The following simple example serves to explain the above:
WHERE A+B/C

In the first step the nesting of the RTN building blocks is shown after having executed the selection steps on the statement.

WHERE RTN building block of the first generic group [RTN building block of the second generic group]
    A [RTN building block of the second generic group]
        + RTN building block of the first generic group -continued B [RTN building block of the second generic group]
 / RTN building block of the first generic group
  C [RTN building block of the second generic group]

Now it is clear that for the RTN building block "+" at the first decision position 300 there are the following two introduction possibilities:

```
* (WHERE *)      +      *
* (A)            +      *
```
In the same way, there are two introduction possibilities for the second decision position 300 of the RTN building block "+":
```
*                +      * (B)
*                +      * (* / *)
```
For the RTN building block "/" there are the following three introduction possibilities for its first decision position 300:
```
* (WHERE *)      /      *
* (* + *)        /      *
* (B)            /      *
```
For the RTN building block "/" there is only one introduction possibility for its second decision position 300:
```
*                /      * (B)
```

For clearly and correctly solving these simple as well as more complex cases it is necessary to allocate to each RTN building block a first and second weighting, with the weighting for the individual RTN building blocks being determined according to the following method, taking into account the nesting among one another of all RTN building blocks found in the statement:

Each RTN building block is allocated a first weighting by means of which the nesting of the RTN building blocks is changed into a nesting that is usable for subsequent processing during each selection step or after having applied all selection steps by superordinating RTN building blocks with a higher first weighting in each case to the originally superordinating RTN building blocks which have a comparably lower first weighting.

The first weighting of all RTN building blocks of the first generic group depends on RTN building blocks of the second generic group which are directly superordinated in the statement, which is why the first weighting that is allocated to the RTN building blocks of the first generic group is described as initial weighting.

The RTN building blocks of the first generic group have an identical first initial weighting, preferably of an average height, and these RTN building blocks of the first generic group, when being introduced into RTN building blocks of the second generic group, take on their first weighting which is decreased by a single value, preferably by one.

As an example the RTN building block "table field" receives, as all other RTN building blocks of the first generic group as well, a first initial weighting 200, with the RTN building block "addition/subtraction operations" having a weighting 17.

Taken "A" (table field) "+" (addition/subtraction operations) "B" (table field), both RTN building blocks table field, instead of their original first initial weighting 200, are allocated the first weighting 17, decreased by one, of the RTN building block addition/subtraction operations which is to be superordinated to them. Both table field RTN building blocks thus receive, due to the statement, a weighting 16 and are both, because of their low first weighting (16), subordinated to the addition/subtraction operations RTN building block (weighting 16).

The first weighting for the RTN building blocks of the second generic group is determined as follows:

Those RTN building blocks of the second generic group which apply their processing function to the processing output set of a processing function of an RTN building block of the first or second generic group form a first generic subgroup of the second generic group, and each is allocated the same first weighting which is not the highest possible weighting but higher than the first initial average height weighting of the RTN building blocks of the first generic group.

In this way, for example, the processing function RTN building blocks * "UNION" *, * "#" * and * "AS" V:variable name is each applied to the processing output set and processing output sets, respectively, of the RTN building blocks of the first or second generic group, which are directly introduced at their decision position 300, which is why the RTN building blocks of the first generic subgroup are allocated to the second generic group and receive a first weighting of 250, with 200 being the first weighting of the RTN building blocks of the first generic group and 255 being assumed as the highest possible weighting.

As a result, it is ensured that the RTN building blocks of the first generic subgroup of the second generic group are always superordinated to the RTN building blocks of the first and second generic group, and therefore, by definition are allocated their processing output set as their processing input set.

Those RTN building blocks of the second generic group the processing output set of which is taken as processing input set for other RTN building blocks of the first or second generic group, form a second generic subgroup of the second generic group and are allocated a respectively different first weighting which in any case is smaller than the first initial average height weighting of the RTN building blocks of the first generic group, and this first weighting for the respective RTN building blocks individually describes the predeterminable order of the processing with regard to the RTN building blocks of the second generic subgroup of the second generic group by allocating, in each case, a lower first weighting to the respectively first to execute RTN building block of this group.

Thus, for example, the RTN building block "multiplication/division operations" receives a first weighting 14, the RTN building block "addition/subtraction operations" receives a higher first weighting 17, the RTN building block "comparison" receives a first weighting 50 and the RTN building block "Bool combination" receives a first weighting 100.

This becomes clear from the desired nesting of: A+B*C>D AND E=F

All first weightings stated herein are smaller than the first initial weighting 200 of the RTN building blocks of the first generic group.

In order to exclude wrong nestings in the RTN building blocks of the first and second generic group in which after a decision position 300 at least a further decision position follows before the optionally added last decision position 300, which is added after the conversion step, the allocation of a second weighting of maximal height for exactly these RTN building blocks becomes necessary. Concrete, wrong nestings would otherwise result just exactly when at least one RTN building block of the first generic subgroup of the second generic group is introduced in these RTN building blocks at a decision position 300 which is not last, i.e. an RTN building block which has a higher weighting than the average weighting height of the RTN building blocks of the first generic group. These RTN building blocks, despite their higher first weighting, must not be nested over RTN building blocks with a maximum second weighting until these RTN building blocks with a maximum second weighting in the decision path have reached the last optionally introduced decision position 300 after the conversion step.

Therefore, all RTN building blocks of the first and second generic group in which after a decision position 300 that prescribes introducing at least one RTN building block of the first generic group, at least a further decision position follows independently from the last optional decision position 300, which is optionally present after the conversion step and prescribes introducing an RTN building block of the second generic group, are allocated a second, fixed weighting with the highest possible weighting height.

The RTN building block "WHERE" serves as an example of an RTN building block of the first generic group which by definition is not allocated a second weighting of maximum height:

"WHERE" * after conversion step:
"WHERE" RTN building block of the first generic group [RTN building block of second generic group]

In this RTN building block no other decision position after the first decision position 300 follows, with the exception of the last, optional decision position 300, added by the conversion step. Thus, the second weighting for this RTN building block can receive the value of the first weighting of this RTN building block.

The RTN building block "summarizing RTN building block" (in brackets) and the RTN building block "for next" are two examples of RTN building blocks of the first generic group which by definition are allocated a second weighting of maximum height:

---

"(" * ")"  after conversion step:
"(" RTN building block of the first generic group ")" [RTN building block of the second generic group]
"FOR" * ":" * "NEXT"  after conversion step:
"FOR" RTN building block of the first generic group ":" RTN building block of the first generic group
"NEXT" [RTN building block of the second generic group]

---

In these RTN building blocks each time at least one decision position follows always additionally to the last, optional decision position 300, added by the conversion step, after each first decision position 300. Thus, the second weighting for these RTN building blocks corresponds to the highest possible weighting height, concretely 255. The same holds for the RTN building blocks of the second generic group. This is shown, for example, for the RTN building block "addition/subtraction operations" and for the RTN building block "IN comparing":

---

* ("+" | "−") *  after conversion step
("+" | "−") RTN building block of the first generic group

---

In this RTN building block after the conversion step no other decision position follows after the only decision position 300. Thus, the second weighting for this RTN building block can, for example, receive the value of the first weighting of this RTN building block.

---

* "IN" "(" * ")"  after conversion step:
"IN" RTN building block of the first generic group [RTN building block of the second generic group]

---

In this RTN building block a decision position follows after the first decision position 300, additionally to the last, optional decision position 300, added by the conversion step. Thus, the second weighting for this RTN building block corresponds to the highest possible weighting height, concretely 255.

For determining the nesting which is necessary for the further processing of each RTN building block with regard to each RTN building block in the statement, superordinated thereto by the execution of the selection steps after the conversion step, it applies that the first weighting of each RTN building block of the second generic group in the nesting order which results from the query statement after the conversion step, is compared with the first weighting of the respective superordinated RTN building block until the respective RTN building block of a higher first weighting or the respective superordinated RTN building block which is not located at its last decision position and has a second weighting of the highest possible weighting, is reached, and according to this determined nesting order the RTN building block, acting as the basis for the comparison, is directly subordinated to the reached RTN building block and thus superordinated to all RTN building blocks which were skipped in the comparisons and had been previously superordinated.

This is explained by the following example:

EXAMPLE 12

| Syntax to be analyzed: | |
| --- | --- |
| IF A THEN WHERE B=C # 5 ELSE WHERE D=E #10 END IF # 20 | |
| The nesting which applies for the further processing in this example 12 is as follows: | |
| *(1.1) # *(1.2) | first weight. 250, second weight 250 |
| (=1.1) IF *(2.1) THEN *(2.2) ELSE *(2.3) END IF | first weight. 200, second weight. 255 |
| (=2.1) A | first weight. 200, second weight. 1 |
| (=2.2) *(3.1) # *(3.2) | first weight. 200, second weight. 200 |
| (=3.1) *(4.1) = *(4.2) | first weight. 50, second weight. 50 |
| (=4.1) B | first weight. 49 (initial 200), second weight. 1 |
| (=4.2) C | first weight. 49 (initial 200), second weight. 1 |
| (=3.2) 5 | first weight. 249 (initial 200), second weight. 1 |
| (=2.3) *(5.1) # *(5.2) | first weight. 250, second weight. 250 |
| (=5.1) *(6.1) = *(6.2) | first weight. 50, sec. weight. 50 |
| (=6.1) D | first weight. 49 (initial 200), second weight. 1 |
| (=6.2) E | first weight. 49 (initial 200), second weight. 1 |
| (=5.2) 10 | first weight. 249 (initial 200), second weight. 1 |
| (=1.2) 20 | first weight. 249 (initial 200), second weight. 1 |
| with first weight. .......... being first weighting | |
| second weight. ..... being second weighting | |
| initial .............. being the initial weighting of the RTN building blocks of the first generic group which is stated if it is changed by the introduction into an RTN building block of the second generic group. | |

Here, it can be seen that the RTN building block "#" having a first weighting 250 is only superordinated to the RTN building block "IF THEN ELSE END IF" having a first weighting 200 and a second weighting 255 after this has reached its last decision position.

For the sake of completeness of the description of example 12, the nesting shall be shown which in this example results from the execution of the selection steps after the conversion step:

| | | |
|---|---|---|
| IF | | Call: RTN building block of the first generic group |
| A | | |
| THEN | | Call: RTN building block of the first generic group |
| | WHERE | Call: RTN building block of the first generic group |
| | B | Call: RTN building block of the second generic group |
| | = | Call: RTN building block of the first generic group |
| | C | Call: RTN building block of the second generic group |
| | # | Call: RTN building block of the first generic group |
| | 5 | |
| ELSE | | Call: RTN building block of the first generic group |
| | WHERE | Call: RTN building block of the first generic group |
| | D | Call: RTN building block of the second generic group |
| | = | Call: RTN building block of the first generic group |
| | E | Call: RTN building block of the second generic group |
| | # | Call: RTN building block of the first generic group |
| | 10 | |
| END IF | | Call: RTN building block of the second generic group |
| | # | Call: RTN building block of the first generic group |
| | 20 | |

RTN building blocks of the first generic group are subordinated to the RTN building block of the first or second generic group which is directly superordinated to them, independent of their own and of the first weighting of the RTN building blocks superordinated to them.

EXAMPLE 13

Syntax to be analyzed: WHERE A+MIN B
Example 13 is nested as follows:

| | |
|---|---|
| WHERE * (1.1) | first weight. 200, second weight. 200 |
| (=1.1) *(2.1) + *(2.2) | first weight. 50, second weight. 50 |
| (=2.1) A | first weight. 49 (initial 200), second weight. 1 |
| (=2.2) MIN *(3.1) | first weight. 49 (initial 200), second weight. 200 |
| (=3.1) B | first weight. 200, second weight. 1 |

As can be seen from example 13, the RTN building block "B", as an RTN building block of the first generic group, is subordinated with its first weighting 49 which is changed by its superordinated RTN building block of the second generic group "+", despite its higher first weighting 200, when compared with the thereto superordinated RTN building block "MIN".

If a superordinated RTN building block with the same first weighting is present when comparing the first weighting of RTN building blocks of the second generic group, the proceedings vary depending on the respective generic subgroup:

If the RTN building block of the second generic group which is to be compared with one of the superordinated RTN building block that is also of the second generic subgroup has the same first weighting, the RTN building block which needs to be compared is directly subordinated to this RTN building block, given these RTN building blocks are RTN building blocks of the second generic subgroup of the second generic group.

The following example serves to explain the above:

EXAMPLE 14

| | |
|---|---|
| WHERE A MOD B / C \ D | |
| WHERE *(1.1) | first weight. 200, second weight. 200 |
| (=1.1) *(2.1) MOD *(2.2) | first weight. 14, second weight. 14 |
| (=2.1) A | first weight. 13 (initial 200), second weight. 1 |
| (=2.2) *(3.1) / *(3.2) | first weight. 14, second weight. 14 |
| (=3.1) B | first weight. 13 (initial 200), second weight. 1 |
| (=3.2) *(4.1) \ *(4.2) | first weight. 14, second weight. 14 |
| (=4.1) C | first weight. 13 (initial 200), second weight. 1 |
| (=4.2) D | first weight. 13 (initial 200), second weight. 1 |

In example 14, when comparing the first weighting, RTN building blocks of the second generic subgroup of the second generic group meet twice ("/" meets "MOD", "\" meets "/"). Due to the allocation to the second generic subgroup of the second generic group, these RTN building blocks are each subordinated because it is defined that the processing output set of the subordinated RTN building blocks is taken as processing input set of each superordinated RTN building block. By using the RTN building block "RTN building block summarizing", i.e. by bracketing, another first and second weighting and thus another computing order is obtained.

If the RTN building block of the second generic group which is to be compared has the same first weighting as one of the superordinated RTN building blocks that are also of the second generic subgroup, the comparison with the superordinated RTN building blocks is continued as long as these RTN building blocks are RTN building blocks of the first generic subgroup of the second generic group.

The following example serves to explain the above:

EXAMPLE 15

Take all elements for which A applies. From this set take the first 100, store these 100 elements in the intermediate set1 and from this intermediate set1 take the first 50 elements.

| | |
|---|---|
| Syntax to be analyzed: WHERE A # 100 AS intermediate set # 50 | |
| *(1.1) # *(1.2) | first weight. 250, second weight. 250 |
| (=1.1) *(2.1) AS Zwischenmenge | first weight. 250, second weight. 250 |
| (=2.1) *(3.1) # *(3.2) | first weight. 250, second weight. 250 |
| (=3.1) WHERE *(4.1) | first weight. 249 (initial 200), second weight. 200 |
| (=4.1) A | first weight. 200, second weight. 1 |
| (=3.2) 100 | first weight. 249 (initial 200), second weight. 1 |
| (=1.2) 50 | first weight. 249 (initial 200), second weight. 1 |

In example 15, when comparing the first weighting, RTN building blocks of the first generic subgroup of the second generic group meet twice ("AS" meets "#", "#" meets "AS"). Due to the allocation to the first generic subgroup of the second generic group, these RTN building blocks are each prearranged because it is defined that the processing output set of the subordinated RTN building blocks is taken as processing input set of each superordinated RTN building block.

It is important that RTN building blocks which are directly introduced into a decision position 300 of an RTN building block of the highest possible second weighting are only subordinated to RTN building blocks of the second generic group if it is desired for the respective RTN building block. This is done by a method wherein the RTN building blocks of the first generic group which are predetermined to be subordinated to the RTN building blocks of the second generic group when the RTN building blocks of the first generic group are directly introduced into one of the decision positions of the RTN building block at which one from the total of RTN building blocks is introducible, with the RTN building block having a second highest possible weighting height, are allocated a second weighting of minimum weighting height, and the RTN building blocks of the first generic group which have no second weighting of a minimum height, in such cases, are not subordinated to RTN building blocks of the second generic group.

Two examples are to show the nesting for these two possible cases which, after the above described method, results in the following:

EXAMPLE 16

First possible case: At the decision position 300 of the superordinated RTN building block of the second weighting with the highest possible weighting height, an RTN building block of the first generic group of a second weighting is introduced that is not the weighting of the minimum weighting height, with the keyword in the example being "WHERE":
[WHERE MAX A+B/C=D]
The nesting which applies for the further processing in example 16 is as follows:

| | |
|---|---|
| [ *(1.1) ] | first weight. 200, second weight. 255 |
| (=1.1) WHERE *(2.1) | first weight. 200, second weight. 200 |
| (2.1) *(3.1) = *(3.2) | first weight. 50, second weight. 50 |
| (=3.1) MAX *(4.1) | first weight. 49 (initial 200), second weight. 200 |
| (=4.1) *(5.1) + *(5.2) | first weight. 17, second weight. 17 |
| (=5.1) A | first weight. 16 (initial 200), second weight. 1 |
| (=5.2) *(6.1) / *(6.2) | first weight. 14, second weight. 14 |
| (=6.2) B | first weight. 13 (initial 200), second weight. 1 |
| (=6.3) C | first weight. 13 (initial 200), second weight. 1 |
| (=3.2) D | first weight. 49, second weight. 200 |

The RTN building block "MAX" is subordinated to the RTN building block with the keyword "/" because its superordinated RTN building block "WHERE" has no weighting of the highest possible weighting height.

The RTN building block "WHERE" is to be subordinated to the RTN building block with the keyword "=" according to the global definition, which does not happen in this case because its superordinated RTN building block "levels" ("[]") has the second highest possible weighting height while the RTN building block "WHERE" does not have the second weighting of a minimum weighting height.

If a different nesting of the RTN building blocks is to be effected, this can be done by using the RTN building block "RTN building block summarizing" ("( )"), e.g. WHERE (MAX (A+B/C)=D), equivalent to MAX A+B/C

EXAMPLE 17

Second possible case: At the decision position 300 of the superordinated RTN building block with second weighting of the highest possible weighting height there is introduced an RTN building block of the first generic group with a second weighting of a minimum weighting height, which is keyword "A" in the example:

| | |
|---|---|
| [ A + B ] | |
| [ *(1.1) ] | first weight. 200, second weight. 255 |
| (=1.1) *(2.1) + *(2.2) | first weight. 17, second weight. 17 |
| (=2.1) A | first weight. 16 (initial 200), second weight. 1 |
| (=2.2) B | first weight. 16 (initial 200), second weight. 1 |

Example 17 shows that the RTN building block "addition/subtraction operations" is superordinated to the RTN building block "table field" (A) because the RTN building block "A" is directly introduced in the decision position 300 of the RTN building block "levels", the RTN building block A has a second weighting of a minimum weighting height and the directly superordinated RTN building block "levels" has a second weighting of the highest possible weighting height.

A further embodiment of the invention is given in cases where, according to the statement, RTN building blocks of the second generic group which, after the conversion step, are followed by an optional decision position that prescribes introducing an RTN building block of the second generic group, are introduced an RTN building block of the second generic group at exactly this optional decision position.

In such cases the RTN building block introduced at this last decision position is always and independent of the first and second weightings of the two RTN building blocks in question superordinated to the previously superordinated RTN building block.

This is illustrated by the following example which indicates that the value of field A in the variant "intermediate set" is to be stored, to this variable "intermediate set" the value of field B is to be added and then examined whether this value corresponds to value C, and that the result of this comparison in turn is to be stored in the variable "ResultIN".
A AS intermediate set+B IN (C) AS result IN Here, despite its lower first weighting 17, the RTN building block with the keyword "+" is superordinated to the RTN building block with the keyword "AS" with the first weighting 250. The same happens with regard to the RTN building blocks with the keywords "IN" and "AS", with the first weighting of the RTN building block having the keyword "AS" that has to be superordinated, independently being higher (250) than the first weighting (60) of the RTN building block having the keyword "IN".

According to the RTN building blocks, RTN building block groups can also be defined as statements or parts of statements which, for example, include only processing functions of the arithmetic or logic type. For such cases it is agreed that all RTN building blocks of the first and second generic group can be allocated at least one RTN building block which is and are, respectively, to be superordinated when the RTN building blocks of the first and second generic group are directly introduced in a decision position of an RTN building block with the highest possible second weighting at which one from all of the RTN building blocks can be introduced.

In parts, the following RTN building blocks contain the allocations stated below as long as they are directly introduced in a decision position 300 of an RTN building block of a second weighting with the highest possible weighting height:

RTN building block "table field": This RTN building block can be automatically prefixed a "SELECT" RTN building block, the RTN building block "table" which contains the name of the table in this field as well as the RTN building block "value linkage" to relate the two RTN building blocks "table" and "table field" to each other.

EXAMPLE 18

[TABLE_FIELD_NAME]
which, after the automatic prefixing, results in:
[SELECT TABLE_NAME.TABLE_FIELD_NAME]

RTN building block "table": This RTN building block can be preceded with a "SELECT" RTN building block for the delivery of all table fields.

EXAMPLE 19

[TABLE_NAME]
which, after the automatic prefixing, results in:
[SELECT TABLE_NAME.*]

RTN building blocks that carry out computing or comparative operations: These RTN building blocks can be prefixed a "WHERE" RTN building block, and if also not present, a "SELECT" RTN building block which, for example, delivers all fields of all used tables with the respectively necessary RTN building blocks "set element forming" and "value linkage".

EXAMPLE 20

[A+B]
which, after the automatic prefixing, results in:
[SELECT TABLE_NAME.A, TABLE_NAME.B WHERE TABLE_NAME.A+TABLE_NAME.B]

Table 1 and table 2 contain a list of possible RTN building blocks with respective first and second weightings and the decision graph of the RTN building blocks, in which, when the decision graph of the RTN building blocks is run at the decision positions, the keywords of the query statements are compared, depending on the associated mark, either with a text, a symbol, a variable or a number or an RTN building block is inserted from the total of RTN building blocks, which in turn is again run.

Because of the fact that at each decision position 300 one can always select from the total of RTN building blocks, more degrees of freedom are possible when formulating query statements, as compared with a limited choice at the decision positions.

The RTN building block "NEXT" is to serve as an example which redelivers from its processing input set per current element the next elements listed at the decision position 300 in its processing output set.

If instead of the decision position 300, for example, only a number was allowed, only the number of the next elements which are to be delivered per current element could be determined, and by means of the decision position 300 at the first decision position 300 of which in turn the RTN building block "WHERE" is introduced, those elements could be delivered by the RTN building block "set elements limiting" which follow the current element and are located in the processing output set of the RTN building block "set elements limiting". Accordingly, this applies to all RTN building blocks. By means of the RTN building block "MAX", for example, exactly the subsequent element with the highest listed value in the decision position 300 of the RTN building block "MAX" could be searched, starting from the current element.

The following, abstracted example serves to illustrate this.

EXAMPLE 21

ORDERBY A
NEXT (WHERE B=C # 100)
NEXT (MAX D # 20)

Here, the set is sorted by value A, following which exactly those 100 elements are delivered for each element of the set where the comparison B=C applies. From this set, the set of the subsequent 20 elements is then delivered the value D of which is among the 20 highest, starting from the current element.

EXAMPLE 22

The position of the share named test share as per Jan. 1, 2006 is to be found and taken for further computation in that the number of days having passed until the share has risen by 20% since that date is to be displayed.

WHERE (shares.name="test share")
ORDERBY shares.date
FIND WHERE (shares.date=01.01.2006) AS position010106
SELECT NEXT (WHERE (shares.position>=position010106*1.2 # 1).date-shares.date Description of the statement in example 22:
Search the share named "test share"
Sort these shares by date
Search exactly the element where the date is Jan. 1, 2006 and store this element in the variable position01012006.
Based on the element marked by "FIND" as the current element, those shares are to be searched the position of which, starting from the current element, is greater by 20% than the value stored in the variable position010106.
1 limits the elements found by WHERE to the first element, and therefore, NEXT also delivers only the value of the first element for which WHERE applies.
NEXT must be used to enable the comparison of the values of the found elements with a value of the current element, with the number of days passed being computed in the example in this way.
Display of the result by the keyword SELECT.
In this connection, for example, the following marks are used:
Decision positions given in [ ] are to be carried out only optionally, expected keywords are indicated by "", ("keyword1" | "keyword2") represent "keyword1" OR "keyword2", * represents the decision position 300, (x) and (*x), respectively, each mark jump positions from one position (*x) to another position (x) and V:variable name and V:number, respectively, stand for a freely selectable variable and number, respectively.

The RTN building blocks are arranged in the order that approximately corresponds to the frequency of usage of these RTN building blocks in a statement, so that frequent RTN building blocks can be found earlier and as little comparisons as possible are needed.

The RTN building blocks are shown both before the conversion step (table 1) into the two generic groups and after the conversion step (table 2).

It should be noted that this list can be conveniently extended anytime by further RTN building blocks, therefore not being exhaustive.

The specific query language defined above has numerous advantages over query languages according to the state of the art, the most widely used of which is the query language SQL, especially regarding the simple formulation of statements and subsequent optimization possibilities, which will be shown by means of very simple examples:

EXAMPLE 23

A table "company" is given which includes at least the field "company_name" and "city".

First Problem: All Companies from Cities with More than 100 Companies

| One possible description in SQL (prior art): |
| --- |
| SELECT companies.* <br>     FROM companies, (SELECT companies.city <br>     FROM companies <br>     GROUP BY companies.city <br>     HAVING (count(*)>100) <br>     ) AS companies_cities_more_than_100 <br>     WHERE (companies.city=companies_cities_more_than_100.city) |

The set of companies is taken, combined according to city and only those cities are memorized which have more than 100 companies. This set has a Cartesian linkage with the set of companies and there are taken only companies the field "city" of which can also be found in the set of cities with more than 100 companies.

Disadvantage: The set of cities must be stored and the set of the companies must be run twice and compared once with the cities.

One possible description in RTN building blocks according to the inventive method:
SELECT companies.*
WHERE (companies.city.WHERE([companies.count] >100))

The set of companies is taken, for each company it is examined whether more than 100 companies are found in this city. The found companies are output. Naturally, the processing is formulated much better by the optimizer.

EXAMPLE 24

Second Problem: From Each City 100 Random Companies

| One possible description in SQL (prior art): |
| --- |
| SELECT* <br> FROM ( <br>   SELECT companies.*,row_numberate( ) OVER companies.city AS company_of_city <br>   FROM company <br> ) <br> WHERE (companies_of_city<=100) |

Number the set of companies, restart with each city, store it in one set and take all elements from this set the numeration of which is <=100.

ONE possible description with flexible RTN building blocks according to an inventive method:
SELECT companies.*
BREAKON companies.city
FIRST #100

This, compared to SQL, simpler and more specific formulation of the two problems shown also illustrates the better optimization possibilities, i.e. the more appropriate access plan for the data structure.

Below, a summary of some of the processing-relevant RTN building block information for the six given processing-relevant RTN building block information groups is shown:

Examples of processing-relevant RTN building block information of the first processing-relevant RTN building block information group are:
   Preliminary and final input set allocations for the respective RTN building blocks after nesting of the same for a given statement to be analyzed was determined.

Examples of processing-relevant RTN building block information of the second processing-relevant RTN building block information group are:
   the first weighting group mentioned above
   the second weighting group mentioned above This processing-relevant RTN building block information of the weightings can only have effect when the RTN building block has been unambiguously identified via the RTN building block-independent reference group.

Examples of processing-relevant RTN building block information of the third processing-relevant RTN building block information group may be a rearrangement weighting for each RTN building block, which rearranges the present order of neighboring RTN building blocks in an equal superordinated RTN building block and thus generates an optimized processing plan.

The aim of such a rearrangement weighting will be shown in the following simple example without specific reference to a data structure:

EXAMPLE 25

Statement to be analyzed:

| |
| --- |
| [   SELECT * <br>     FROM X <br>     ORDERBY A <br>     WHERE B <br>     MIN C    # 5000 <br>     FIRST D  # 1000 <br>     ORDERBY E <br>     MAX F    # 100 ] |

-continued

> The RTN building block "levels" has introduced itself in seven RTN building blocks, all of which are neighboring:
> [ (1)SELECT * (2)FROM * (3)ORDERBY * (4)WHERE * (5)* # * (6)* # * (7)ORDERBY * (8)*#* ]

The processing function to be used for the RTN building block "#" introduced at the fifth position in the RTN building block "levels", is the processing function "MIN" supplemented by the limiting of the number of elements of its processing output set to 5,000, i.e. those 5,000 elements the value C of which is among the 5,000 lowest values allocated to this processing input set allocated to this fifth introduced RTN building block "#", i.e. the RTN building block "WHERE" introduced at the fourth position in the processing output set. The same holds for the positions (6) and (8) introduced in the RTN building block "levels".

A rearrangement of the RTN building block is absolutely necessary, since the first RTN building block introduced "SELECT", which provides and outputs the desired fields of all elements of its input set, is to be carried out at the last position of this RTN building block "levels".

Similarly, the second RTN building block introduced "FROM" is to be introduced at the first processing-relevant RTN building block information group position directly in its superordinated RTN building block "levels", since this RTN building block "FROM" defines the data set or data sets to be used as first processing input set for the RTN building block "levels"—and thus the processing input set for the second RTN building block introduced into this RTN building block "levels" after rearrangement was carried out.

Furthermore, for the processing functions "WHERE", "MIN" and "MAX", a previous sorting has no influence on the result of the processing functions, so that the sorting can be carried out after each RTN building block. Sorting after the RTN building blocks "WHERE", "MIN" and "MAX", which each decrease the elements of their processing input set, increases speed because the sorting is now applied to a processing input set previously decreased.

A rearrangement of the successive RTN building blocks introduced into the RTN building block (4)WHERE*, which carries out the processing function "WHERE", and (5)*#*, which carries out the processing function "MIN", is not permissive, since this rearrangement may lead to different processing output sets.

This is shown by the following:
WHERE B MIN C # 5000
  Based on the processing input set used, all those data sets to which the criterion WHERE B, not defined, applies are put into the processing output set. Thus, this processing output set of the processing function "WHERE" is used as processing input set for the processing function "MIN C # 5000", which have, as processing output set—if at least 5,000 elements are present in the processing input set—those 5,000 elements that have the lowest value C, not defined, with regard to all elements of the processing input set.
MIN C # 5000 WHERE B
  In this case, the result of the first processing-relevant RTN building block information group processing function "MIN C # 5000" to be used for the respective processing input set is provided as processing output set, and this processing output set is used as processing input set for the processing function "WHERE B".

This representation shows that a rearrangement between the processing functions "WHERE" and "MIN C # 5000" should be avoided.

The processing function "FIRST" depends, on the other hand, as is shown in the description of this RTN building block, on a previously defined sorting, so that the ORDERBY at the second position introduced into the RTN building block "levels" cannot be prefixed to this sixth position introduced "FIRST".

A rearranged, optimized order of the RTN building blocks introduced for the example 25, which provides a result identical to the syntax given, is thus as follows:

> [ (1)FROM * (2)WHERE * (3)* # * (4)ORDERBY * (5)* # * (5)* # * (6)ORDERBY * (7)SELECT * ]

The defined processing functions given in the statement are thus carried out in the following new and faster order:

> [    FROM X
>       WHERE B
>       MIN C   # 5000
>       ORDERBY A
>       FIRST D  # 1000
>       MAX F   # 100
>       ORDERBY E
>       SELECT *       ]

In order to achieve such a rearrangement in this an all other formulatable cases, the introduction of a rearrangement weighting is necessary, which takes effect after finishing an RTN building block introduced, wherein this rearrangement weighting is set for each RTN building block according to the following process:

Six rearrangement weighting groups are defined with respective process logics allocated, and each of the stated RTN building blocks is allocated a rearrangement weighting of these six rearrangement weighting groups.

In order to obtain a corresponding rearrangement weighting for each RTN building block, there are determined
  a first rearrangement weighting group, which has allocated a value that is defined as the lowest, e.g. the value 0,
  a second rearrangement weighting group, which has allocated a value that is defined as the second lowest, e.g. the value 1,
  a third rearrangement weighting group, which has allocated a value that is defined as the third highest, e.g. the value 249,
  a fourth rearrangement weighting group, which has allocated a value that is defined as the second highest, e.g. the value 250,
  a fifth rearrangement weighting group, which has allocated a value that is defined as the highest, e.g. the value 251, and
  a sixth rearrangement weighting group, which has a variable value that is higher than the value of the second rearrangement weighting group and lower than the value of the third rearrangement weighting group, e.g. a value between 2 and 248.

Those RTN building blocks that are introduced neighboring to a directly superordinated RTN building block and are not to be rearranged, each obtain the same rearrangement weighting value of the sixth rearrangement weighting group.

This guarantees that, in case of the same superordinated RTN building block, the order of e.g. RTN building blocks WHERE and MIN is not changed when they meet.

Those RTN building blocks with a rearrangement weighting of the sixth rearrangement weighting group that are to be positioned in the order before RTN building blocks of the sixth rearrangement weighting group in the same superordinated RTN building block, obtain a higher rearrangement weighting than RTN building blocks to be positioned after this RTN building block.

Thus it can be defined that, in case of the same superordinated RTN building block, the order of e.g. RTN building blocks introduced ORDERBY and WHERE are exchanged when they meet, in order to achieve an optimization in the subsequent processing.

Those RTN building blocks that can, for the required processing order, absolutely not be prefixed to other RTN building blocks in the directly superordinated RTN building block and before which only any subsequent RTN building block of the fourth rearrangement weighting group may be positioned, are allocated the rearrangement weighting value of the third rearrangement weighting group.

This definition determines that, in case of the same superordinated RTN building block, the order ORDERBY A WHERE B FIRST C FROM D MAX D is rearranged so that the RTN building block FROM is placed at the first position in this superordinated RTN building block, that after this first position FROM follows the RTN building block WHERE, and that the RTN building block FIRST for which the preceding sorting is relevant, is placed after the RTN building block ORDERBY, i.e. at the last but one position, and that the last position, i.e. the RTN building block MAX, is not shifted in front of this RTN building block FIRST anymore.

Those RTN building blocks that are introduced into the same superordinated RTN building block and are, because of a required processing order, to be placed before all RTN building blocks except for those preceding RTN building blocks with the highest rearrangement weighting of the fifth rearrangement weighting group, are allocated the rearrangement weighting value of the fourth rearrangement weighting group.

For example, this fourth rearrangement weighting group determines that the RTN building block FROM, which describes the processing input set for its superordinated RTN building block, is placed before all other RTN building blocks, e.g. WHERE, MIN, ORDERBY, FIRST, etc., and is thus, independently of its previous position in the superordinated RTN building block, placed at the first position of the same superordinated RTN building block.

To shows those cases in which RTN building block introduced in a superordinated RTN building block are to be rearranged—i.e. placed before all other RTN building blocks already introduced—only until a decision position is reached in this superordinated RTN building block, which prescribes a keyword, the keyword decision positions in question are allocated the rearrangement weighting value of the fifth rearrangement weighting group in the respective superordinated RTN building block, and this keyword decision position is, for the purpose of the rearrangement process, treated the same as RTN building blocks already introduced into this superordinated RTN building block.

In order to illustrate the necessity of this fifth rearrangement weighting group, the following simple example with a superordinated RTN building block IF (1)* THEN (2)* ELSE (3)* END IF and three RTN building block directly introduced therein with two different rearrangement weightings in total is given:
IF (1)WHERE A THEN (2)FROM B ELSE (3)FROM C END IF The result of this superordinated RTN building block IF-THEN-ELSE-END IF is a processing output set, which, depending on a criterion WHERE A not defined, contains either the elements of the data set B or the elements of the data set C. Thus, it is not permissible to change the order of the RTN building blocks introduced into this RTN building block IF-THEN-ELSE-END IF, since the criterion WHERE A previously given and thus to be considered first is fundamental for the processing output set for this superordinated RTN building block IF-THEN-ELSE-END IF.

The RTN building block FROM, which should always be at the first position in an RTN building block superordinated thereto, is allocated the rearrangement weighting value of the fourth rearrangement weighting group, i.e. the rearrangement weighting value 250.

The RTN building block WHERE, which should be placed after the RTN building block FROM, is allocated a rearrangement weighting value of the sixth rearrangement weighting group, e.g. the rearrangement weighting value 200.

The keyword decision positions IF, THEN, END and IF of the superordinated RTN building block are allocated the rearrangement weighting value of the fifth rearrangement weighting group, e.g. 251.

This allocation of rearrangement weighting values guarantees that no rearrangement of the introduced RTN building blocks is carried out in this example as well as in all similar cases.

Due to the possibility to require the recursive call function as decision position in RTN building blocks, the RTN building blocks introduced into a superordinated RTN building block may have an impact on the rearrangement weighting of the RTN building block superordinated thereto, so that for this superordinated RTN building block, again a different rearrangement weighting takes effect for the rearrangement in the RTN building block again superordinated thereto.

Consequently, for all RTN building blocks that have a different rearrangement weighting than the rearrangement weighting of the first rearrangement weighting group, the RTN building block in question are allocated the rearrangement weighting of the third rearrangement weighting group as their final rearrangement weighting, when at least one RTN building block introduced into these superordinated RTN building blocks in a directly or recursively nested way has a rearrangement weighting of the third rearrangement weighting group.

In the case of (1)ORDERBY (2)WHERE A (3)WHERE B, those elements of the processing input set to which the criterion not defined (3)WHERE B applies are provided as processing output set. These provided elements are sorted in the RTN building block (1)ORDERBY as a Boolean result of the processing function (2)WHERE A also not defined. The RTN building block (3)WHERE B is thus placed before the RTN building block (1)ORDERBY, even though the RTN building block (2)WHERE is introduced into this RTN building block (1)ORDERBY with a higher rearrangement weighting.

It also applies to all RTN building blocks that are allocated to the second generic group after the conversion step as well as for all RTN building blocks of the first generic group, the final rearrangement weighting value of which is to exclusively correspond to the highest of all RTN building blocks optionally directly or recursively introduced into these RTN building blocks of the first generic group, that these affected RTN building blocks are allocated the rearrangement weighting value of the second rearrangement weighting group and that the final rearrangement weighting value of these RTN building blocks for further processing corresponds to the highest rearrangement weighting value of these directly or recursively introduced RTN building blocks.

The following nesting is to illustrate this:
ORDERBY A (MAX B) FIRST WHERE C # 100

The RTN building block of the first generic group ( ) as well as the RTN building block of the second generic group # are allocated the rearrangement weighting value of the second rearrangement weighting group, and both of these RTN building blocks receive the respectively highest rearrangement weighting of the RTN building blocks directly or recursively introduced into these RTN building blocks.

In the boldly marked RTN building block ( ) with the rearrangement weighting value of the second rearrangement weighting group, e.g. 1, the RTN building block MAX with its rearrangement weighting value of the sixth rearrangement weighting group is e.g. 200, and again introduced therein is the table RTN building block B, which has allocated the rearrangement weighting value of the second rearrangement weighting group, e.g. 1.

Consequently, the final rearrangement weighting value for said RTN building block ( ) is the highest rearrangement weighting of all RTN building blocks directly or recursively introduced into this RTN building block, i.e. in the above case the rearrangement weighting 200 of the RTN building block MAX.

The same is applied to the also boldly marked RTN building block #, which is, instead of its initial rearrangement weighting of the second rearrangement weighting group, allocated, as final rearrangement weighting, the rearrangement weighting of the third rearrangement weighting group of the RTN building block FIRST introduced therein.

Consequently, for the rearrangement to be carried out, the following RTN building blocks introduced into the same superordinated RTN building block meet with their corresponding final rearrangement weighting:

| | | |
|---|---|---|
| ORDERBY | initial rearrangement weighting: 50 | final rearrangement weighting: 50 |
| ( ) | initial rearrangement weighting: 1 | final rearrangement weighting: 200 |
| # | initial rearrangement weighting: 1 | final rearrangement weighting: 249 |

This final rearrangement weightings lead to the following new and especially optimized nesting in the superordinated RTN building block:
(MAX B) ORDERBY A FIRST WHERE C # 100

Those RTN building blocks to which the rearrangement weightings of the RTN building blocks directly or recursively introduced therein according to the process apply, for which, however, the own rearrangement weighting with regard to the RTN building blocks superordinated thereto should have no impact on their final rearrangement weighting, are allocated the rearrangement weighting value of the first rearrangement weighting group.

An example of an RTN building block with a rearrangement weighting value of the first rearrangement weighting group is the RTN building block levels described above, as is to be shown in the following abstract example:
ORDERBY A MIN [ORDERBY B WHERE C FIRST D]

Within the RTN building block levels, a rearrangement according to the process is carried out due to the rearrangement weighting values of the RTN building blocks introduced into this RTN building block levels, insofar as the RTN building block WHERE is placed before the RTN building block ORDERBY.

Even though in this RTN building block levels, an RTN building block directly introduced therein, namely the RTN building block FIRST has allocated the rearrangement weighting of the third rearrangement weighting group, this rearrangement weighting is not transferred as final weighting to the RTN building block levels. Thus, the RTN building block MIN superordinated to the RTN building block levels can be placed before the RTN building block ORDERBY, which results in the following new RTN building block order:
MIN [WHERE C ORDERBY B FIRST D] ORDERBY A In order to, if necessary, carry out more detailed rearrangements or regroupings within the preliminary nesting of the RTN building blocks that is based on a statement to be analyzed, further rearrangement weighting groups may be introduced and allocated a correspondingly differing processing logic for rearranging or regrouping.

For example, certain decision positions in decision graphs of RTN building blocks may be allocated a fixed rearrangement weighting therefore, which overrides the rearrangement weighting obtained according to the process for an RTN building block introduced at this decision position with the fixed rearrangement weighting of this decision position. Similarly, decision positions that prescribe a keyword may be allocated a different rearrangement weighting than the rearrangement weighting of the fifth rearrangement weighting group in order to exchange this keyword decision position in certain cases with other decision positions of the same decision graph.

Such information is marked at the decision position in question of the RTN syntax of the respective RTN building block as processing-relevant RTN building block information of the fourth, fifth or sixth processing-relevant RTN building block information group.

These details about the processing optimizing rearrangement weighting groups show that, at least in some cases, the final rearrangement weighting may only be obtained as processing-relevant RTN building block information after running of an RTN building block introduced at a * decision position, and that this rearrangement weighting is thus to be allocated to the third processing-relevant RTN building block information group.

The advantage of this rearrangement weighting results from the fact that all possible cases automatically conduct the best possible rearrangement of the nested RTN building blocks, when new RTN building blocks from the total of RTN building blocks are added.

As an example of processing-relevant RTN building block information of the fourth processing-relevant RTN building block information group, the following two RTN building blocks are mentioned:

In order to determine, for RTN building blocks, an independent processing-relevant RTN building block information of the fourth processing-relevant RTN building block information group at least one certain decision position of its inner, directed decision graph, for example the symbol ° may be used for introduction, followed by a name for this processing function, and then again the symbol ° for terminating the name.

In order to determine, for RTN building blocks, an independent processing-relevant RTN building block information of the fifth processing-relevant RTN building block information group at least one certain decision position of its inner, directed decision graph, for example the reserved symbol sequence °doVA° may be used for marking.

RTN syntax with the processing-relevant RTN building block information of the fourth and fifth processing-relevant RTN building block information groups at the respective decision positions for the RTN building blocks "WHERE" and "MIN"/"MAX" marked:

---

RTN building block "WHERE":
RTN syntax: "WHERE" °where° * °doVA°
RTN building block "MIN"/"MAX":
RTN syntax: ("MIN" °min°|"MAX" °max°) * °doVA°

---

The interpretation for the RTN building block "MIN"/"MAX" provides:

When the decision position that requires the keyword "MIN" is successfully compared, the processing function °min° is initiated as processing function to be carried out. When, however, the decision position that requires the keyword "MAX" is successfully compared within the same RTN building block, the processing function °max° is initiated as processing function to be carried out.

The application of the respectively initiated processing function to the final processing input set of this RTN building block is, however, only carried out after a successful run of the RTN building block introduced at the * decision position, since the reserved symbols sequence °doVA° is given at this decision position.

For the RTN building block WHERE, the initiation and execution of the processing function may also be at the same, last decision position because the processing function is unambiguously to be used for this RTN building block, so that the RTN syntax of the RTN building block WHERE could also be as follows:
RTN syntax: "WHERE" * °where° °doVA°

If within one RTN building block, at least two independent processing functions are to be initiated and/or carried out at different decision positions, the introductory symbol ° may be followed by a symbol sequence (x), which determines the relation between processing-relevant RTN building block information of the fourth, fifth and sixth processing-relevant RTN building block information group within the same decision graph of an RTN building block.

This is for example shown in the RTN building block GroupBy:

---

RTN syntax: "GROUPBY" °(1)GroupBy° * °(1)doVA° [":" (1) * [(*1)]
"END"
"GROUPBY" °(2)EndGroupBy° °(2)doVA°]

---

This RTN building block GroupBy may—as has been described above for this RTN building block—require, depending on the decision position of its decision graph reached, the initiation and later use of one or two processing functions with respectively different processing input sets for these processing functions in the same RTN building block GroupBy.

In order to extend a processing function of an RTN building block previously initiated because of a decision position reached by one or more parameters, exactly when subsequently reached decision positions prescribe that, the introductory symbol ° may be followed by the symbol +.

If a processing function of an RTN building block optionally already extended is to be added additional parameters in the form of the processing output sets of one or more of the RTN building blocks directly subordinated to this RTN building block, this may be represented by a reserved symbol ~ introduced at the respective position of the processing function within the symbol sequence, followed by a name for the processing output set to be used of a directly introduced RTN building block, and finally again the symbol ~. Those * decision positions in the same RTN building block that are to transfer the processing output set as parameters are marked with the symbols °~ and a name, which is again terminated with the symbols ~°, allocated to this processing output set.

An RTN building block regarding this definition and described above is the RTN building block "NEXT"/"PREV":

---

RTN syntax:   ("NEXT" °next° | "PREV" °prev°) ["("[("=" °+ =
~param1~° | ">" "=" °+ >=
~param1~° | "<" "=" °+ <= ~param1~°)] *
°~param1~° ")"] °doVA°

---

Depending on the decision position reached, either the processing function °next° or the processing function °prev° is initiated as processing function of this RTN building block. If, due to the statement to be analyzed, on of the optional decision positions "=", ">=" or "<=" is reached, it is determined with the symbol sequence °+ that the previously initiated processing function of this RTN building block, i.e. °next° or °prev°, is extended by the corresponding parameter "=", "<=" or ">=" and the processing output set of the * decision position at which the symbol sequence °~param1~° is found. The initiated processing function, optionally extended by parameters, is carried out after a successful comparison with the last decision position.

In case of a required new initiation instead of the previously shown extension of the processing function already initiated by parameters, the reserved symbol +, which follows the introductory symbol °, is to be omitted.

If based on a statement to be analyzed, one decision position is entered more than once in an RTN building block because of a jump decision position used, it may be determined that processing information allocated to this decision position reached more than once, which may also be a parameter, is extended by the number of successful comparisons with this decision positions.

It is determined that in those cases in which one decision position is reached repeatedly in the same decision graph because of a jump function in combination with a syntax to be analyzed, which decision position contains processing-relevant RTN building block information of the fourth processing-relevant RTN building block information group, the parameters obtained from this allocated processing-relevant RTN building block information extend the parameter to be used by these parameters and that, when a decision position with associated processing-relevant RTN building block information of the fifth processing-relevant RTN building block information group is reached, the parameter thus supplemented is used.

An example of this arrangement is the RTN building block "processing_SameParents" described above with the following RTN syntax:

---

RTN syntax:   "/" "/" (1) * °~param1~° [(*1)] "\" "\" °MergeToOneSet
~param1~° °doVA°

---

This RTN building block, which transfers the same processing input set for all RTN building blocks that are directly introduced at its * decision position repeatable any number of times and subsequently summarizes them in a processing output set, initiates all processing output sets of the RTN building blocks directly introduced at its * decision positions as a parameter list ~param1~. The processing function °MergeToOneSet° to be initiated at the last decision position of this RTN building block reached "processing_SameParents" and also to be carried out at this last decision position, is applied to all collected processing output sets of the parameter list ~param1~.

By means of the RTN building block "set element limiting", an RTN building block will be shown that contains processing-relevant RTN building block information of the sixth processing-relevant RTN building block information group.

| | |
|---|---|
| RTN syntax: | °getVAOfChild° * °~param1~° "#" °LimitResults ~param1~ ~param2~° [("=" °+ =° | ">" "=" °+ >=° | "<" "=" °+ <=° | "<" ">" °+ <>°)] ["%" °+ %°] * °~param2~° °doVA° |

In order to determine that a superordinated RTN building block, which has at least one * decision position in its inner, directed decision graph, prevents the application of the processing function of an RTN building block directly introduced at a * decision position and thus subordinated in this subordinated RTN building block and uses the processing function as additional parameter for the processing function of the superordinated RTN building block, the reserved symbol sequence °getVAOfChild° is placed before the affected * decision positions in the superordinated RTN building block.

If one of the directly subordinated RTN building blocks again contains at least one * decision position, it may, by means of a further or extended reserved symbol sequence for reasons of optimizability, also be determined in the superordinated RTN building block, which contains the reserved symbol sequence °getVAOfChild° before a * position, that all RTN building block recursively introduced at this one * decision position do not carry out their processing function in their RTN building blocks, but are provided as an addition parameter chain of the processing function of the superordinated RTN building block.

Independently of this extended symbol sequence, an optimization of the finished nesting may be automatically recognized after analysis of a given statement and then carried out.

By means of this RTN syntax shown of the RTN building block "set elements limiting" it is first shown that the processing function °LimitResults° initiated at the second—after the conversion step and allocation to the second generic group, now the first—decision position for this RTN building block can be extended by parameters depending on further, in the present case optionally reachable, decision positions. For example, the following processing function extended by parameters may result from the optionally reachable decision positions in this RTN building block "set elements limting":
°LimitResults ~param1~ ~param2~ <=°
°LimitResults ~param1~ ~param2~ >=°
°LimitResults ~param1~ ~param2~ =%°

Due to the indication of the reserved symbol sequence °getVAOfChild°, the execution of the processing function in the RTN building block introduced at the first * decision position is, in any case, prevented and added to the processing function required in this RTN building block "set elements limited" as a parameter to the processing input set thereof.

The following simple example serves to illustrate this:
WHERE A # <=100

The RTN building block introduced at the first * decision position in the superordinated RTN building block "set elements limiting", which is marked with the keyword "#", is the RTN building block "WHERE" with the processing function °WHERE° allocated thereto, the RTN building block introduced at the second * decision position of the same superordinated RTN building block "set elements limiting" is the RTN building block "number" without an allocated processing function.

Since the RTN building block "WHERE" is, due to the given statement, directly introduced at the first * decision position in the RTN building block "set elements limiting", before which first * decision position the reserved symbols sequence °getVAOfChild° is given for optimization reasons, processing of the processing function °WHERE° of the RTN building block "WHERE" in the same is prevented. Instead, the required processing function °WHERE° is added to the superordinated RTN building block "set elements limiting" as an addition parameter for its processing function.

Consequently, for the given statement, the following processing function to be carried out is obtained in the RTN building block "set elements limiting":
°LimitResults °where "A"°<="100"°
wherein the keyword "A" stands for a criterion not defined for
each element of the processing input set of the RTN building block "A" for the purpose of a further recursive nesting.
This prevents that the processing function °WHERE° is not applied to the total processing input set of the RTN building block "WHERE" allocated thereto, and that subsequently the processing function °LimitResults° with the parameter <=100 of the RTN building block "set element limiting" is applied to the total processing output set of the RTN building block "WHERE", which is at the same time the new processing input set of this RTN building block "set elements limiting".

The processing function °WHERE° is rather carried out until exactly 100 elements are found in the processing input set of the RTN building block "set element limiting", to which the criterion "A", not defined, applies.

A further example shows a possible optimization in case of a more complex nesting:
//WHERE A MIN B # 500 \\ # 100

In this example, the same processing input set of the RTN building block superordinated thereto is provided for the RTN building block "WHERE" and the RTN building block "set elements limiting" extended by the parameters "MIN" and "500" because of the RTN building block "processing_SameParents" described above that is directly superordinated to both of them.

According to the definition, the processing output set of the RTN building block "processing_SameParents" provides in its processing output set those element of its processing input set that are provided in the processing output set of at least one of the two RTN building blocks directly introduced at the * decision positions thereof.

The RTN building block "processing_SameParents", however, is again introduced into the RTN building block "set elements limiting", which provides in its processing output set the, in this case, first 100 elements of its processing input set.

An optimization is thus obtained when the RTN building block "WHERE" is limited by its criterion "A" not defined to the provision of the first 100 elements to which the criterion "A" applies, and the processing function "MIN B # 500" is only used when the processing output set of the neighboring RTN building block "WHERE" provides less than 100 elements. The processing function "MIN # 500" provides, for example by a rough presorting of the elements of its processing input set, which can be at least partly initiated in the conduction of the processing function "WHERE", not the 500 elements to which "MIN B" applies, but optimally exactly the number of applicable elements that the processing function "WHERE" comes short of for the number 100 to be reached in the highest superordinated RTN building block.

It is to be noted that a plurality of all RTN building block from the total of RTN building blocks stated contain at least one processing-relevant RTN building block information of the fourth, fifth or sixth processing-relevant RTN building block information group.

An RTN building block for which no processing-relevant RTN building block information of the fourth, fifth or sixth processing-relevant RTN building block information group is defined is the RTN building block "RTN building block summarizing" (brackets), since this RTN building block has only influence on the weighting and the hierarchical rearrangement of the nesting related thereto.

The generation of an optimal access plan from these processing functions optionally extended by parameters, initiated and to be used, may comprise subsequent analysis steps.

For example, for RTN building blocks ORDERBY and FIRST successive in the same superordinated RTN building block it may be determined that the processing function ORDERBY initially carries out a rough sorting by means of quicksort and that an exact sorting in subareas is only carried out until the number of elements required by FIRST is found.

For the purpose of further processing, it may be advantageous that in those cases in which an RTN building block of the second generic group is directly introduced into an identical RTN building block of the second generic group at one of its decision positions that prescribes a recursive call function and in which these two nested RTN building blocks of the second generic group prescribe the same nesting function, the superordinated RTN building block of the second generic group adds all decision positions, entered due to a syntax to be analyzed, of the identical RTN building block of the second generic group introduced therein after its last decision position, so that the identical RTN building block of the second generic group previously introduced at the recursive call function is removed from the final nesting without loss of information.

The following simple example serves to illustrate this:

A given statement MIN A+B+C+D, which provides the following preliminary nesting after having been read into the RTN building blocks:

```
MIN *
     *  +  *
     A
     *  +  *
        B
        *  +  *
           C
           D
``` is thus nested anew as follows:

```
MIN *
     *  +  *  +  *  +  *
     A
     B
     C
     D
```

This allows a more detailed further analysis and especially a better optimizability of the statement.

A given statement MIN A+B−C, which provides the following preliminary nesting after having been read into the RTN building blocks:

```
MIN *
     *  +  *
     A
     *  −  *
        B
        C
```

In this example, the RTN building block of the second generic group "addition/subtraction operations" is directly introduced into an identical RTN building block "addition/subtraction operations", wherein, however, these two identical RTN building blocks prescribe different processing functions in the nesting. Consequently, this preliminary nesting may not be changed and corresponds to the final nesting.

In order to have the nesting of the RTN building blocks resulting from the statement to be processed and especially their RTN building block information in a processable form, it is determined that an inventive list is provided, wherein the inner, directed decision graphs of the RTN building blocks, as they are obtained after the conversion step, are followed by means of a syntax to be analyzed and each decision position entered is put down in the list, so that for each RTN building block identified at a recursive call function of an RTN building block, a further element is added to the list, which contains this identified RTN building block, and all decision positions entered in an inner, directed decision graph are added to the element from the list of RTN building blocks that contains the corresponding RTN building block as fields of this element and in the order entered, and the hierarchical nesting of the elements is defined anew under consideration of e.g. existing preliminary weightings of the identified RTN building blocks, which are also allocated to the elements of the list as information, and the decision positions stored as fields in the elements of the list are rearranged by means of e.g. a rearrangement weighting for each decision position.

In order to read a given statement into such a list, an additional element is added to this list for each RTN building block identified and in the order found, and for each decision position of the decision graph of the RTN building block, a field of the respectively current element of the list is created in the order entered.

Such a list is shown below for the following statement:

EXAMPLE 26

Syntax to be analyzed: [ WHERE ( A = B ) MIN C # 100]

| | |
|---|---|
| $1^{st}$ element of the list: | RTN building block "levels" |
| $2^{nd}$ element of the list: | RTN building block "WHERE" |
| $3^{rd}$ element of the list: | RTN building block "brackets" |
| $4^{th}$ element of the list: | RTN building block "tables" |
| $5^{th}$ element of the list: | RTN building block "comparison" |
| $6^{th}$ element of the list: | RTN building block "tables" |
| $7^{th}$ element of the list: | RTN building block "MIN / MAX" |
| $8^{th}$ element of the list: | RTN building block "tables" |
| $9^{th}$ element of the list: | RTN building block "set element limiting" |
| $10^{th}$ element of the list: | RTN building block "number" |

These elements of the list are now, for each current RTN building block, allocated all keywords of the statement to be analyzed in the order found and * decision positions used are also made a note of at the affected positions of the superordinated RTN building blocks:

| | |
|---|---|
| $1^{st}$ element: | "[" * * "]" |
| $2^{nd}$ element: | "WHERE" * |
| $3^{rd}$ element: | "(" * ")" |
| $4^{th}$ element: | "A" |
| $5^{th}$ element: | "=" * |
| $6^{th}$ element: | "B" |
| $7^{th}$ element: | "MIN" * |
| $8^{th}$ element: | "C" |
| $9^{th}$ element: | "#" * |
| $10^{th}$ element: | "100" |

In order to have the actual nesting of the RTN building blocks at disposal in the best possible manner as processable information for the further processing, each element of the list containing an RTN building block is allocated an element thereof as parent, and regarding those fields of the elements containing all decision positions entered of the RTN building blocks found that call a * decision position, each of these * decision position fields are allocated an element of the same list as child(???), wherein the preliminary element allocated is exactly the element that calls this directly subordinated element depending on the syntax to be analyzed and following the decision graph of the respectively identified RTN building block obtained after the conversion step, and the preliminarily defined children are those elements at * decision position fields that are introduced as RTN building blocks at these * decision position fields.

The list resulting from example 26 above is now supplemented with the respective preliminary parent and child information:

| | | |
|---|---|---|
| $1^{st}$ element: | "[" Child:1 Child:7 "]" | preliminary parent element: 0 |
| $2^{nd}$ element: | "WHERE" Child:3 | preliminary parent element: 1 |
| $3^{rd}$ element: | "(" Child:4 ")" | preliminary parent element: 2 |
| $4^{th}$ element: | "A" | preliminary parent element: 3 |
| $5^{th}$ element: | "=" Child:6 | preliminary parent element: 4 |
| $6^{th}$ element: | "B" | preliminary parent element: 5 |
| $7^{th}$ element: | "MIN" Child:8 | preliminary parent element: 1 |
| $8^{th}$ element: | "C" | preliminary parent element: 7 |
| $9^{th}$ element: | "#" Child:10 | preliminary parent element: 8 |
| $10^{th}$ element: | "100" | preliminary parent element: 9 |

In order to obtain a finally desired nesting of the RTN building blocks in this list, the following steps are carried out when an RTN building block of the second generic group is added as an element in the list:

finding the element to be finally superordinated to this element in the nesting, e.g. by means of the above first and second weighting, adding a new * decision position field at the first position of the element of the list added last, which contains the RTN building block of the second generic group, and allocating that element of the list as child to this added * decision position field that was previously the parent of exactly that element, and correcting the child of the last field of the RTN building block to be directly superordinated because of the final nesting of this RTN building block with that element of the list that contains this RTN building block of the second generic group, and allocating the previous parent of this element of the list added last, exactly that element of the list added last as parent.

The final list for example 26 is as follows:

| | | |
|---|---|---|
| $1^{st}$ element: "[" Child: 1 Child: 9 "]" | | final parent element: 0 |
| $2^{nd}$ element: "WHERE" Child: 3 | | final parent element: 1 |
| $3^{rd}$ element: "(" Child: 5 ")" | | final parent element: 2 |
| $4^{th}$ element: "A" | | final parent element: 5 |
| $5^{th}$ element: Child: 4 "=" Child: 6 | | final parent element: 3 |
| $6^{th}$ element: "B" | | final parent element: 5 |
| $7^{th}$ element: "MIN" Child: 8 | | final parent element: 9 |
| $8^{th}$ element: "C" | | final parent element: 7 |
| $9^{th}$ element: Child: 7 "#" Child: 10 | | final parent element: 1 |
| $10^{th}$ element: "100" | | final parent element: 9 |

This provides a list for further processing, which contains the elements and thus the RTN building blocks before application of the conversion step with the processing-relevant RTN building block information allocated thereto in the final nesting desired through the weightings as well as the order of the decision positions optimized within the RTN building blocks by the rearrangement weighting.

The generation of the final nesting of the list will again be illustrated by the following simple example, without specification of weightings, for each RTN building block and thus for each element of the list:

EXAMPLE 27

Syntax to be analyzed: WHERE A+B=C

The first two steps identify the two RTN building blocks "WHERE" and "A" and put them down in the list correspondingly:

| | |
|---|---|
| $1^{st}$ element: WHERE Child: 2 | |
| $2^{nd}$ element: A | preliminary parent element: 1 |

Next, the keyword "+" is met, which is found in the second reference subgroup and thus constitutes an RTN building block of the second generic group.

| | |
|---|---|
| $1^{st}$ element: "WHERE" Child: 2 | |
| $2^{nd}$ element: "A" | preliminary parent element: 1 |
| $3^{rd}$ element: "+" | preliminary parent element: 2 |

Since the 3$^{rd}$ element of the list is an RTN building block of the second generic group, the RTN building block "WHERE" is identified as the RTN building block to be finally superordinated. Thus, a new field is added at the first position of the 3$^{rd}$ element, and the new parent and child information is as follows:

| | |
|---|---|
| 1$^{st}$ element: "WHERE" Child: 3 | |
| 2$^{nd}$ element: "A" | preliminary parent element: 3 |
| 3$^{rd}$ element: Child: 2 "+" | preliminary parent element: 1 |

The next keyword "B" of the statement is an RTN building block of the first generic group and is added as third field of the third element with corresponding parent and child allocation.

| | |
|---|---|
| 1$^{st}$ element: "WHERE" Child: 3 | |
| 2$^{nd}$ element: "A" | preliminary parent element: 3 |
| 3$^{rd}$ element: Child: 2 "+" Child: 4 | preliminary parent element: 1 |
| 4$^{th}$ element: "B" | preliminary parent element: 3 |

Next, the keyword "=" is processed and identified as RTN building block of the second generic group. Due to the weightings of the RTN building blocks and thus the elements of the list it is found that the element containing the RTN building block "=" is to be directly subordinated to the RTN building block element containing the RTN building block "WHERE". Before the first field for the 5$^{th}$ element is correspondingly added and before the new parent and child allocation, the list is as follows:

| | |
|---|---|
| 1$^{st}$ element: "WHERE" Child: 3 | |
| 2$^{nd}$ element: "A" | preliminary parent element: 3 |
| 3$^{rd}$ element: Child: 2 "+" Child: 4 | preliminary parent element: 1 |
| 4$^{th}$ element: "B" | preliminary parent element: 3 |
| 5$^{th}$ element: "=" | preliminary parent element: 4 |

After rearrangement, the following list is obtained for example 27

| | |
|---|---|
| 1$^{st}$ element: "WHERE" Child: 5 | |
| 2$^{nd}$ element: "A" | preliminary parent element: 3 |
| 3$^{rd}$ element: Child: 2 "+" Child: 4 | preliminary parent element: 5 |
| 4$^{th}$ element: "B" | preliminary parent element: 3 |
| 5$^{th}$ element: Child: 3 "=" | preliminary parent element: 1 |

After the last keyword of the statement, which identifies an RTN building block of the first generic group, has been processed, the following list apt for further processing is obtained:

| | |
|---|---|
| 1$^{st}$ element: "WHERE" Child: 5 | |
| 2$^{nd}$ element: "A" | final parent element: 3 |
| 3$^{rd}$ element: Child: 2 "+" Child: 4 | final parent element: 5 |
| 4$^{th}$ element: "B" | final parent element: 3 |
| 5$^{th}$ element: Child: 3 "=" Child: 6 | final parent element: 1 |
| 6$^{th}$ element: "C" | final parent element: 5 |

It is thus shown that such a list is generated with few search steps for finding and by exchanging a few numbers in a list.

In conclusion, it is again to be noted that a query language based on the inventive method allows many times more nesting constellations than a conventional query language that is merely based on a total RTN. These nesting constellations, which are present for further processing after analysis of a statement in the form of a hierarchical tree, allow a significantly higher degree of freedom in formulating query statements and thus also the introduction of a plurality of new processing functions, which cannot be defined with this complexity in a query language that is merely based on one total RTN. Furthermore, RTN building blocks can, depending on superordinated, subordinated or neighboring RTN building blocks, have different functions, depending on which one seems intuitively logical to a user formulating a statement, i.e. a context-independent interpretation of the processing functions in a descriptive query language. Consequently, different logics that contradict each other when viewed separately may be expressed and processed in one system because of RTN building block that may be used. Due to the possibility to formulate problems that are to be formulated formally without the limitation caused by or paraphrasing required by the presence of only one total RTN, it is much easier for the user to specify a statement to be processed, and a better optimization of an access plan to a given relational data structure is also possible.

It should be noted that RTN building blocks constitute an extension of RTNs, are the root of total RTNs in a logical hierarchy. Functions and processing functions are far further below in this logical hierarchy, any function and definable objects are permitted and algorithmically interpreted due to one underlying RTN.

RTN building blocks are terminated by themselves, processing areas and processing orders of SQL and similar query languages, on the other hand, which are defined by one total RTN, are either terminated by meeting a reserved keyword that corresponds to the subsequent command or by the end of the statement to be analyzed. This shows again the independence of inventive RTN building blocks of each other.

Similarly, it is easier to introduce new RTN building blocks in a system consisting of RTN building blocks, since newly defined RTN building blocks have no impact on RTN building blocks already existing and provide the desired result for a respectively given nesting in any case because of the processing-relevant RTN building block information.

Finally, the RTN building blocks described above, which constitute an exemplary totality of RTN building blocks, are shown as follows:

The RTN building blocks are shown before the conversion step (table 1) into the two generic groups as well as after the conversion step (table 2). For the RTN building blocks shown, the RTN syntax, the rearrangement weighting (rearr. w.), as well as the first and second weighting (1$^{st}$/2$^{nd}$ w.) are specified, but for the purpose of clarity, no other processing-relevant RTN building block information is specified.

Table 3 shows the elements of the RTN building block-independent reference group as obtained based on the RTN building blocks shown in table 2 after the conversion step. The elements of the first conversion subgroup are marked with X group and contain a decision position number between 1 and 254. The elements of the second reference subgroup are marked with Y group and contain a decision position number between 255 and 322. Of course, these figures can be changed within the framework of the present invention. For each element of this reference group with its two reference subgroups, there is given a reference to a line in table 4 in which the corresponding residual decision graph of this element is found.

The LongStringValues with the decision position numbers 246, 247 and 248 may represent a list of keywords, all of which belong to the respectively same RTN building block, e.g. the RTN building block "table", which contains all table and stored query names present (decision position number 246), the RTN building block "constants" (decision position number 247), and the RTN building block "table field" (decision position number 248).

Table 4 shows the residual decision graphs for the elements of the reference group from table 3, wherein these residual decision graphs are stored as array and jump to the line JUMP-TRUE or JUMP-FALSE, respectively depending on whether the comparison was successful or unsuccessful. In those cases in which there is no jump false line, the decision position specified is a position that must be compared successfully.

It is to be noted that this listing may at any time be extended by further RTN building blocks and is thus by no means exhaustive.

TABLE 1

|  | rearr. w. | $1^{st}/2^{nd}$ w. |
|---|---|---|
| RTN building blocks before conversion step WITHOUT decision position 300 on first position | | |
| Table RTN building block ("ABC" | "departments" | "companies" | "contact_persons" | "contact_persons_functions" | "invoices" | "events") | 1 | 200/1 |
| Numbers/text RTN building block V:number, text | 1 | 200/1 |
| Line selecting RTN building block "WHERE" * | 200 | 200/200 |
| Extreme value RTN building block ("MIN" | "MAX") * | 200 | 200/200 |
| Levels RTN building block "[" (1) * [(*1)] "]" | 0 | 200/255 |
| RTN building blocks combining RTN building block "(" * ")" | 1 | 200/255 |
| Processing_SameParents RTN building block "/" "/" (1) * [(*1)] "\" "\" | 200 | 200/255 |
| Processing_PrevParents RTN building block "RESULTOF" "(" (1) * [(*1)] ")" | 200 | 200/255 |
| Set sorting RTN building block "ORDERBY" (1) * ["DESC"] ["," * (*1)]] | 50 | 200/255 |
| Aggregate RTN building block, parameter-free ("count" | "exists" | "none" | "all") "(" * ")" | 200 | 200/255 |
| Aggregate RTN building block, 1 parameter ("sum" | "AVG" | "return") "(" * ")" | 200 | 200/200 |
| All/any RTN building block ("ALL" | "ANY") ["(" ("<" "=" | ">" "=" | "=") V:number ")"] * | 1 | 200/1 |
| Find RTN building block "FIND" * [":" (1) * [(*1)] "END" "FIND"] | 249 | 200/255 |
| Constants RTN building block ("TRUE" | "FALSE" | "date" | "year" | "month" | "month_year" | "week" | "day" | "time" | "hour" | "minute" | "hour_minute") | 1 | 200/200 |
| NEXT/PREV RTN building block ("NEXT" | "PREV") ["(" [("=" | ">" "=" | "<" "=")] * ")"] | 249 | 200/255 |
| FOR next RTN building block "FOR" * ":" * "NEXT" | 249 | 200/255 |
| Rel. Bool RTN building block ("FINDNEXT" | "FINDPREV") * | 249 | 200/200 |
| Rel. line selecting RTN building block ("MUSTNEXT" | "MUSTPREV") * | 249 | 200/200 |
| Do loop until RTN building block ("DO" ":" * "LOOP" "UNTIL" * | "DO" "UNTIL" * ":" * "LOOP") | 249 | 200/255 |
| Abs. Bool RTN building block ("FIRST" | "LAST") * | 249 | 200/200 |
| If then RTN building block "IF" * "THEN" * ["ELSE" *] ["END IF"] | 1 | 200/255 |
| Select case RTN building block "SELECT" "CASE" * ":" (1) "CASE" [("<" ">" □ "=" □ ">" "=" □ "<" "=")] * ":" * [(*1)] ["CASE" "ELSE" ":"*] ["END" "SELECT"] | 1 | 200/255 |
| Negating Bool RTN building block "NOT" * | 1 | 200/200 |
| SELECT RTN building block "SELECT" * | 1 | 200/200 |
| Group break RTN building block "BREAKON" * [":" (1) * [(*1)] "END" "BREAKON"] | 249 | 200/255 |
| Line combining RTN building block "GROUPBY" * [":" (1) * [(*1)] "END" "GROUPBY"] | 200 | 200/255 |
| Percent RTN building block "PERCENT" * | 200 | 200/200 |
| Levels start input set forming RTN building block "FROM" * | 250 | 200/200 |

TABLE 1-continued

|  | rearr. w. | $1^{st}/2^{nd}$ w. |
|---|---|---|
| Table field RTN building block<br>#number! | 1 | 200/1 |
| Distinct RTN building block<br>"DISTINCT" * | 200 | 200/200 |
| Set elements limiting RTN building block<br>* "#" [("=" | ">" "=" | "<" "=" | "<" ">")] ["%"] * | 1 | 250/250 |
| RTN building blocks before conversion step<br>WITH decision position 300 on first position | | |
| Value linkage RTN building block<br>* ":" * | 1 | 4/4 |
| Addition subtraction operations RTN building block<br>* ("+" | "–") * | 1 | 17/17 |
| Multiplication/division operations RTN building block<br>* ("*" | "/" | "\" | "MOD") * | 1 | 14/14 |
| Power calculation operations RTN building block<br>* "^" * | 1 | 10/10 |
| Comparative RTN building block<br>* ("=" | "<" | ">" | ">" "=" | "<" "=" | "<" ">") * | 1 | 50/50 |
| Bool combination RTN building block<br>* ("AND" | "OR" | "XOR") * | 1 | 100/100 |
| Set combining RTN building block<br>* ("UNION" ["ALL"] | "INTERSECT" | "EXCLUDE") * | 1 | 250/250 |
| Set elements forming RTN building block<br>* "," * | 1 | 30/30 |
| Way part RTN building block<br>* "–" ">" * ["OVER" *] | 1 | 250/255 |
| Intermediate set RTN building block<br>* "AS" V:intermediate set name | 1 | 250/250 |
| IN comparing RTN building block<br>* "IN" (" * ") | 1 | 60/255 |

TABLE 2

|  | rearr. w. | $1^{st}/2^{nd}$ w. |
|---|---|---|
| RTN building blocks after conversion step:<br>$1^{st}$ generic group | | |
| Table RTN building block<br>("ABC" | "departments" | "companies" | "contact_persons" | "contact_persons_functions" | "invoices"<br>| "events") [RTN building block of second generic group] | 1 | 200/1 |
| Numbers/text RTN building block<br>V:number, text [RTN building block of second generic group] | 1 | 200/1 |
| Line selecting RTN building block<br>"WHERE" RTN building block of first generic group [RTN building block of second generic group] | 200 | 200/200 |
| Extreme value RTN building block<br>("MIN" | "MAX") RTN building block of first generic group [RTN building block of second generic group] | 200 | 200/200 |
| Levels RTN building block<br>"[ " (1) RTN building block of first generic group [(*1)] "]" [RTN building block of second generic group] | 0 | 200/255 |
| RTN building blocks combining RTN building block<br>"("RTN building block of first generic group ")" [RNT element of second generic group] | 1 | 200/255 |
| Processing_SameParents RTN building block<br>"/" "/" (1) RTN building block of first generic group [(*1)] "\" "\" [RTN building block of second generic group] | 200 | 200/255 |
| Processing_PrevParents RTN building block<br>"RESULTOF" "(" (1) RTN building block of first generic group [(*1)] ")" [RTN building block of second generic group] | 200 | 200/255 |
| Set sorting RTN building block<br>"ORDERBY" (1) RTN building block of first generic group (1) ["DESC"] ["," (*1)] [RTN building block of second generic group] | 50 | 200/255 |
| Aggregate RTN building block, parameter-free<br>("count" | "exists" | "none") ["(" RTN building block of first generic group ")"] [RTN building block of second generic group] | 200 | 200/255 |
| Aggregate RTN building block, 1 parameter<br>("sum" | "AVG" | "return" ) "(" RTN building block of first generic group ")" [RTN building block of second generic group] | 200 | 200/200 |
| All/any RTN building block<br>("ALL" | "ANY" ) ["(" ("<" "=" | ">" "=" | "=")] V:number ")"] RTN building block of first generic group [RTN building block of second generic group] | 1 | 200/1 |
| Find RTN building block<br>"FIND" RTN building block of first generic group [":" (1) RTN building block of first generic group [(*1)] "END" "FIND" ] [RTN building block of second generic group] | 249 | 200/255 |

TABLE 2-continued

| | rearr. w. | 1st/2nd w. |
|---|---|---|
| Constants RTN building block<br>("TRUE" \| "FALSE" \| "date" \| "year" \| "month" \| "month_year" \| "week" \| "day" \| "time" \| "hour" \| "minute" \| "hour_minute") [RTN building block of second generic group] | 1 | 200/255 |
| NEXT/PREV RTN building block<br>("NEXT" \| "PREV") ["(" [("=" \| ">" "=" \| "<" "=")] RTN building block of first generic group ")"] [RTN building block of second generic group] | 249 | 200/255 |
| FOR next RTN building block<br>"FOR" RTN building block of first generic group ":" RTN building block of first generic group "NEXT" [RTN building block of second generic group] | 249 | 200/255 |
| Rel. Bool RTN building block<br>("FINDNEXT" \| "FINDPREV") RTN building block of first generic group [RTN building block of second generic group] | 249 | 200/200 |
| Rel. line selecting RTN building block<br>("MUSTNEXT" \| "MUSTPREV") RTN building block of first generic group [RTN building block of second generic group] | 249 | 200/200 |
| Do loop until RTN building block<br>("DO" ":" RTN building block of first generic group "LOOP" "UNTIL" RTN building block of first generic group \| "DO" "UNTIL" RTN building block of first generic group ":" RTN building block of first generic group "LOOP") [RTN building block of second generic group] | 249 | 200/255 |
| Abs. Bool RTN building block<br>("FIRST" \| "LAST") RTN building block of first generic group [RTN building block of second generic group] | 249 | 200/200 |
| If then RTN building block<br>"IF" RTN building block of first generic group "THEN" RTN building block of first generic group ["ELSE" RTN building block of first generic group] ["END IF"] [RTN building block of second generic group] | 1 | 200/255 |
| Select case RTN building block<br>#number! | 1 | 200/255 |
| Negating Bool RTN building block<br>"NOT" RTN building block of first generic group [RTN building block of second generic group] | 1 | 200/200 |
| SELECT RTN building block<br>"SELECT" RTN building block of first generic group [RTN building block of second generic group] | 1 | 200/200 |
| Group break RTN building block<br>"BREAKON" RTN building block of first generic group [":" (1) RTN building block of first generic group [(*1)] "END" "BREAKON"] [RTN building block of second generic group] | 249 | 200/255 |
| Line combining RTN building block<br>"GROUPBY" RTN building block of first generic group [":" (1) RTN building block of first generic group [(*1)] "END" "GROUPBY"] [RTN building block of second generic group] | 200 | 200/255 |
| Percent RTN building block<br>"PERCENT" RTN building block of first generic group [RTN building block of second generic group] | 200 | 200/200 |
| Levels start input set forming RTN building block<br>"FROM" RTN building block of first generic group [RTN building block of second generic group] | 250 | 200/200 |
| Table field RTN building block<br>#number! | 1 | 200/1 |
| Distinct RTN building block<br>"DISTINCT" RTN building block of fits generic group [RTN building block of second generic group] | 200 | 200/200 |
| Set elements limiting RTN building block<br>RTN building block of first generic group "#" [("=" \| ">" "=" \| "<" "=" \| "<" ">" )] ["%"] RTN building block of first generic group [RTN building block of second generic group]<br>RTN building blocks after conversion step:<br>2nd generic group | 1 | 250/250 |
| Value linkage RTN building block<br>"." RTN building block of first generic group | 1 | 4/4 |
| Addition subtraction operations RTN building block<br>("+" \| "−") RTN building block of first generic group | 1 | 17/17 |
| Multiplication/division operations RTN building block<br>("*" \| "/" \| "\" \| "MOD") RTN building block of first generic group | 1 | 14/14 |
| Power calculation operations RTN building block<br>"^" RTN building block of first generic group | 1 | 10/10 |
| Comparative RTN building block<br>("=" \| "<" \| ">" \| ">" "=" \| "<" "=" \| "<" ">") RTN building block of first generic group | 1 | 50/50 |
| Bool combination RTN building block<br>("AND" \| "OR" \| "XOR") RTN building block of first generic group | 1 | 100/100 |
| Set combining RTN building block<br>("UNION" ["ALL"] \| "INTERSECT" \| "EXCLUDE") RTN building block of first generic group | 1 | 250/250 |
| Set elements forming RTN building block<br>"," RTN building block of first generic group | 1 | 30/30 |
| Way part RTN building block<br>"−" ">" RTN building block of first generic group ["OVER" RTN building block of first generic group] | 1 | 250/255 |
| Intermediate set RTN building block<br>"AS" V:intermediate set name [RTN building block of second generic group] | 1 | 250/250 |
| Comparative IN RTN building block<br>"IN" (" RTN building block of first generic group ")" [RTN building block of second generic group] | 1 | 60/255 |

TABLE 3

Elements of the RTN building block-independent reference group:

| Decision position number + keyword | | Reference to residual decision graph |
|---|---|---|
| 1 - XGroup | 'WHERE' | Table 4: line 5 |
| 2 - XGroup | 'MIN' | Table 4: line 7 |
| 3 - XGroup | 'MAX' | Table 4: line 6 |
| 4 - XGroup | '[' | Table 4: line 8 |
| 6 - XGroup | '(' | Table 4: line 10 |
| 8 - XGroup | '/' | Table 4: line 12 |
| 10 - XGroup | 'RESULTOF' | Table 4: line 16 |
| 11 - XGroup | 'ORDERBY' | Table 4: line 19 |
| 14 - XGroup | 'COUNT' | Table 4: line 26 |
| 15 - XGroup | 'EXISTS' | Table 4: line 29 |
| 16 - XGroup | 'NONE' | Table 4: line 23 |
| 17 - XGroup | 'SUM' | Table 4: line 35 |
| 18 - XGroup | 'AVG' | Table 4: line 38 |
| 19 - XGroup | 'RETURN' | Table 4: line 32 |
| 20 - XGroup | 'ALL' | Table 4: line 42 |
| 21 - XGroup | 'ANY' | Table 4: line 41 |
| 25 - XGroup | 'FIND' | Table 4: line 73 |
| 28 - XGroup | 'NEXT' | Table 4: line 81 |
| 29 - XGroup | 'PREV' | Table 4: line 78 |
| 30 - XGroup | 'FOR' | Table 4: line 106 |
| 31 - XGroup | 'FINDNEXT' | Table 4: line 111 |
| 32 - XGroup | 'FINDPREV' | Table 4: line 110 |
| 33 - XGroup | 'MUSTNEXT' | Table 4: line 113 |
| 34 - XGroup | 'MUSTPREV' | Table 4: line 112 |
| 35 - XGroup | 'DO' | Table 4: line 114 |
| 38 - XGroup | 'FIRST' | Table 4: line 125 |
| 39 - XGroup | 'LAST' | Table 4: line 124 |
| 40 - XGroup | 'IF' | Table 4: line 126 |
| 43 - XGroup | 'SELECT' | Table 4: line 135 |
| 45 - XGroup | 'NOT' | Table 4: line 200 |
| 46 - XGroup | 'BREAKON' | Table 4: line 202 |
| 47 - XGroup | 'GROUPBY' | Table 4: line 207 |
| 48 - XGroup | 'PERCENT' | Table 4: line 212 |
| 49 - XGroup | 'FROM' | Table 4: line 213 |
| 50 - XGroup | 'DISTINCT' | Table 4: line 214 |
| 246 - XGroup | LongStringValues 1 | Table 4: line 1 |
| 247 - XGroup | LongStringValues 2 | Table 4: line 2 |
| 248 - XGroup | LongStringValues 3 | Table 4: line 3 |
| 254 - XGroup | VARIABLE | List 2: line 4 |
| 263 - YGroup | '/' | Table 4: line 220 |
| 264 - YGroup | '\' | Table 4: line 221 |
| 268 - YGroup | ',' | Table 4: line 261 |
| 277 - YGroup | '<' | Table 4: line 223 |
| 278 - YGroup | '=' | Table 4: line 225 |
| 279 - YGroup | '>' | Table 4: line 227 |
| 306 - YGroup | '.' | Table 4: line 215 |
| 307 - YGroup | '+' | Table 4: line 217 |
| 308 - YGroup | '−' | Table 4: line 216 |
| 309 - YGroup '*' | '*' | Table 4: line 219 |
| 310 - YGroup | 'MOD' | Table 4: line 218 |
| 311 - YGroup | '^' | Table 4: line 222 |
| 312 - YGroup | 'AND' | Table 4: line 233 |
| 313 - YGroup | 'OR' | Table 4: line 234 |
| 314 - YGroup | 'XOR' | Table 4: line 232 |
| 315 - YGroup | '#' | Table 4: line 235 |
| 317 - YGroup | 'UNION' | Table 4: line 257 |
| 318 - YGroup | 'INTERSECT' | Table 4: line 260 |
| 319 - YGroup | 'EXCLUDE' | Table 4: line 256 |
| 321 - YGroup | 'AS' | Table 4: line 266 |
| 322 - YGroup | 'IN' | Table 4: line 267 |

TABLE 4

Residual decision graphs for the individual elements of the RTN building block-independent reference group from Table 3

| Line | Decision position number | | | Jump-False | | Jump-True |
|---|---|---|---|---|---|---|
| 1 | MUST | 255 | | | 2-Table bubble | EXIT |
| 2 | MUST | 255 | | | 15-Constants bubble | EXIT |
| 3 | MUST | 255 | | | 30-Table field bubble | EXIT |
| 4 | MUST | 255 | | | 3-Number/text bubble | EXIT |
| 5 | MUST | 251 | * | | 4-Line selecting bubble | EXIT |
| 6 | MUST | 251 | * | | 5-Extreme value bubble | EXIT |
| 7 | MUST | 251 | * | | 5-Extreme value bubble | EXIT |
| 8 | MUST | 251 | * | | 6-Levels bubble | JUMP: 9 |
| 9 | CAN | 5 | ']' | ELSE JUMP: 8 | 6-Levels bubble | EXIT |
| 10 | MUST | 251 | * | | 7-Bubbles combining bubble | JUMP: 11 |
| 11 | MUST | 7 | ')' | | 7-Bubbles combining bubble | EXIT |
| 12 | MUST | 8 | '/' | | 8-Processing_SameParents bubble | JUMP: 13 |
| 13 | MUST | 251 | * | | 8-Processing_SameParents bubble | JUMP: 14 |
| 14 | CAN | 9 | '\' | ELSE JUMP: 13 | 8-Processing_SameParents bubble | JUMP: 15 |
| 15 | MUST | 9 | '\' | | 8-Processing_SameParents bubble | EXIT |
| 16 | MUST | 6 | '(' | | 9-Processing_PrevParents bubble | JUMP: 17 |
| 17 | MUST | 251 | * | | 9-Processing_PrevParents bubble | JUMP: 18 |
| 18 | CAN | 7 | ')' | ELSE JUMP: 17 | 9-Processing_PrevParents bubble | EXIT |
| 19 | MUST | 251 | * | | 10-Set sorting bubble | JUMP: 20 |
| 20 | CAN | 12 | 'DESC' | ELSE JUMP: 21 | 10-Set sorting bubble | JUMP: 22 |
| 21 | CAN | 13 | ',' | ELSE EXIT | 10-Set sorting bubble | JUMP: 19 |
| 22 | CAN | 13 | ',' | ELSE EXIT | 10-Set sorting bubble | JUMP: 19 |
| 23 | CAN | 6 | '(' | ELSE EXIT | 11-Aggregate bubble, parameter-free | JUMP: 24 |
| 24 | MUST | 251 | * | | 11-Aggregate bubble, parameter-free | JUMP: 25 |
| 25 | MUST | 7 | ')' | | 11-Aggregate bubble, parameter-free | EXIT |
| 26 | CAN | 6 | '(' | ELSE EXIT | 11-Aggregate bubble, parameter-free | JUMP: 27 |
| 27 | MUST | 251 | * | | 11-Aggregate bubble, parameter-free | JUMP: 28 |
| 28 | MUST | 7 | ')' | | 11-Aggregate bubble, parameter-free | EXIT |
| 29 | CAN | 6 | '(' | ELSE EXIT | 11-Aggregate bubble, parameter-free | JUMP: 30 |
| 30 | MUST | 251 | * | | 11-Aggregate bubble, parameter-free | JUMP: 31 |
| 31 | MUST | 7 | ')' | | 11-Aggregate bubble, parameter-free | EXIT |
| 32 | MUST | 6 | '(' | | 12-Aggregate bubble, 1 parameter | JUMP: 33 |
| 33 | MUST | 251 | * | | 12-Aggregate bubble, 1 parameter | JUMP: 34 |
| 34 | MUST | 7 | ')' | | 12-Aggregate bubble, 1 parameter | EXIT |

TABLE 4-continued

Residual decision graphs for the individual elements of the RTN building block-independent reference group from Table 3

| Line | | Decision position number | | Jump-False | | Jump-True | |
|---|---|---|---|---|---|---|---|
| 35 | MUST | 6 | '(' | | | 12-Aggregate bubble, 1 parameter | JUMP: 36 |
| 36 | MUST | 251 | * | | | 12-Aggregate bubble, 1 parameter | JUMP: 37 |
| 37 | MUST | 7 | ')' | | | 12-Aggregate bubble, 1 parameter | EXIT |
| 38 | MUST | 6 | '(' | | | 12-Aggregate bubble, 1 parameter | JUMP: 39 |
| 39 | MUST | 251 | * | | | 12-Aggregate bubble, 1 parameter | JUMP: 40 |
| 40 | MUST | 7 | ')' | | | 12-Aggregate bubble, 1 parameter | EXIT |
| 41 | CAN | 251 | * | ELSE | JUMP: 43 | 13-All/any bubble | EXIT |
| 42 | CAN | 251 | * | ELSE | JUMP: 48 | 13-All/any bubble | EXIT |
| 43 | MUST | 6 | '(' | | | 13-All/any bubble | JUMP: 44 |
| 44 | CAN | 23 | '=' | ELSE | JUMP: 53 | 13-All/any bubble | JUMP: 45 |
| 45 | MUST | 254 | variable | | | 13-All/any bubble | JUMP: 46 |
| 46 | MUST | 7 | ')' | | | 13-All/any bubble | JUMP: 47 |
| 47 | MUST | 251 | * | | | 13-All/any bubble | EXIT |
| 48 | MUST | 6 | '(' | | | 13-All/any bubble | JUMP: 49 |
| 49 | CAN | 23 | '=' | ELSE | JUMP: 58 | 13-All/any bubble | JUMP: 50 |
| 50 | MUST | 254 | variable | | | 13-All/any bubble | JUMP: 51 |
| 51 | MUST | 7 | ')' | | | 13-All/any bubble | JUMP: 52 |
| 52 | MUST | 251 | * | | | 13-All/any bubble | EXIT |
| 53 | CAN | 22 | '<' | ELSE | JUMP: 63 | 13-All/any bubble | JUMP: 54 |
| 54 | MUST | 23 | '=' | | | 13-All/any bubble | JUMP: 55 |
| 55 | MUST | 254 | variable | | | 13-All/any bubble | JUMP: 56 |
| 56 | MUST | 7 | ')' | | | 13-All/any bubble | JUMP: 57 |
| 57 | MUST | 251 | * | | | 13-All/any bubble | EXIT |
| 58 | CAN | 22 | '<' | ELSE | JUMP: 68 | 13-All/any bubble | JUMP: 59 |
| 59 | MUST | 23 | '=' | | | 13-All/any bubble | JUMP: 60 |
| 60 | MUST | 254 | variable | | | 13-All/any bubble | JUMP: 61 |
| 61 | MUST | 7 | ')' | | | 13-All/any bubble | JUMP: 62 |
| 62 | MUST | 251 | * | | | 13-All/any bubble | EXIT |
| 63 | MUST | 24 | '>' | | | 13-All/any bubble | JUMP: 64 |
| 64 | MUST | 23 | '=' | | | 13-All/any bubble | JUMP: 65 |
| 65 | MUST | 254 | variable | | | 13-All/any bubble | JUMP: 66 |
| 66 | MUST | 7 | ')' | | | 13-All/any bubble | JUMP: 67 |
| 67 | MUST | 251 | ' | | | 13-All/any bubble | EXIT |
| 68 | MUST | 24 | '>' | | | 13-All/any bubble | JUMP: 69 |
| 69 | MUST | 23 | '=' | | | 13-All/any bubble | JUMP: 70 |
| 70 | MUST | 254 | variable | | | 13-All/any bubble | JUMP: 71 |
| 71 | MUST | 7 | ')' | | | 13-All/any bubble | JUMP: 72 |
| 72 | MUST | 251 | * | | | 13-All/any bubble | EXIT |
| 73 | MUST | 251 | * | | | 14-FIND bubble | JUMP: 74 |
| 74 | CAN | 26 | ':' | ELSE | EXIT | 14-FIND bubble | JUMP: 75 |
| 75 | MUST | 251 | * | | | 14-FIND bubble | JUMP: 76 |
| 76 | CAN | 27 | 'END' | ELSE | JUMP: 75 | 14-FIND bubble | JUMP: 77 |
| 77 | MUST | 25 | 'FIND' | | | 14-FIND bubble | EXIT |
| 78 | CAN | 6 | '(' | ELSE | EXIT | 16-NEXT/PREV bubble | JUMP: 79 |
| 79 | CAN | 251 | * | ELSE | JUMP: 84 | 16-NEXT/PREV bubble | JUMP: 80 |
| 80 | MUST | 7 | ')' | | | 16-NEXT/PREV bubble | EXIT |
| 81 | CAN | 6 | '(' | ELSE | EXIT | 16-NEXT/PREV bubble | JUMP: 82 |
| 82 | CAN | 251 | * | ELSE | JUMP: 88 | 16-NEXT/PREV bubble | JUMP: 83 |
| 83 | MUST | 7 | ')' | | | 16-NEXT/PREV bubble | EXIT |
| 84 | CAN | 22 | '<' | ELSE | JUMP: 92 | 16-NEXT/PREV bubble | JUMP: 85 |
| 85 | MUST | 23 | '=' | | | 16-NEXT/PREV bubble | JUMP: 86 |
| 86 | MUST | 251 | * | | | 16-NEXT/PREV bubble | JUMP: 87 |
| 87 | MUST | 7 | ')' | | | 16-NEXT/PREV bubble | EXIT |
| 88 | CAN | 22 | '<' | ELSE | JUMP: 95 | 16-NEXT/PREV bubble | JUMP: 89 |
| 89 | MUST | 23 | '=' | | | 16-NEXT/PREV bubble | JUMP: 90 |
| 90 | MUST | 251 | * | | | 16-NEXT/PREV bubble | JUMP: 91 |
| 91 | MUST | 7 | ')' | | | 16-NEXT/PREV bubble | EXIT |
| 92 | CAN | 23 | '=' | ELSE | JUMP: 98 | 16-NEXT/PREV bubble | JUMP: 93 |
| 93 | MUST | 251 | * | | | 16-NEXT/PREV bubble | JUMP: 94 |
| 94 | MUST | 7 | ')' | | | 16-NEXT/PREV bubble | EXIT |
| 95 | CAN | 23 | '=' | ELSE | JUMP: 102 | 16-NEXT/PREV bubble | JUMP: 96 |
| 96 | MUST | 251 | * | | | 16-NEXT/PREV bubble | JUMP: 97 |
| 97 | MUST | 7 | ')' | | | 16-NEXT/PREV bubble | EXIT |
| 98 | MUST | 24 | '>' | | | 16-NEXT/PREV bubble | JUMP: 99 |
| 99 | MUST | 23 | '=' | | | 16-NEXT/PREV bubble | JUMP: 100 |
| 100 | MUST | 251 | * | | | 16-NEXT/PREV bubble | JUMP: 101 |
| 101 | MUST | 7 | ')' | | | 16-NEXT/PREV bubble | EXIT |
| 102 | MUST | 24 | '>' | | | 16-NEXT/PREV bubble | JUMP: 103 |
| 103 | MUST | 23 | '=' | | | 16-NEXT/PREV bubble | JUMP: 104 |
| 104 | MUST | 251 | * | | | 16-NEXT/PREV bubble | JUMP: 105 |
| 105 | MUST | 7 | ')' | | | 16-NEXT/PREV bubble | EXIT |
| 106 | MUST | 251 | * | | | 17-FOR next bubble | JUMP: 107 |
| 107 | MUST | 26 | ':' | | | 17-FOR next bubble | JUMP: 108 |
| 108 | MUST | 251 | * | | | 17-FOR next bubble | JUMP: 109 |
| 109 | MUST | 28 | 'NEXT' | | | 17-FOR next bubble | EXIT |

TABLE 4-continued

Residual decision graphs for the individual elements of the RTN building block-independent reference group from Table 3

| Line | | Decision position number | | Jump-False | | |
|---|---|---|---|---|---|---|
| 110 | MUST | 251 | * | | 18-Rel. Bool bubble | EXIT |
| 111 | MUST | 251 | * | | 18-Rel. Bool bubble | EXIT |
| 112 | MUST | 251 | * | | 19-Rel. line selecting bubble | EXIT |
| 113 | MUST | 251 | * | | 19-Rel. line selecting bubble | EXIT |
| 114 | CAN | 37 | 'UNTIL' | ELSE JUMP: 119 | 20-Do loop until bubble | JUMP: 115 |
| 115 | MUST | 251 | * | | 20-Do loop until bubble | JUMP: 116 |
| 116 | MUST | 26 | ':' | | 20-Do loop until bubble | JUMP: 117 |
| 117 | MUST | 251 | + | | 20-Do loop until bubble | JUMP: 118 |
| 118 | MUST | 36 | 'LOOP' | | 20-Do loop until bubble | EXIT |
| 119 | MUST | 26 | ':' | | 20-Do loop until bubble | JUMP: 120 |
| 120 | MUST | 251 | * | | 20-Do loop until bubble | JUMP: 121 |
| 121 | MUST | 36 | 'LOOP' | | 20-Do loop until bubble | JUMP: 122 |
| 122 | MUST | 37 | 'UNTIL' | | 20-Do loop until bubble | JUMP: 123 |
| 123 | MUST | 251 | * | | 20-Do loop until bubble | EXIT |
| 124 | MUST | 251 | * | | 21-Abs. Bool bubble | EXIT |
| 125 | MUST | 251 | * | | 21-Abs. Bool bubble | EXIT |
| 126 | MUST | 251 | * | | 22-If then bubble | JUMP: 127 |
| 127 | MUST | 41 | 'THEN' | | 22-If then bubble | JUMP: 128 |
| 128 | MUST | 251 | * | | 22-If then bubble | JUMP: 129 |
| 129 | CAN | 42 | 'ELSE' | ELSE JUMP: 131 | 22-If then bubble | JUMP: 130 |
| 130 | MUST | 251 | * | | 22-If then bubble | JUMP: 133 |
| 131 | CAN | 27 | 'END' | ELSE EXIT | 22-If then bubble | JUMP: 132 |
| 132 | MUST | 40 | 'IF' | | 22-If then bubble | EXIT |
| 133 | CAN | 2 | 'END' | ELSE EXIT | 22-If then bubble | JUMP: 134 |
| 134 | MUST | 40 | 'IF' | | 22-If then bubble | EXIT |
| 135 | CAN | 44 | 'CASE' | ELSE JUMP: 201 | 23-Select case bubble | JUMP: 136 |
| 136 | MUST | 251 | * | | 23-Select case bubble | JUMP: 137 |
| 137 | MUST | 26 | ':' | | 23-Select case bubble | JUMP: 138 |
| 138 | MUST | 44 | 'CASE | | 23-Select case bubble | JUMP: 139 |
| 139 | CAN | 251 | * | ELSE JUMP: 144 | 23-Select case bubble | JUMP: 140 |
| 140 | MUST | 26 | ':' | | 23-Select case bubble | JUMP: 141 |
| 141 | MUST | 251 | * | | 23-Select case bubble | JUMP: 142 |
| 142 | CAN | 27 | 'END' | ELSE JUMP: 170 | 23-Select case bubble | JUMP: 143 |
| 143 | MUST | 43 | 'SELECT' | | 23-Select case bubble | EXIT |
| 144 | CAN | 22 | '<' | ELSE JUMP: 157 | 23-Select case bubble | JUMP: 145 |
| 145 | CAN | 24 | '>' | ELSE JUMP: 151 | 23-Select case bubble | JUMP: 146 |
| 146 | MUST | 251 | * | | 23-Select case bubble | JUMP: 147 |
| 147 | MUST | 26 | ':' | | 23-Select case bubble | JUMP: 148 |
| 148 | MUST | 251 | * | | 23-Select case bubble | JUMP: 149 |
| 149 | CAN | 27 | 'END' | ELSE JUMP: 176 | 23-Select case bubble | JUMP: 150 |
| 150 | MUST | 43 | 'SELECT' | | 23-Select case bubble | EXIT |
| 151 | MUST | 23 | '=' | | 23-Select case bubble | JUMP: 152 |
| 152 | MUST | 251 | * | | 23-Select case bubble | JUMP: 153 |
| 153 | MUST | 26 | ':' | | 23-Select case bubble | JUMP: 154 |
| 154 | MUST | 251 | * | | 23-Select case bubble | JUMP: 155 |
| 155 | CAN | 27 | 'END' | ELSE JUMP: 182 | 23-Select case bubble | JUMP: 156 |
| 156 | MUST | 43 | 'SELECT' | | 23-Select case bubble | EXIT |
| 157 | CAN | 24 | '>' | ELSE JUMP: 164 | 23-Select case bubble | JUMP: 158 |
| 158 | MUST | 23 | '=' | | 23-Select case bubble | JUMP: 159 |
| 159 | MUST | 251 | * | | 23-Select case bubble | JUMP: 160 |
| 160 | MUST | 26 | ':' | | 23-Select case bubble | JUMP: 161 |
| 161 | MUST | 251 | * | | 23-Select case bubble | JUMP: 162 |
| 162 | CAN | 27 | 'END' | ELSE JUMP: 188 | 23-Select case bubble | JUMP: 163 |
| 163 | MUST | 43 | 'SELECT' | | 23-Select case bubble | EXIT |
| 164 | MUST | 23 | '=' | | 23-Select case bubble | JUMP: 165 |
| 165 | MUST | 251 | * | | 23-Select case bubble | JUMP: 166 |
| 166 | MUST | 26 | ':' | | 23-Select case bubble | JUMP: 167 |
| 167 | MUST | 251 | * | | 23-Select case bubble | JUMP: 168 |
| 168 | CAN | 27 | 'END' | ELSE JUMP: 194 | 23-Select case bubble | JUMP: 169 |
| 169 | MUST | 43 | 'SELECT' | | 23-Select case bubble | EXIT |
| 170 | MUST | 44 | 'CASE' | | 23-Select case bubble | JUMP: 171 |
| 171 | CAN | 42 | 'ELSE' | ELSE JUMP: 139 | 23-Select case bubble | JUMP: 172 |
| 172 | MUST | 26 | ':' | | 23-Select case bubble | JUMP: 173 |
| 173 | MUST | 251 | * | | 23-Select case bubble | JUMP: 174 |
| 174 | MUST | 27 | 'END' | | 23-Select case bubble | JUMP: 175 |
| 175 | MUST | 43 | 'SELECT' | | 23-Select case bubble | EXIT |
| 176 | MUST | 44 | 'CASE' | | 23-Select case bubble | JUMP: 177 |
| 177 | CAN | 42 | 'ELSE' | ELSE JUMP: 139 | 23-Select case bubble | JUMP: 178 |
| 178 | MUST | 26 | ':' | | 23-Select case bubble | JUMP: 179 |
| 179 | MUST | 251 | * | | 23-Select case bubble | JUMP: 180 |
| 180 | MUST | 27 | 'END' | | 23-Select case bubble | JUMP: 181 |
| 181 | MUST | 43 | 'SELECT' | | 23-Select case bubble | EXIT |
| 182 | MUST | 44 | 'CASE' | | 23-Select case bubble | JUMP: 183 |
| 183 | CAN | 42 | 'ELSE' | ELSE JUMP: 139 | 23-Select case bubble | JUMP: 184 |
| 184 | MUST | 26 | ':' | | 23-Select case bubble | JUMP: 185 |

TABLE 4-continued

Residual decision graphs for the individual elements of the RTN building block-independent reference group from Table 3

| Line | | Decision position number | | Jump-False | | Jump-True |
|---|---|---|---|---|---|---|
| 185 | MUST | 251 | * | | 23-Select case bubble | JUMP: 186 |
| 186 | MUST | 27 | 'END' | | 23-Select case bubble | JUMP: 187 |
| 187 | MUST | 43 | 'SELECT' | | 23-Select case bubble | EXIT |
| 188 | MUST | 44 | 'CASE' | | 23-Select case bubble | JUMP: 189 |
| 189 | CAN | 42 | 'ELSE' | ELSE JUMP: 139 | 23-Select case bubble | JUMP: 190 |
| 190 | MUST | 26 | ':' | | 23-Select case bubble | JUMP: 191 |
| 191 | MUST | 251 | * | | 23-Select case bubble | JUMP: 192 |
| 192 | MUST | 27 | 'END' | | 23-Select case bubble | JUMP: 193 |
| 193 | MUST | 43 | 'SELECT' | | 23-Select case bubble | EXIT |
| 194 | MUST | 44 | 'CASE' | | 23-Select case bubble | JUMP: 195 |
| 195 | CAN | 42 | 'ELSE' | ELSE JUMP: 139 | 23-Select case bubble | JUMP: 196 |
| 196 | MUST | 26 | ':' | | 23-Select case bubble | JUMP: 197 |
| 197 | MUST | 251 | * | | 23-Select case bubble | JUMP: 198 |
| 198 | MUST | 27 | 'END' | | 23-Select case bubble | JUMP: 199 |
| 199 | MUST | 43 | 'SELECT' | | 23-Select case bubble | EXIT |
| 200 | MUST | 251 | * | | 24-Negating Bool bubble | EXIT |
| 201 | MUST | 251 | * | | 25-SELECT bubble | EXIT |
| 202 | MUST | 251 | * | | 26-Group break bubble | JUMP: 203 |
| 203 | CAN | 26 | ':' | ELSE EXIT | 26-Group break bubble | JUMP: 204 |
| 204 | MUST | 251 | * | | 26-Group break bubble | JUMP: 205 |
| 205 | CAN | 27 | 'END' | ELSE JUMP: 204 | 26-Group break bubble | JUMP: 206 |
| 206 | MUST | 46 | 'BREAKON' | | 26-Group break bubble | EXIT |
| 207 | MUST | 251 | * | | 27-Line combining bubble | JUMP: 208 |
| 208 | CAN | 26 | ':' | ELSE EXIT | 27-Line combining bubble | JUMP: 209 |
| 209 | MUST | 251 | * | | 27-Line combining bubble | JUMP: 210 |
| 210 | CAN | 27 | 'END' | ELSE JUMP: 209 | 27-Line combining bubble | JUMP: 211 |
| 211 | MUST | 47 | 'GROUPBY' | | 27-Line combining bubble | EXIT |
| 212 | MUST | 251 | * | | 28-Percent bubble | EXIT |
| 213 | MUST | 251 | * | | 29-Levels start input sets bubble | EXIT |
| 214 | MUST | 251 | * | | 31-Distinct bubble | EXIT |
| 215 | MUST | 251 | * | | 32-Value linkage bubble | EXIT |
| 216 | CAN | 251 | * | ELSE JUMP: 262 | 33-Addition subtraction operations bubble | EXIT |
| 217 | MUST | 251 | * | | 33-Addition subtraction operations bubble | EXIT |
| 218 | MUST | 251 | * | | 34-Multiplication division operations bubble | EXIT |
| 219 | MUST | 251 | * | | 34-Multiplication division operations bubble | EXIT |
| 220 | MUST | 251 | * | | 34-Multiplication division operations bubble | EXIT |
| 221 | MUST | 251 | * | | 34-Multiplication division operations bubble | EXIT |
| 222 | MUST | 251 | * | | 35-Power calculation operations bubble | EXIT |
| 223 | CAN | 24 | '>' | ELSE JUMP: 226 | 36-Comparative bubble | JUMP: 224 |
| 224 | MUST | 251 | * | | 36-Comparative bubble | EXIT |
| 225 | MUST | 251 | * | | 36-Comparative bubble | EXIT |
| 226 | CAN | 251 | * | ELSE JUMP: 230 | 36-Comparative bubble | EXIT |
| 227 | CAN | 251 | * | ELSE JUMP: 228 | 36-Comparative bubble | EXIT |
| 228 | MUST | 23 | '=' | | 36-Comparative bubble | JUMP: 229 |
| 229 | MUST | 251 | * | | 36-Comparative bubble | EXIT |
| 230 | MUST | 23 | '=' | | 36-Comparative bubble | JUMP: 231 |
| 231 | MUST | 251 | * | | 36-Comparative bubble | EXIT |
| 232 | MUST | 251 | * | | 37-Bool combination bubble | EXIT |
| 233 | MUST | 251 | * | | 37-Bool combination bubble | EXIT |
| — | MUST | 251 | * | | 37-Bool combination bubble | EXIT |
| 235 | CAN | 251 | * | ELSE JUMP: 236 | 38-Set elements limiting bubble | EXIT |
| 236 | CAN | 22 | '<' | ELSE JUMP: 239 | 38-Set elements limiting bubble | JUMP: 237 |
| 237 | CAN | 24 | '>' | ELSE JUMP: 244 | 38-Set elements limiting bubble | JUMP: 238 |
| 238 | CAN | 251 | * | ELSE JUMP: 248 | 38-Set elements limiting bubble | EXIT |
| 239 | CAN | 23 | '=' | ELSE JUMP: 241 | 38-Set elements limiting bubble | JUMP: 240 |
| 240 | CAN | 251 | * | ELSE JUMP: 250 | 38-Set elements limiting bubble | EXIT |
| 241 | CAN | 24 | '>' | ELSE JUMP: 246 | 38-Set elements limiting bubble | JUMP: 242 |
| 242 | MUST | 23 | '=' | | 38-Set elements limiting bubble | JUMP: 243 |
| 243 | CAN | 251 | * | ELSE JUMP: 252 | 38-Set elements limiting bubble | EXIT |
| 244 | MUST | 23 | '=' | | 38-Set elements limiting bubble | JUMP: 245 |
| 245 | CAN | 251 | * | ELSE JUMP: 254 | 38-Set elements limiting bubble | EXIT |
| 246 | MUST | 61 | " | | 38-Set elements limiting bubble | JUMP: 247 |
| 247 | MUST | 251 | * | | 38-Set elements limiting bubble | EXIT |
| 248 | MUST | 61 | " | | 38-Set elements limiting bubble | JUMP: 249 |
| 249 | MUST | 251 | * | | 38-Set elements limiting bubble | EXIT |
| 250 | MUST | 61 | " | | 38-Set elements limiting bubble | JUMP: 251 |
| 251 | MUST | 251 | * | | 38-Set elements limiting bubble | EXIT |
| 252 | MUST | 61 | " | | 38-Set elements limiting bubble | JUMP: 253 |
| 253 | MUST | 251 | * | | 38-Set elements limiting bubble | EXIT |
| 254 | MUST | 61 | " | | 38-Set elements limiting bubble | JUMP: 255 |
| 255 | MUST | 251 | * | | 38-Set elements limiting bubble | EXIT |
| 256 | MUST | 251 | * | | 39-Set combining bubble | EXIT |
| 257 | CAN | 251 | * | ELSE JUMP: 258 | 39-Set combining bubble | EXIT |
| 258 | MUST | 20 | 'ALL' | | 39-Set combining bubble | JUMP: 259 |
| 259 | MUST | 251 | * | | 39-Set combining bubble | EXIT |

TABLE 4-continued

Residual decision graphs for the individual elements of the RTN building block-independent reference group from Table 3

| Line | | Decision position number | Jump-False | | | Jump-True |
|---|---|---|---|---|---|---|
| 260 | MUST | 251 | * | | 39-Set combining bubble | EXIT |
| 261 | MUST | 251 | * | | 40-Set element forming bubble | EXIT |
| 262 | MUST | 24 | '>' | | 41-Way part bubble | JUMP: 263 |
| 263 | MUST | 251 | * | | 41-Way part bubble | JUMP: 264 |
| 264 | CAN | 65 | 'OVER' | ELSE | EXIT 41-Way part bubble | JUMP: 265 |
| 265 | MUST | 251 | * | | 41-Way part bubble | EXIT |
| 266 | MUST | 254 | variable | | 42-Intermediate set bubble | EXIT |
| 267 | MUST | 6 | '(' | | 43-IN comparing bubble | JUMP: 268 |
| 268 | MUST | 251 | * | | 43-IN comparing bubble | JUMP: 269 |
| 269 | MUST | 7 | ')' | | 43-IN comparing bubble | EXIT |

The invention claimed is:

1. A method for controlling a relational database system, wherein a query statement to be processed consisting of keywords is first analyzed by applying a recursive transition network (RTN), and the keywords or group of keywords are allocated processing-relevant properties in the order given by the statement, whereafter it is converted into control commands and optionally optimized, characterized in that it contains the following steps:

defining the RTN in a presetting step by forming independent RTN building blocks, wherein each RTN building block includes associated processing-relevant building block information and has an inner, directed decision graph which is defined independently from the inner, directed decision graphs of the other RTN building blocks and has at least one decision path, which includes at least one decision position, with at least one part of the RTN building blocks having a recursive RTN building block introduction position at at least one of the decision positions of their decision paths, which prescribes the introduction and running of one of the RTN building blocks from the total of RTN building blocks, wherein the introduced RTN building block again optionally includes the recursive RTN building block introduction position in its decision graph at least once so that any number of nesting levels of RTN building blocks can be introduced, forming a reference group, the elements of which refer to a residual decision graph with the first decision position removed, wherein for each RTN building block the following substeps are carried out independently from the other RTN building blocks:

determining all decision positions that may be reached as the first decision position in the decision graph of the respective RTN building block and adding the same to the reference group as its elements, forming the residual decision graphs for all first decision positions reachable by combining the decision paths that may be followed starting from the respective first decision position with the omission of these first decision positions, and adding the respective processing-relevant RTN building block information thereto, so that after carrying out all substeps for all RTN building blocks, the reference group contains the first decision positions of all RTN building blocks, and these first decision positions refer to their associated residual decision graphs, running of all keywords of the statement to be processed by carrying out a reference processing step for the keyword at the first position of the statement to be processed, wherein the element matching the keyword is searched in the reference group and, when the same is found, the residual decision graph allocated thereto by reference is followed in a way that the respective subsequent keywords of the statement to be processed are run and all possible decision paths of the allocated residual decision graph are followed until either no matches with the respectively chosen decision path are detected and the reference processing step in question is aborted or the respectively chosen decision path is run to the end, wherein at those decision positions of the allocated residual decision graph reached that have a recursive RTN building block introduction position, the reference processing step is effected recursively, and that an access plan for the relational database system is generated from the order of the processing-relevant building block information and its nesting as resulting after running of all keywords of the query statement.

* * * * *